(12) United States Patent
Ramsay et al.

(10) Patent No.: US 9,172,246 B2
(45) Date of Patent: Oct. 27, 2015

(54) PHASE BALANCING OF POWER TRANSMISSION SYSTEM

(71) Applicant: Smart Wire Grid, Inc., Oakland, CA (US)

(72) Inventors: Stewart Ramsay, Walnut Creek, CA (US); Julie A. Couillard, San Francisco, CA (US); Andrija Sadikovic, San Mateo, CA (US)

(73) Assignee: SMART WIRES INC., San Francisco, CA (US)

( * ) Notice: Subject to any disclaimer, the term of this patent is extended or adjusted under 35 U.S.C. 154(b) by 0 days.

(21) Appl. No.: 14/332,572

(22) Filed: Jul. 16, 2014

(65) Prior Publication Data

US 2014/0327305 A1    Nov. 6, 2014

Related U.S. Application Data

(63) Continuation of application No. 14/227,995, filed on Mar. 27, 2014, now Pat. No. 8,816,527, which is a continuation of application No. 14/206,274, filed on Mar. 12, 2014, now abandoned.

(60) Provisional application No. 61/805,737, filed on Mar. 27, 2013.

(51) Int. Cl.
*H02J 3/26* (2006.01)
*H01H 51/34* (2006.01)
(Continued)

(52) U.S. Cl.
CPC .............. *H02J 3/26* (2013.01); *H02J 13/0062* (2013.01); *H02J 13/0075* (2013.01); *H02J 13/0079* (2013.01); *H01F 29/00* (2013.01); *H01F 38/30* (2013.01); *Y02E 40/50* (2013.01); *Y02E 60/74* (2013.01); *Y02E 60/7838* (2013.01); *Y02E 60/7853* (2013.01); *Y04S 10/30* (2013.01); *Y04S40/124* (2013.01); *Y04S 40/126* (2013.01); *Y10T 307/273* (2015.04)

(58) Field of Classification Search
CPC .......................................................... H02J 3/26
USPC ...................................................... 307/14, 98
See application file for complete search history.

(56) References Cited

U.S. PATENT DOCUMENTS 4,199,798 A    4/1980  Leppke et al.
4,829,298 A *  5/1989  Fernandes ................ 340/870.27
(Continued)

FOREIGN PATENT DOCUMENTS

WO    2004/042889 A1    5/2004

*Primary Examiner* — Rexford Barnie
*Assistant Examiner* — Rasem Mourad
(74) *Attorney, Agent, or Firm* — Marsh Fischmann & Breyfogle LLP

(57) ABSTRACT

Phase balancing techniques for power transmission systems are disclosed. In one embodiment, a phase balancing protocol (240) includes executing a first phase balancing protocol (350) in relation to a first power transmission section (400a). A second phase balancing protocol (370) may be executed if the first phase balancing protocol (350) is unable to provide a phase balanced condition. The first phase balancing protocol (350) may utilize a first ordering sequence (364) to rank the current flow on the power lines (16) of the first power transmission section (400a), while the second phase balancing protocol (370) may utilize a second ordering sequence (384) to rank the current flow on the power lines (16) of the first power transmission section (400a). The order sequences (364, 384) are opposite of each other—one ranks the current flows from high-to-low, and the other ranks the current flow from low-to-high.

32 Claims, 41 Drawing Sheets

(51) Int. Cl.
  *H01H 47/02* (2006.01)
  *G05F 1/10* (2006.01)
  *H02J 13/00* (2006.01)
  *H01F 29/00* (2006.01)
  *H01F 38/30* (2006.01)

(56) References Cited

U.S. PATENT DOCUMENTS

| | | | |
|---|---|---|---|
| 5,502,611 A * | 3/1996 | Rodgers | 361/85 |
| 5,818,126 A | 10/1998 | Mohan | |
| 7,105,952 B2 | 9/2006 | Divan et al. | |
| 7,235,900 B1 * | 6/2007 | Couture | 307/98 |
| 7,248,158 B2 * | 7/2007 | Berkman et al. | 340/538 |
| 7,508,224 B2 * | 3/2009 | Williams | 324/707 |
| 7,518,529 B2 * | 4/2009 | O'Sullivan et al. | 340/870.27 |
| 7,835,128 B2 | 11/2010 | Divan et al. | |
| 2007/0241759 A1 | 10/2007 | Williams | |
| 2008/0157728 A1 | 7/2008 | Toki et al. | |
| 2008/0310069 A1 * | 12/2008 | Divan et al. | 361/93.9 |
| 2012/0194144 A1 | 8/2012 | Koren et al. | |
| 2012/0233485 A1 | 9/2012 | Shaffer et al. | |

* cited by examiner

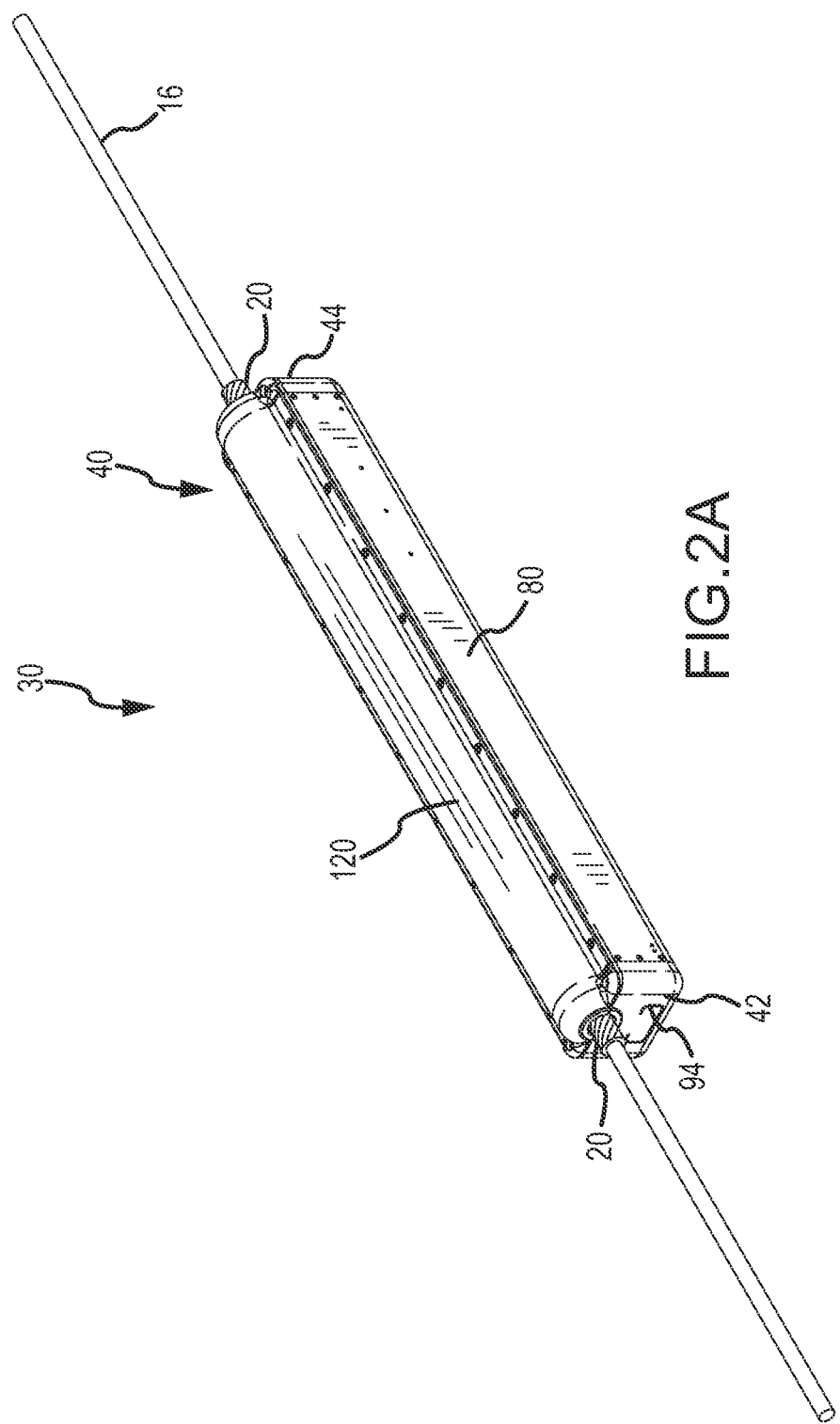

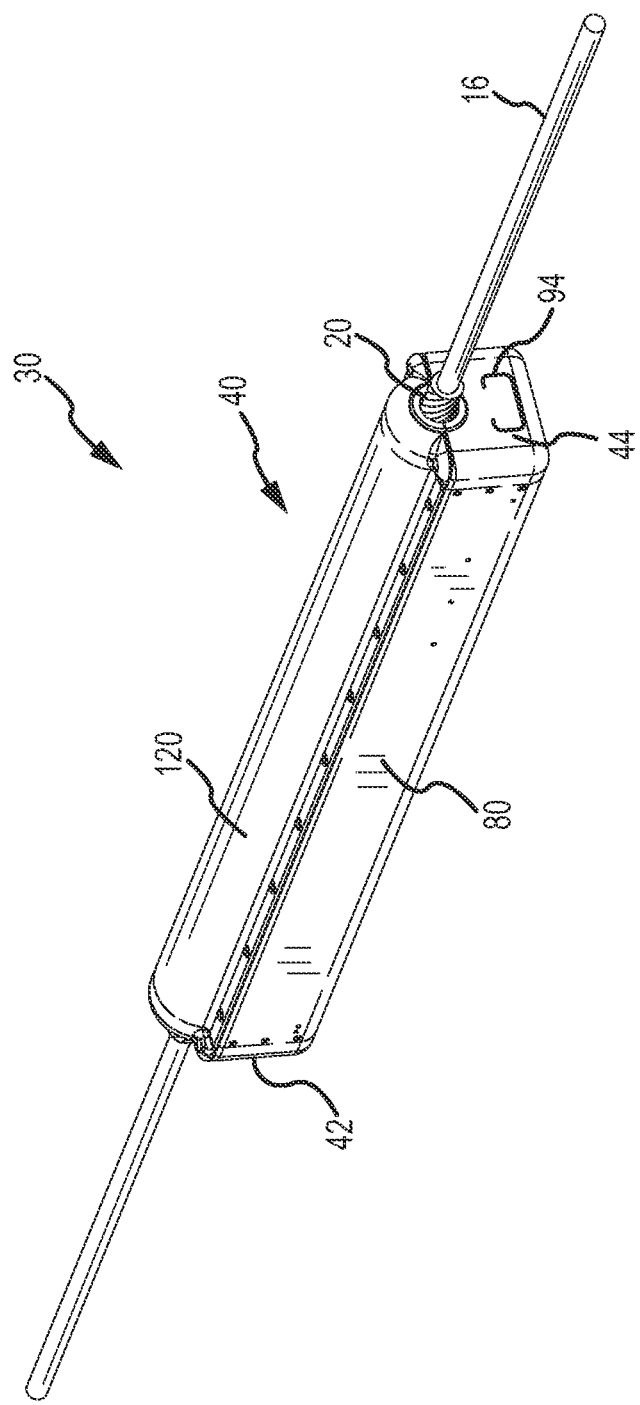

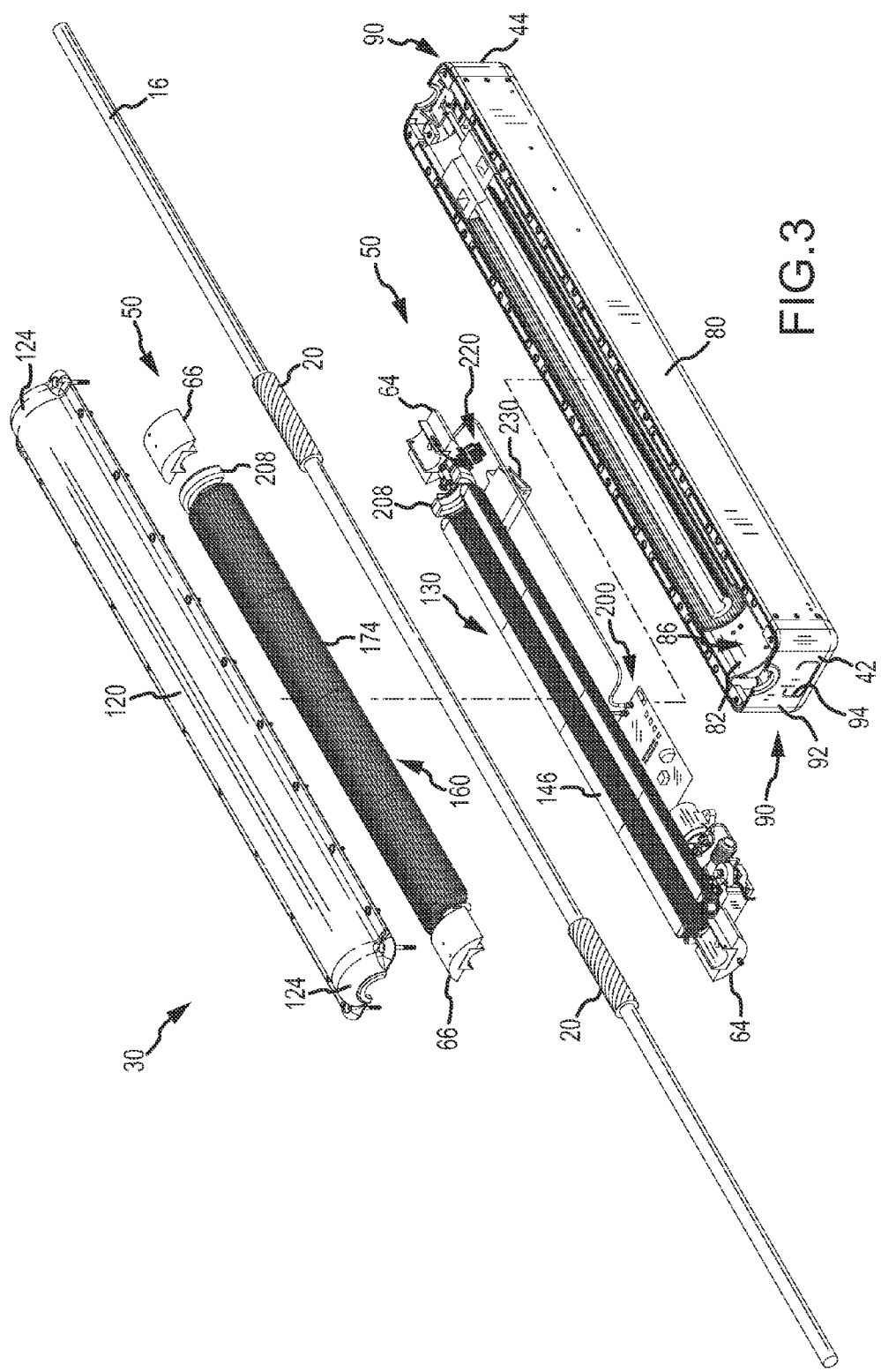

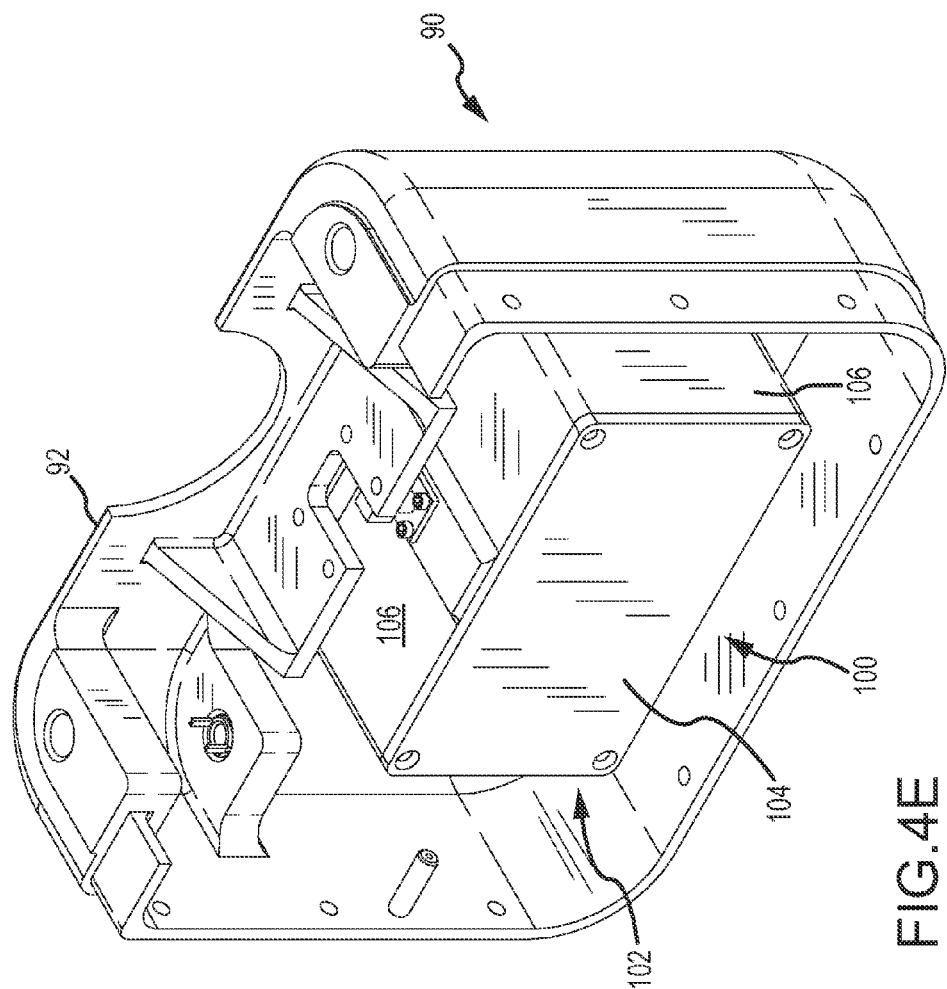

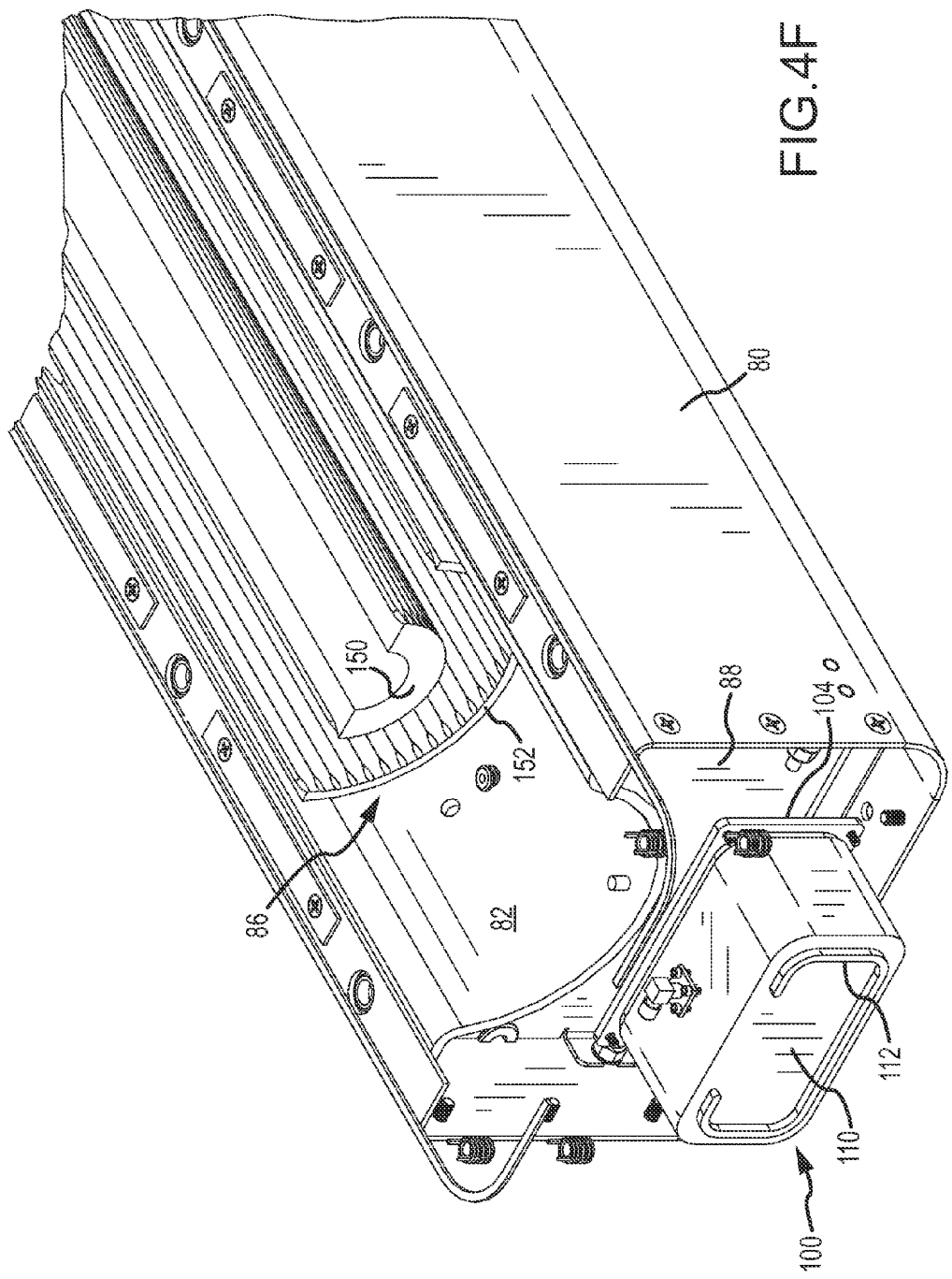

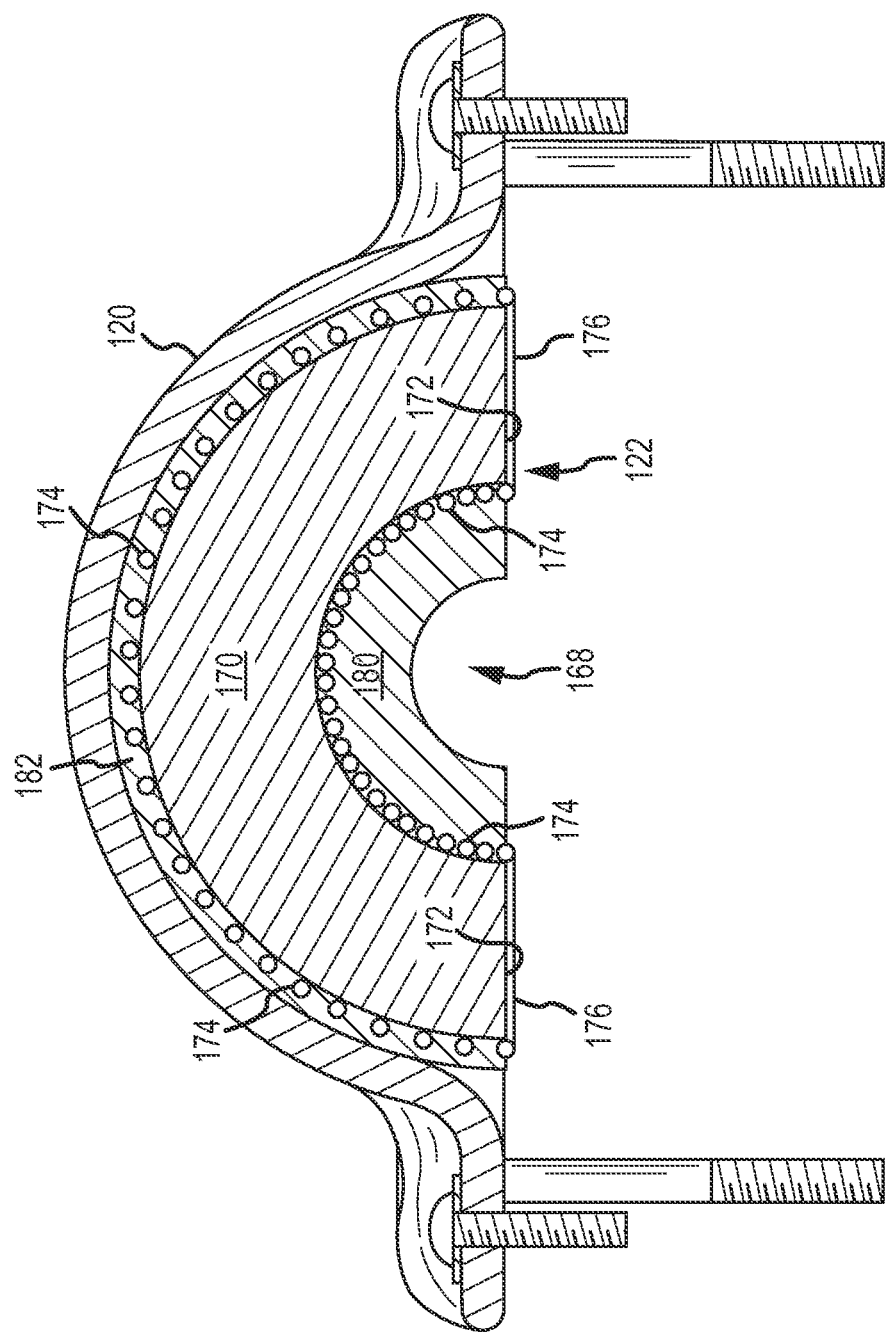

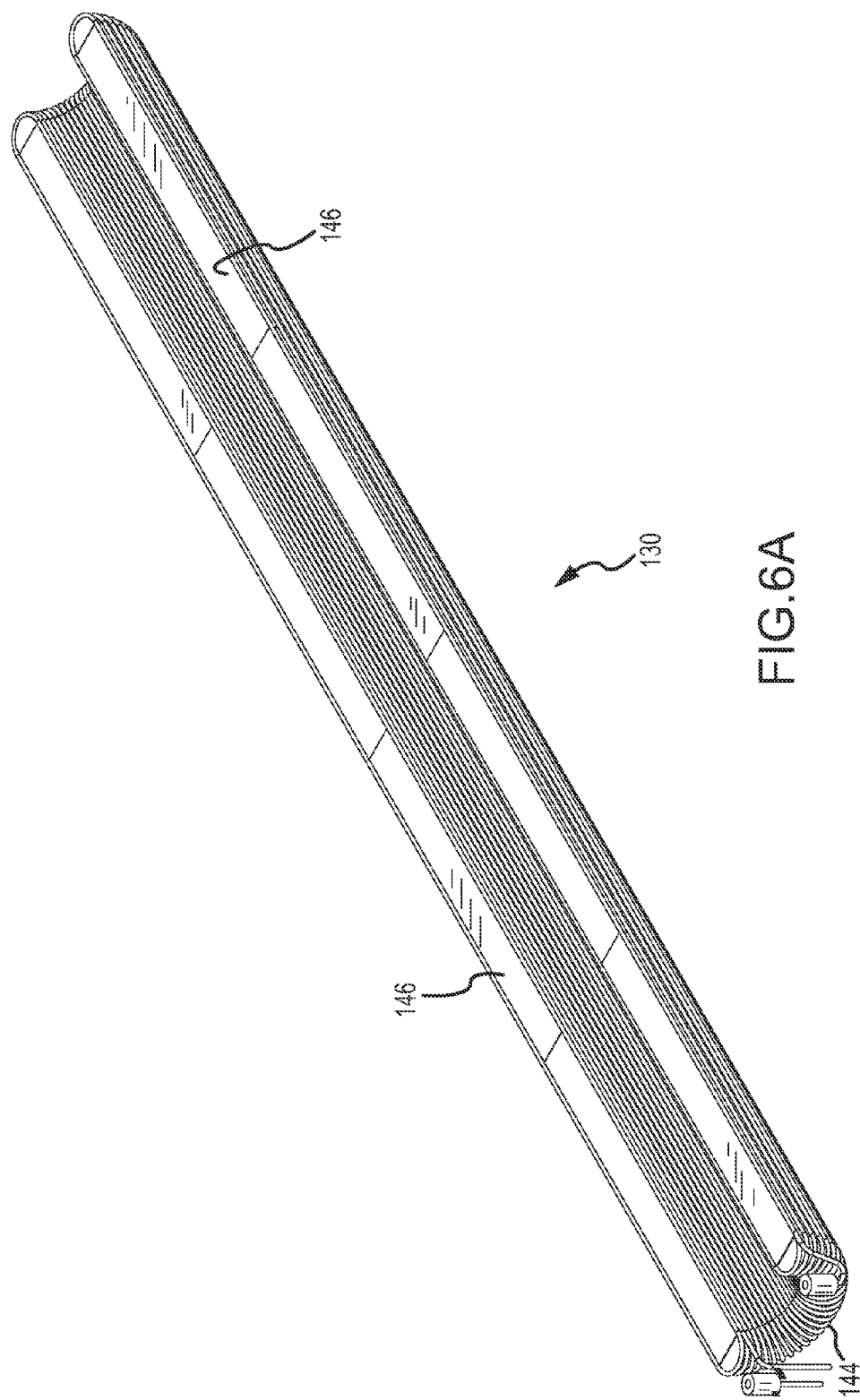

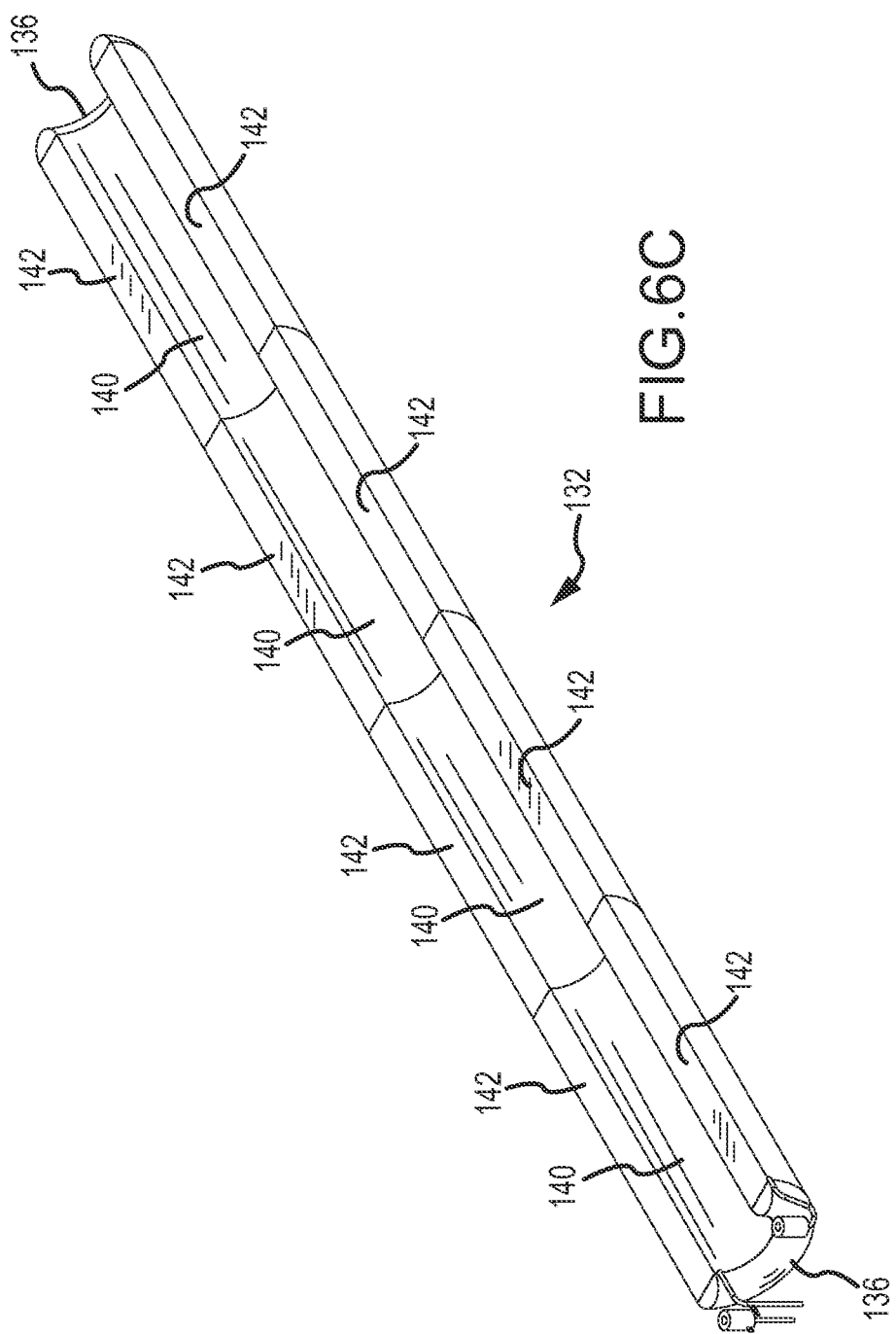

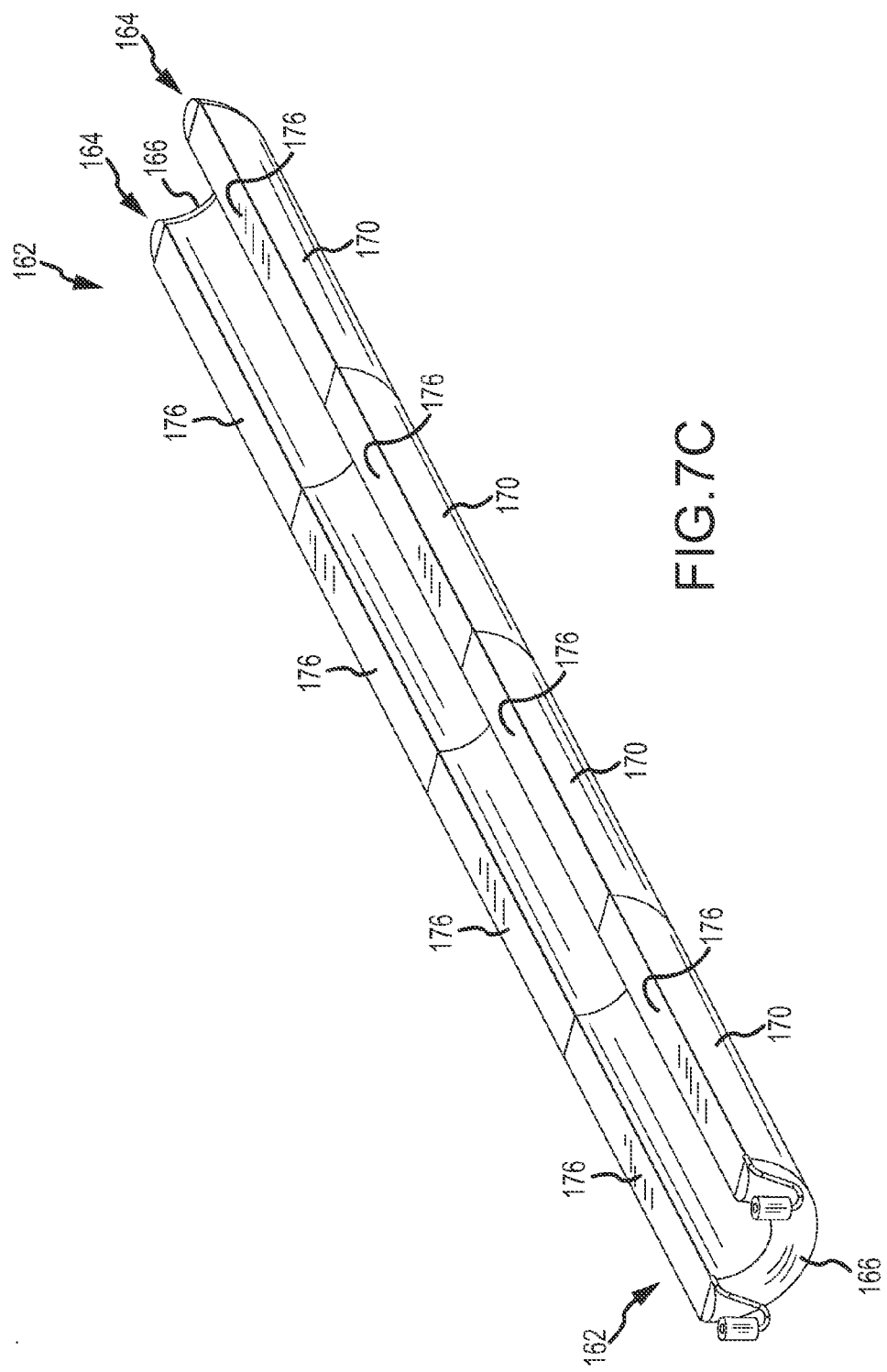

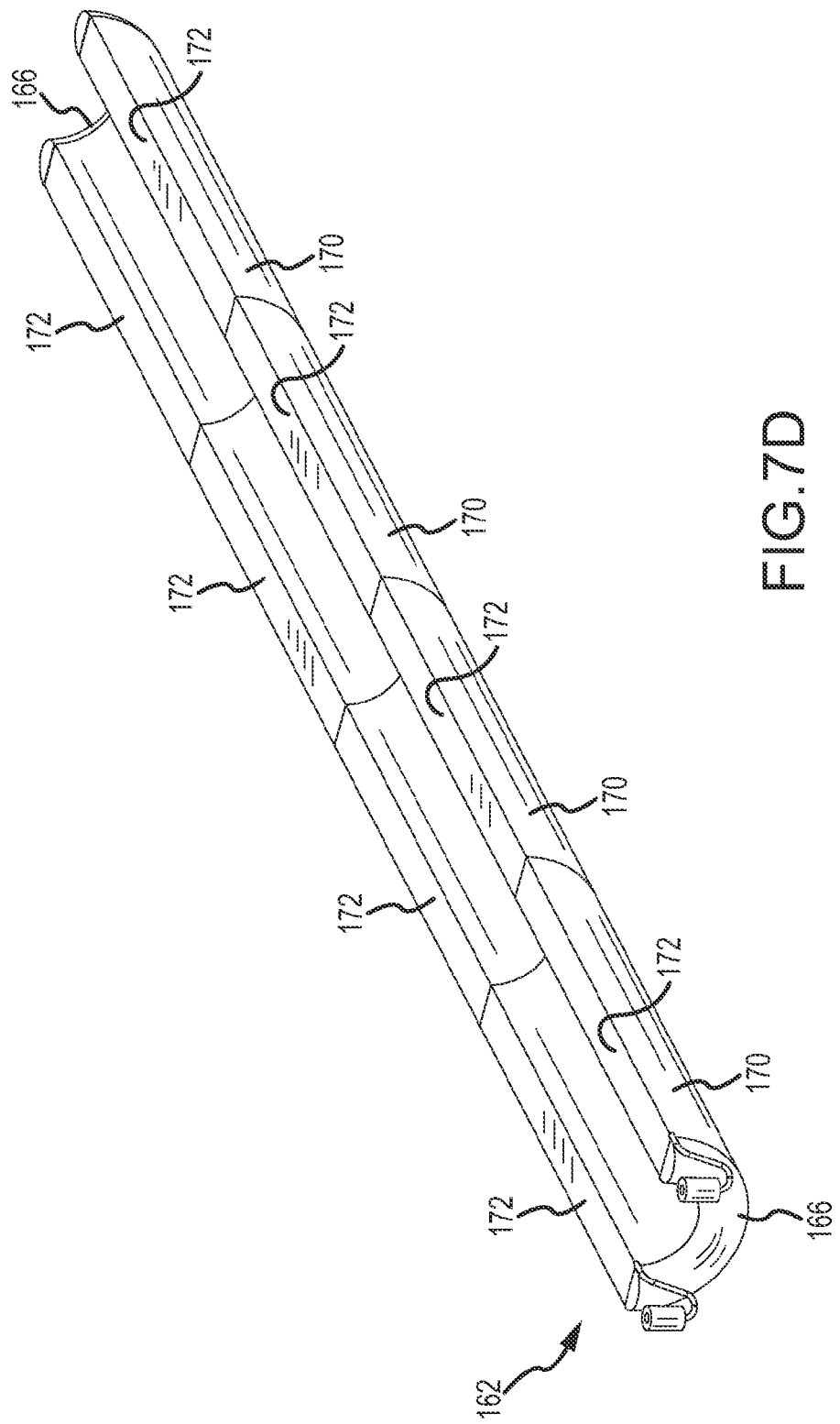

| SYSTEM CONDITION | DSR 30 | | DSR 30 | | DSR 30 | |
|---|---|---|---|---|---|---|
| | PFC MC | LFOC MC | PFC MC | LFOC MC | PFC MC | LFOC MC |
| 482 | 484 | 486 | 484 | 486 | 484 | 486 |
| 482 | 484 | 486 | 484 | 486 | 484 | 486 |
| 482 | 484 | 486 | 484 | 486 | 484 | 486 |
| 482 | 484 | 486 | 484 | 486 | 484 | 486 |
| 482 | 484 | 486 | 484 | 486 | 484 | 486 |
| 482 | 484 | 486 | 484 | 486 | 484 | 486 |

| PHASE IMBALANCE CONDITION | POWER LINE 16A | | | POWER LINE 16B | | | POWER LINE 16C | | |
|---|---|---|---|---|---|---|---|---|---|
| | DSR 30a | DSR 30b | DSR 30c | DSR 30a | DSR 30b | DSR 30c | DSR 30a | DSR 30b | DSR 30c |
| 572 | 574 | 574 | 574 | 574 | 574 | 574 | | | |
| 572 | 574 | 574 | 574 | | 574 | 574 | 574 | 574 | 574 |
| 572 | 574 | 574 | | 574 | 574 | | 574 | 574 | 574 |
| 572 | 574 | 574 | 574 | 574 | 574 | 574 | | | |
| 572 | | | | 574 | 574 | 574 | 574 | 574 | 574 |
| 572 | | | | | | | 574 | 574 | 574 |

FIG. 13E

PHASE BALANCING OF POWER TRANSMISSION SYSTEM

CROSS-REFERENCE TO RELATED APPLICATIONS

This patent application is a continuation of U.S. patent application Ser. No. 14/227,995, that is entitled "PHASE BALANCING OF POWER TRANSMISSION SYSTEM," and that was filed on Mar. 27, 2014, which is a continuation of U.S. patent application Ser. No. 14/206,274, that is entitled "PHASE BALANCING OF POWER TRANSMISSION SYSTEM," and that was filed on Mar. 12, 2014, which is a non-provisional patent application of, and claims priority to, pending U.S. Provisional Patent Application Ser. No. 61/805,737 that is entitled "PHASE BALANCING OF POWER TRANSMISSION SYSTEM," and that was filed on Mar. 27, 2013. The entire disclosure of each application set forth in this Cross-Reference to Related Applications section is hereby incorporated by reference herein.

FIELD OF THE INVENTION

The present invention generally relates to power transmission systems and, more particularly to addressing phase imbalances associated with power transmission systems.

BACKGROUND

Power transmission systems are formed of a complex interconnected system of generating plants, substations, and transmission and distribution lines. At a given point in time, a power transmission system may not have perfectly balanced loads, currents, voltages, and impedances in all phases (3 or more). One proposed solution to reducing phase imbalances between the various phases of a power transmission system is to physically transpose (e.g., roll or re-orient) the lines from time-to-time (including for the case where each line is at a different phase).

SUMMARY

The present invention generally pertains to phase balancing a power transmission system (or at least a portion thereof). The present invention will be addressed in relation to a number of different aspects. In each of these aspects, the words "first" and "second" may be used to identify particular phase balancing protocols and various features/characteristics relating thereto, such as ranking, ordering sequence, phase imbalance condition, and modal configuration. It should be appreciated that "first" and "second" are merely labels in this respect. In a given aspect of the present invention, a particular phase balancing protocol may be referred to as a "first phase balancing protocol" in one instance, but may be referred to as a "second phase balancing protocol" in another instance (e.g., for antecedent basis purposes). What is a "first phase balancing protocol" in the case of one aspect may be the same as or different from a "first phase balancing protocol" in the case of another aspect. As such, the features of a given phase balancing protocol should be viewed as defining the phase balancing protocol, not the "label" that may be assigned thereto in a given discussion of the present invention for antecedent basis purposes.

Each aspect of the present invention will be described in relation to a first power transmission section, which may be any portion of an overall power transmission system or may define the entirety of a power transmission system. The first power transmission section includes a plurality of power lines, and may be characterized as extending from location A to location B. In any case, at least some of the power lines of the first power transmission section are of a different phase (thereby encompassing each power transmission line of the power transmission section being of a different phase).

At least one first device is mounted on each power line of the first power transmission section (typically a plurality of first devices will be mounted on each of the power lines of the first power transmission section), where each first device may be switched between first and second modes. A given first device will only be in one of the first and second modes at a given point in time, although the modal configuration of the first device may be changed from the first mode to the second mode, and vice versa. Changing a given first device between its first and second modes should change the current flow on its corresponding power line (either increasing the current flow on its power line, or decreasing the current flow on its power line).

In all aspects of the present invention, the first mode for each first device is a bypass mode (although a monitoring functionality may be available when a first device is in its bypass mode), while the second mode is an injection mode. A first device may be configured to inject either inductance or capacitance into its corresponding power line when in the second mode. If a first device is configured to inject inductance when in its second mode: 1) a current-increasing modal configuration for such a first device would be realized by switching the first device from its second mode to its first mode; and 2) a current-decreasing modal configuration for such a first device would be realized by switching the first device from its first mode to its second mode. If a first device is configured to inject capacitance when in its second mode: 1) a current-increasing modal configuration for such a first device would be realized by switching the first device from its first mode to its second mode; and 2) a current-decreasing modal configuration for such a first device would be realized by switching the first device from its second mode to its first mode. In any case, a first device that is switched into a first modal configuration (by being switched from the first mode to the second mode, or vice versa) will have one effect on the current flow through the corresponding power line (increase or decrease the current flow), while a first device that is switched into a second modal configuration (by switching the modes in a manner that is opposite of that for the first modal configuration) will have the opposite effect on the current flow through the corresponding power line.

A first aspect of the present invention is embodied by a method of phase balancing a power transmission system. Current flow is measured on each power line of the above-noted first power transmission section. A first phase balancing protocol is executed. A different and separate second phase balancing protocol may be executed in relation to the first aspect, but first requires an occurrence of a first condition.

The first phase balancing protocol for the first aspect includes generating a first ranking of the plurality of power lines (of the first power transmission section) using a first ordering sequence of current flows (e.g., ranking the current flows on the power lines from low-to-high (in relation to the magnitude of the current flow) or from high-to-low (in relation to the magnitude of the current flow) for purposes of the first ranking). At least one first device may be switched into a first modal configuration in an attempt to achieve a phase balanced condition between each adjacent pair of power lines in the first ranking, pursuant to the first phase balancing protocol. The second phase balancing protocol includes generating a second ranking of the plurality of power lines (of the first power transmission section) using a second ordering sequence of current flows (e.g., ranking the current flows on the power lines from low-to-high (in relation to the magnitude of the current flow) or from high-to-low (in relation to the magnitude of the current flow) for purposes of the second ranking). The second ordering sequence (for the second phase balancing protocol) is the opposite of first ordering sequence (for the first phase balancing protocol)—one of the first and second rankings will have the power lines ranked from low-to-high (in relation to the magnitude of their respective current flows), while the other of the first and second rankings will have the power lines ranked from high-to-low (in relation to the magnitude of their respective current flows). At least one first device may be switched into a second modal configuration in an attempt to achieve a phase balanced condition between each adjacent pair of power lines in the second ranking, pursuant to the second phase balancing protocol. The first modal configuration for the first phase balancing protocol is the opposite of the second modal configuration for the second phase balancing protocol (i.e., one of the first and second modal configurations will be a current-increasing modal configuration, while the other of the first and second modal configurations will be a current-decreasing modal configuration).

A number of feature refinements and additional features are applicable to the first aspect of the present invention. These feature refinements and additional features may be used individually or in any combination. The following discussion is applicable to the first aspect, up to the start of the discussion of a second aspect of the present invention. A "phase imbalance condition" in relation to the first aspect may be in accordance with the "phase imbalance condition" that is addressed in relation to the second aspect. Generally, a phase imbalance condition between two power lines may mean that there is at least a certain current flow differential between these two power lines.

The first ordering sequence for the first phase balancing protocol may rank the power lines of the first power transmission section from lowest current flow to highest current flow (e.g., a low-to-high ordering sequence). In this case, the following are applicable, individually or in any combination: 1) the first modal configuration for the first phase balancing protocol will be a current-increasing modal configuration in relation to the modal switching of one or more first devices on one or more of the power lines of the first power transmission section; 2) the second ordering sequence for the second phase balancing protocol will rank the power lines of the first power transmission section from highest current flow to lowest current flow (e.g., a high-to-low ordering sequence); and/or 3) the second modal configuration for the second phase balancing protocol will be a current-decreasing modal configuration in relation to the modal switching of one or more first devices on one or more of the power lines of the first power transmission section.

The first ordering sequence for the first phase balancing protocol may rank the power lines of the first power transmission section from highest current flow to lowest current flow (e.g., a high-to-low ordering sequence). In this case, the following are applicable, individually or in any combination: 1) the first modal configuration for the first phase balancing protocol will be a current-decreasing modal configuration in relation to the modal switching of one or more first devices on one or more of the power lines of the first power transmission section; 2) the second ordering sequence for the second phase balancing protocol will rank the power lines of the first power transmission section from lowest current flow to highest current flow (e.g., a low-to-high ordering sequence); and/or 3) the second modal configuration for the second phase balancing protocol will be a current-increasing modal configuration in relation to the modal switching of one or more first devices on one or more of the power lines of the first power transmission section.

The first phase balancing protocol may increment or sequence through the first ranking one power line at a time, including in sequential order. At each increment within the first ranking, the first phase balancing protocol may compare the current flow of that power line in the first ranking with the current flow of the next power line in the first ranking. One or more first devices associated with the higher-ranked power line in the current comparison (within the first ranking) may be switched in order attempt to provide a phase balanced condition with the next power line in the first ranking.

The second phase balancing protocol may increment or sequence through the second ranking one power line at a time including in sequential order. At each increment within the second ranking, the second phase balancing protocol may compare the current flow of that power line in the second ranking with the current flow of the next power line in the second ranking. One or more first devices associated with the higher-ranked power line in the current comparison (within the second ranking) may be switched in order attempt to provide a phase balanced condition with the next power line in the second ranking.

The first phase balancing protocol is always executed in relation to the first aspect. However, the second phase balancing protocol is only executed upon occurrence of a first condition. Generally, this "first condition" may be characterized as the first phase balancing protocol having failed in at least some respect in relation to phase balancing the power lines of the first power transmission section (e.g., failing to achieve a phase balanced condition for all power lines; failing to achieve a phase balanced condition for all power lines within a predetermined amount of time; failing to achieve a phase balanced condition between a pair of power lines; failing to achieve a phase balanced condition between a pair of power lines within a predetermined amount of time).

A second aspect of the present invention is embodied by a method of phase balancing a power transmission system. Current flow is measured on each power line of the above-noted first power transmission section. A first phase balancing protocol is executed. A different and separate second phase balancing protocol may be executed in relation to the first aspect, but first requires an occurrence of a first condition.

The first phase balancing protocol for the second aspect includes generating a first ranking of the plurality of power lines (of the first power transmission section) using a first ordering sequence of current flows (e.g., ranking the current flows on the power lines from low-to-high (in relation to the magnitude of the current flow) or from high-to-low (in relation to the magnitude of the current flow) for purposes of the first ranking). The first power line in the first ranking may be set as a "comparative power line" for purposes of the first balancing protocol for this second aspect. The current flow on the comparative power line is compared to the current flow on the next power line in the first ranking (the power line that immediately follows the comparative power line in the first ranking). If there is a first phase imbalance condition between the comparative power line and the next power line in the first ranking, one of more first devices on the comparative power line will be switched into a first modal configuration (e.g., in an attempt to achieve a phase balanced condition between the comparative power line and the next power line in the first ranking). At some point in time (e.g., when the comparative power line and next power line in the first ranking are phase balanced), the next power line in the first ranking (from the most recent current flow comparison within the first ranking by the first phase balancing protocol) is re-set as the comparative power line, and the noted current flow comparison and switching of one or more first devices into the first modal configuration may be repeated for this new pair of power lines within the first ranking pursuant to the first phase balancing protocol.

The second phase balancing protocol for the second aspect includes generating a second ranking of the plurality of power lines (of the first power transmission section) using a second ordering sequence of current flows (e.g., ranking the current flows on the power lines from low-to-high (in relation to the magnitude of the current flow) or from high-to-low (in relation to the magnitude of the current flow) for purposes of the second ranking). The second ordering sequence (second phase balancing protocol) is the opposite of the first ordering sequence (first phase balancing protocol). The first power line in the second ranking may be set as a "comparative power line" for purposes of the second balancing protocol for this second aspect. The current flow on the comparative power line is compared to the current flow on the next power line in the second ranking (the power line that immediately follows the comparative power line in the second ranking). If there is a second phase imbalance condition between the comparative power line and the next power line in the second ranking, one of more first devices on the comparative power line will be switched into a second modal configuration (e.g., in an attempt to achieve a phase balanced condition between the comparative power line and the next power line in the second ranking). The first and second modal configurations for the first devices may have the opposite effect on the current flow through the corresponding power line. At some point in time (e.g., when the comparative power line and next power line in the second ranking are phase balanced), the next power line (from the most recent current flow comparison within the second ranking by the second phase balancing protocol) is re-set as the comparative power line, and the noted current flow comparison and switching of one or more first devices into the second modal configuration may be repeated for this new pair of power lines in the second ranking pursuant to the second phase balancing protocol.

A number of feature refinements and additional features are applicable to the second aspect of the present invention. These feature refinements and additional features may be used individually or in any combination. The following discussion is applicable to the second aspect, up to the start of the discussion of a third aspect of the present invention. The first phase balancing protocol is always executed in relation to the second aspect. However, the second phase balancing protocol is not executed unless there is an occurrence of a first condition. Generally, this "first condition" may be characterized as the first phase balancing protocol having failed in at least some respect in relation to phase balancing the power lines of the first power transmission section (e.g., failing to achieve a phase balanced condition for all power lines; failing to achieve a phase balanced condition for all power lines within a predetermined amount of time; failing to achieve a phase balanced condition between a pair of power lines; failing to achieve a phase balanced condition between a pair of power lines within a predetermined amount of time).

One characterization of the first phase imbalance condition is a difference between the current flow on the comparative power line and the current flow on the next power line in the first ranking having satisfied a first predetermined threshold. Another characterization of the first phase imbalance condition is the current flow on the comparative power line and the current flow on the next power line in the first ranking having failed to be within a predetermined amperage of each other. Similarly, one characterization of the second phase imbalance condition is a difference between the current flow on the comparative power line and the current flow on the next power line in the second ranking having satisfied a second predetermined threshold. Another characterization of the second phase imbalance condition is the current flow on the comparative power line and the current flow on the next power line in the second ranking having failed to be within a predetermined amperage of each other. The first and second phase imbalance conditions may be defined by a common standard (e.g., a common amperage differential), although such may not always be the case.

The first phase balancing protocol for the second aspect may be characterized as a roll up phase balancing loop, and the second phase balancing protocol for the second aspect may then be characterized as a roll down phase balancing loop. In this case, the first ordering sequence (for the current flows on the power lines within the first ranking) is from low-to-high, switching the first devices on the higher ranked power line(s) within the first ranking into a first modal configuration increases the current flow thereon (to address a phase imbalance condition between two adjacent power lines within the first ranking), the second ordering sequence is from high-to-low (for the current flows on the power lines within the second ranking), and switching the first devices on the higher ranked power line(s) within the second ranking into a second modal configuration decreases the current flow thereon (to address a phase imbalance condition between two adjacent power lines within the second ranking).

The first phase balancing protocol for the second aspect may be characterized as a roll down phase balancing loop, and the second phase balancing protocol for the second aspect may then be characterized as a roll up phase balancing loop. In this case, the first ordering sequence is from high-to-low (for the current flows on the power lines within the first ranking), switching the first devices on the higher ranked power line(s) within the first ranking into a first modal configuration decreases the current flow thereon (to address a phase imbalance condition between two adjacent power lines within the first ranking), the second ordering sequence is from low-to-high (for the current flows on the power lines within the second ranking), and switching the first devices on the higher ranked power line(s) within the second ranking into a second modal configuration increases the current flow thereon (to address a phase imbalance condition between two adjacent power lines within the second ranking).

The first and second phase balancing protocols each may be characterized as incrementing through their respective rankings one power line at a time, where on each such increment the current flows on an adjacent pair of power lines within the respective ranking are compared pursuant to the respective phase balancing protocol (e.g., the current flow comparison provided by each of the first and second phase balancing protocols may be repeated for the entirety of their respective rankings). If a phase imbalance condition is identified between a pair of power lines within the respective ranking by the respective phase balancing protocol, the current flow on the higher ranked power line of the two power lines that are being compared by the respective phase balancing protocol may be adjusted (increased or decreased, namely by switching one or more first devices into the modal configuration that is associated with the respective phase balancing protocol). If there are one or more power lines within the respective ranking that are higher ranked in relation to the two power lines that are being compared by the respective phase balancing protocol, the current flow on each such higher ranked power line may be similarly adjusted (increased or decreased, and by switching one or more first devices into the modal configuration that is associated with the respective phase balancing protocol). That is if a phase imbalance condition exists between two power lines within, a given ranking, no changes are made in relation to the modal configuration of the first devices on the lowest ranked power line of the two power lines that are being compared by the respective phase balancing protocol, but the current flow may be adjusted in at least substantially the same manner on every other higher ranked power line within the respective ranking by the respective phase balancing protocol. For instance, the current flow on each of the higher ranked power lines within the respective ranking may be increased by at least substantially the same amount (through changing the modal configuration of one or more first devices on each such power line). The current flow on each of the higher ranked power lines within the respective ranking may be decreased by at least substantially the same amount (through changing the modal configuration of one or more first devices on each such power line).

The first phase balancing protocol may be characterized as phase balancing power lines in the first ranking two power lines at a time, and proceeding from top-to-bottom within the first ranking (the first ranking again being defined by a first ordering sequence). If one or more first devices on one of the power lines are switched into a first modal configuration to address a phase imbalance condition between two power lines within the first ranking pursuant to the first phase balancing protocol of the second aspect, one or more first devices on all other higher ranked power lines within the first ranking may be switched into the first modal configuration as well. Failing to do so may create a phase imbalance condition between two power lines within the first ranking that were previously in a phase balanced condition according to the first phase balancing protocol of the second aspect.

The second phase balancing protocol may be characterized as phase balancing power lines in the second ranking two power lines at a time, and proceeding from top-to-bottom within the second ranking (the second ranking again being defined by a second ordering sequence, that is opposite of the first ordering sequence used by the first phase balancing protocol). If one or more first devices on one of the power lines are switched into a second modal configuration to address a phase imbalance condition between two power lines within the second ranking pursuant to the second phase balancing protocol of the second aspect, one or more first devices on all other higher ranked power lines within the second ranking may be switched into the second modal configuration as well. Failing to do so may create a phase imbalance condition between two power lines within the second ranking that were previously in a phase balanced condition according to the second phase balancing protocol of the second aspect.

The first phase balancing protocol of the second aspect is subject to an alternate characterization (versus the "comparative power line" and "next power line" set forth in the introduction to the second aspect). The second power line in the first ranking may be characterized as a "baseline power line." The current flow on the baseline power line may be compared with the current flow on the immediately preceding power line in the first ranking by the first phase balancing protocol. If a first phase imbalance condition exists between these two power lines, at least one first device may be switched into the first modal configuration for each power line in the first ranking that has a higher ranking than the baseline power line (e.g., to increase or decrease the current flow on each such power line by at least substantially the same amount). This may be repeated until the first phase imbalance condition no longer exists between the baseline power line and the immediately preceding power line in the first ranking. In any case, the first phase balancing protocol may at some point in time proceed to the power line in the first ranking that immediately follows the baseline power line noted above, and this power line then becomes the baseline power line for repetition in accordance with the foregoing. This may be repeated for the entirety of the first ranking (e.g., the last execution of the first phase balancing protocol will be for when the last power line in the first ranking is the baseline power line).

The second phase balancing protocol of the second aspect is also subject to an alternate characterization (versus the "comparative power line" and "next power line" set forth in the introduction to the second aspect). The second power line in the second ranking may be characterized as a "baseline power line." The current flow on the baseline power line may be compared with the current flow on the immediately preceding power line in the second ranking by the second phase balancing protocol. If a second phase imbalance condition exists between these two power lines, at least one first device may be switched into the second modal configuration for each power line in the second ranking that has a higher ranking than the baseline power line (e.g., to increase or decrease the current flow on each such power line by at least substantially the same amount). This may be repeated until the second phase imbalance condition no longer exists between the baseline power line and the immediately preceding power line in the second ranking. In any case, the second phase balancing protocol may at some point in time proceed to the power line in the second ranking that immediately follows the baseline power line noted above, and this power line then becomes the baseline power line for repetition in accordance with the foregoing. This may be repeated for the entirety of the second ranking (e.g., the last execution of the second phase balancing protocol will be for when the last power line in the second ranking is the baseline power line).

A "timeout" functionality could be utilized in relation to the second aspect. For instance, there could be a predetermined time in which a phase balanced condition would need to be realized between two power lines in the first ranking by the first phase balancing protocol. If a phase balanced condition is not realized within such a predetermined time, control could transfer to the second phase balancing protocol. There could be a predetermined time in which a phase balanced condition would need to be realized for all power lines in the first ranking by the first phase balancing protocol. If a phase balanced condition is not realized within such a predetermined time, control could transfer to the second phase balancing protocol. There could be a predetermined time in which a phase balanced condition would need to be realized between two power lines in the second ranking by the second phase balancing protocol. If a phase balanced condition is not realized within such a predetermined time, control could transfer back to the first phase balancing protocol. There could be a predetermined time in which a phase balanced condition would need to be realized for all power lines in the second ranking by the second phase balancing protocol. If a phase balanced condition is not realized within such a predetermined time, control could transfer back to the first phase balancing protocol.

A third aspect of the present invention is embodied by a method of phase balancing a power transmission system. Current flow is measured on each power line of the above-noted first power transmission section. These current flow measurements are used to determine if a phase imbalance condition exists in relation to one or more of the power lines in the first power transmission section. A first data structure includes a plurality of stored phase imbalance conditions. Each stored phase imbalance condition in the first data structure includes a phase balancing set of first devices and a corresponding modal configuration for each such first device in the phase balancing set. A phase imbalance condition that is identified in the first power transmission section may be located in the first data structure. The first devices within the phase balancing set for the particular stored phase imbalance condition are then disposed in the modal configuration that is set forth in the first data structure for the particular stored phase imbalance condition. Thereafter, at least one phase balancing protocol may be executed.

A number of feature refinements and additional features are applicable to the third aspect of the present invention. These feature refinements and additional features may be used individually or in any combination. The following discussion is applicable to at least this third aspect. The modal configuration, for each first device of the phase balancing set for each stored phase imbalance condition in the first data structure (e.g., a lookup table), may be either the above-noted first mode or second mode. Switching a given first device from its first mode to its second mode may be one of a current-increasing modal configuration or a current-decreasing modal configuration. Switching a given first device from its second mode to its first mode may be the other of the current-increasing modal configuration or the current-decreasing modal configuration.

The first power transmission section may include a reactance module array that is defined by a plurality of first devices. The phase balancing set for one or more of the stored phase imbalance conditions within the first data structure may use one or more of these first devices. In one embodiment, the first data structure is located in one or more reactance module array controllers associated with the first power transmission section. Such a reactance module array controller may be configured to communicate with and control each first device of its corresponding reactance module array.

At least one phase balancing protocol is executed in the case of the third aspect, after an initial attempt at phase balancing has been undertaken using phase balancing information from the first data structure. It may be that the initial attempt at phase balancing using phase balancing information from the first data structure will reduce the time for the phase balancing protocol to phase balance the power lines. In any case, a single phase balancing protocol may be used by the third aspect, and such a phase balancing protocol may be in accordance with any of the individual phase balancing protocols set forth above in relation to the first and/or second aspects. The second aspect may also be used in combination with an initial phase balancing attempt by using phase balancing information from the first data structure.

A number of feature refinements and additional features are separately applicable to each of above-noted first, second, and third aspects of the present invention. These feature refinements and additional features may be used individually or in any combination in relation to each of the above-noted first, second, and third aspects of the present invention. Initially, each aspect may be executed on any appropriate basis, including continuously, intermittently, periodically, and the like.

Each aspect of the present invention may utilize a reactance module that is to be installed on a power line. A transformer may be defined when a reactance module is mounted on a power line (e.g., a single turn transformer). The primary of this transformer may be the power line itself. The secondary for this transformer may be one or more windings of a core for the reactance module (e.g., a first winding wrapped around a first core section of the reactance module, a second winding wrapped around a second core section of the reactance module, or both for the case when the first winding and second winding are electrically connected).

A given reactance module may be configured to selectively inject reactance into the corresponding power line (the power line on which the reactance module is mounted). Such a reactance module could be configured to selectively inject inductance into the corresponding power line (e.g., to reduce the current or power flow through the power line, or a current-decreasing modal configuration for the reactance module). Such a reactance module could be configured to inject capacitance into the corresponding power line (e.g., to increase the current or power flow through the power line, or a current-increasing modal configuration for the reactance module).

A reactance module may include any appropriate switch architecture for switching between two different modes of operation. A reactance module may include one or more processors disposed in any appropriate processing architecture to control operation of any such switch architecture. In a first mode, a reactance module may be configured to inject little or no reactance into the corresponding power line (e.g., a bypass or monitoring mode). In a second mode, a reactance module may be configured to inject substantially more reactance into the corresponding power line compared to the first mode (e.g., an injection mode).

Any feature of any other various aspects of the present invention that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular (e.g., indicating that a DSR includes "an antenna" alone does not mean that the DSR includes only a single antenna). Moreover, any failure to use phrases such as "at least one" also does not limit the corresponding feature to the singular (e.g., indicating that a DSR includes "an antenna" alone does not mean that the DSR includes only a single antenna). Use of the phrase "at least generally" or the like in relation to a particular feature encompasses the corresponding characteristic and insubstantial variations thereof (e.g., indicating that a structure is at least generally cylindrical encompasses this structure being cylindrical). Finally, a reference of a feature in conjunction with the phrase "in one embodiment" does not limit the use of the feature to a single embodiment.

BRIEF DESCRIPTION OF THE FIGURES

FIG. 2A is a perspective view of one end of an embodiment of a line-mountable reactance module.

FIG. 2B is a perspective view of an opposite end of the reactance module of FIG. 2A.

FIG. 3 is an exploded, perspective view of the reactance module of FIGS. 2A/2B.

FIG. 4E is a perspective view of the interior of one of the lower end caps that is attached to the lower housing section, illustrating an antenna housing disposed therein.

FIG. 4F is an enlarged, perspective view of an insert for an antenna disposed at one of the ends of the reactance module of FIGS. 2A/2B.

FIG. 5C is a cross-sectional view showing the upper core assembly seated within the upper housing section, and taken perpendicularly to the length dimension of the reactance module of FIGS. 2A/2B.

FIG. 6A is a perspective view of the lower core assembly from the reactance module of FIGS. 2A/2B.

FIG. 6C is a perspective view of the lower core section for the lower core assembly from the reactance module of FIGS. 2A/2B, illustrating the faces of the lower core segments that collectively define the lower core section (before installing the noted spacers).

FIG. 7C is a bottom perspective view of the upper core section for the upper core assembly from the reactance module of FIGS. 2A/2B, illustrating spacers installed on faces of the individual lower core segments that collectively define the lower core section.

FIG. 7D is a bottom perspective view of the upper core section for the upper core assembly from the reactance module of FIGS. 2A/2B, illustrating the faces of the individual upper core segments that collectively define the upper core section (before installing the noted spacers).

FIG. 12D is a diagram of a system condition/contingency data structure that may be incorporated by DSR array controllers from the power transmission system of FIG. 12A.

FIG. 13E is a diagram of a data structure having stored phase imbalance conditions that may be used by the phase balancing protocol of FIG. 13D.

DETAILED DESCRIPTION

Figure 1:
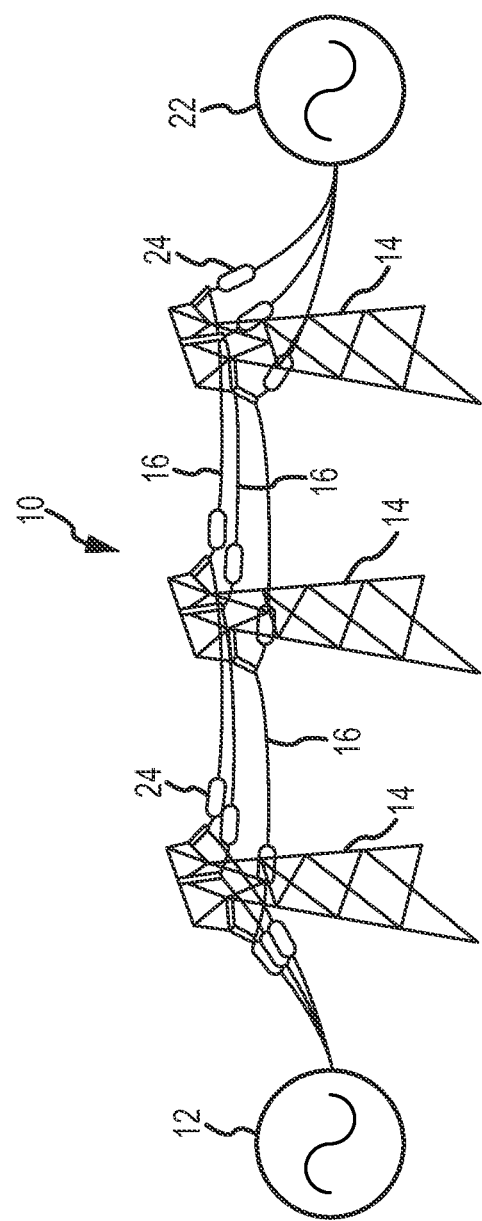
FIG. 1 is a schematic of one embodiment of a power transmission system having line-mounted reactance modules.

One embodiment of a power transmission system is illustrated in FIG. 1 as identified by reference numeral 10. The power transmission system 10 includes a plurality of power lines 16 (three in the illustrated embodiment, for providing three-phase power) that extend between an electric power source 12 and a load 22. Any appropriate number of electrical power sources 12 and loads 22 may be associated with the power transmission system 10. A plurality of towers 14 of any appropriate size, shape, and/or configuration may support the various power lines 16 at appropriately spaced locations. The power lines 16 may be of any appropriate type, for instance power transmission lines (larger capacity) or distribution lines (lower capacity).

A plurality of distributed series reactors (DSRs) or "reactance modules" are installed on each of the power lines 16 of the power transmission system 10, and are identified by reference numeral 24. Any appropriate number of DSRs 24 may be installed on a given power line 16 and using any appropriate spacing. Each DSR 24 may be installed on a power line 16 at any appropriate location, including in proximity to an insulator. Generally, each DSR 24 may be configured/operated to inject reactance (e.g., inductance, capacitance) into the corresponding power line 16. That is, a given DSR 24 may be of a configuration so as to be able to inject inductance into the power line 16 on which it is mounted (e.g., the injected reactance may be an inductive reactance or inductance, which may reduce the flow of current through the power line 16 on which the DSR 24 is mounted). A given DSR 24 may also be of a configuration so as to be able to inject capacitance into the power line 16 on which it is mounted (e.g., the injected reactance may be a capacitive reactance or capacitance, which may increase the flow of current through the power line 16 on which the DSR 24 is mounted).

FIGS. 2A, 2B, and 3 illustrate a representative configuration for the DSRs 24 presented in FIG. 1, and which is identified by reference numeral 30. Generally, the configuration of the DSR 30 presented herein is of the type that provides for the injection of inductance into a power line 16 on which it is mounted. However and as in the case of the DSR 24 discussed above, the DSR 30 could be configured so as to inject capacitance into the power line 16 on which it is mounted (not shown).

The DSR 30 of FIGS. 2A, 2B, and 3 is configured for installation on a power line 16 without requiring a break in the same. In this regard, a housing 40 of the DSR 30 includes a first or lower housing section 80 and a second or upper housing section 120 that are detachably connected in any appropriate fashion. A first or lower end cap 90 and a second or upper end cap 124 of the housing 40 are positioned on one end 42 (e.g., a power end) of the DSR 30, and another lower end cap 90 and upper end cap 124 are positioned at the opposite end 44 (e.g., a control end) of the housing 40. As will be discussed in more detail below, the DSR 30 uses a pair of cavity-backed slot antennas 100 (e.g., FIGS. 4E, 4F, and 4G), one being positioned at least generally at each end 42, 44 of the DSR 30. As such, a slot 94 for the antenna 100 extends through the wall thickness of the housing 40 at each of its ends 42, 44.

The housing 40 of the DSR 30 at least substantially encloses a core assembly 50 (e.g., in the form of a single turn transformer). A first or lower core assembly 130 is disposed within the lower housing section 80 (e.g., within a compartment 86), while a second or upper core assembly 160 is disposed within the upper housing section 120. The lower core assembly 130 includes a first or lower winding 144, while the upper core assembly 160 includes a second or upper winding 174. The windings 144, 174 may be electrically interconnected in any appropriate manner. The lower core assembly 130 and the upper core assembly 160 are collectively disposed about the power line 16 on which the DSR 30 is installed. When the core assembly 50 is installed on a power line 16, it collectively defines a single turn transformer, where the primary of this single turn transformer is the power line 16, and where the secondary of this single turn transformer is defined by the windings 144, 174 for the illustrated embodiment. However, the secondary of this single turn transformer could be comprised of only the lower winding 144 or only the upper winding 174. For example, the lower core assembly 130 may include the lower winding 144, and the upper core assembly 160 may not include the upper winding 174. Similarly, the lower core assembly 130 may not include the lower winding 144, and the upper core assembly 160 may include the upper winding 174. As such, the primary of the noted single turn transformer is the power line 16, and the secondary of this single turn transformer may be the lower winding 144 by itself, may be the upper winding 174 by itself, or collectively may be the lower winding 144 and the upper winding 174. Furthermore, while the power line 16 is described herein as the primary winding and some combination of the lower and upper windings 144, 174 are described herein as the secondary winding, as that may be conventional when describing the power line 16 when it is part of a single-turn transformer, for the purposes of the device 202 to be described herein, one could refer to the combination of the lower and upper windings 144, 174 as the primary winding and the power line 16 as the secondary winding. In each case, the function is the same.

The housing 40 of the DSR 30 also at least substantially encloses electronics 200 for undertaking various operations of the DSR 30. The electronics 200 are disposed within the lower housing section 80, and are separated from the lower core assembly 130 by a partition or barrier 82. This partition 82 may provide shielding for the electronics 200, such as shielding against electromagnetic interference. Any appropriate shielding material may be utilized for the partition 82.

A pair of first or lower clamps 64 are associated with the lower core assembly 130, and may be anchored relative to the lower housing section 80 in any appropriate manner. A pair of second or upper clamps 66 are associated with the upper core assembly 160, and may be anchored relative to the upper housing section 120 in any appropriate manner. Although the clamps 64, 66 could directly engage the power line 16, in the illustrated embodiment a pair of line guards 20 are mounted on the power line 16 at locations that correspond with the position of each pair of clamps 64/66.

Figure 4A:
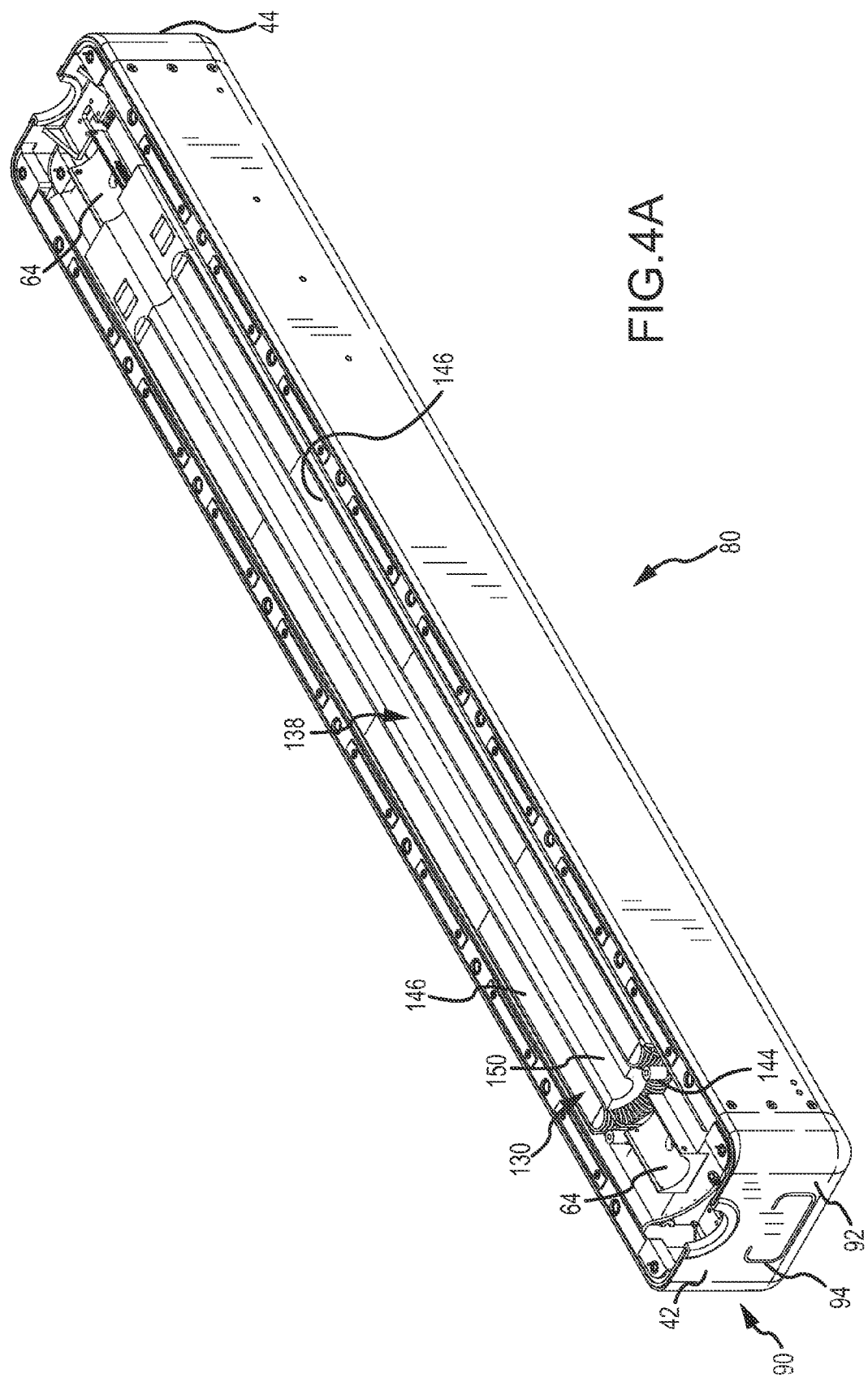
FIG. 4A is a perspective view of a lower core assembly positioned within a lower housing section from the reactance module of FIGS. 2A/2B.
Figure 4B:
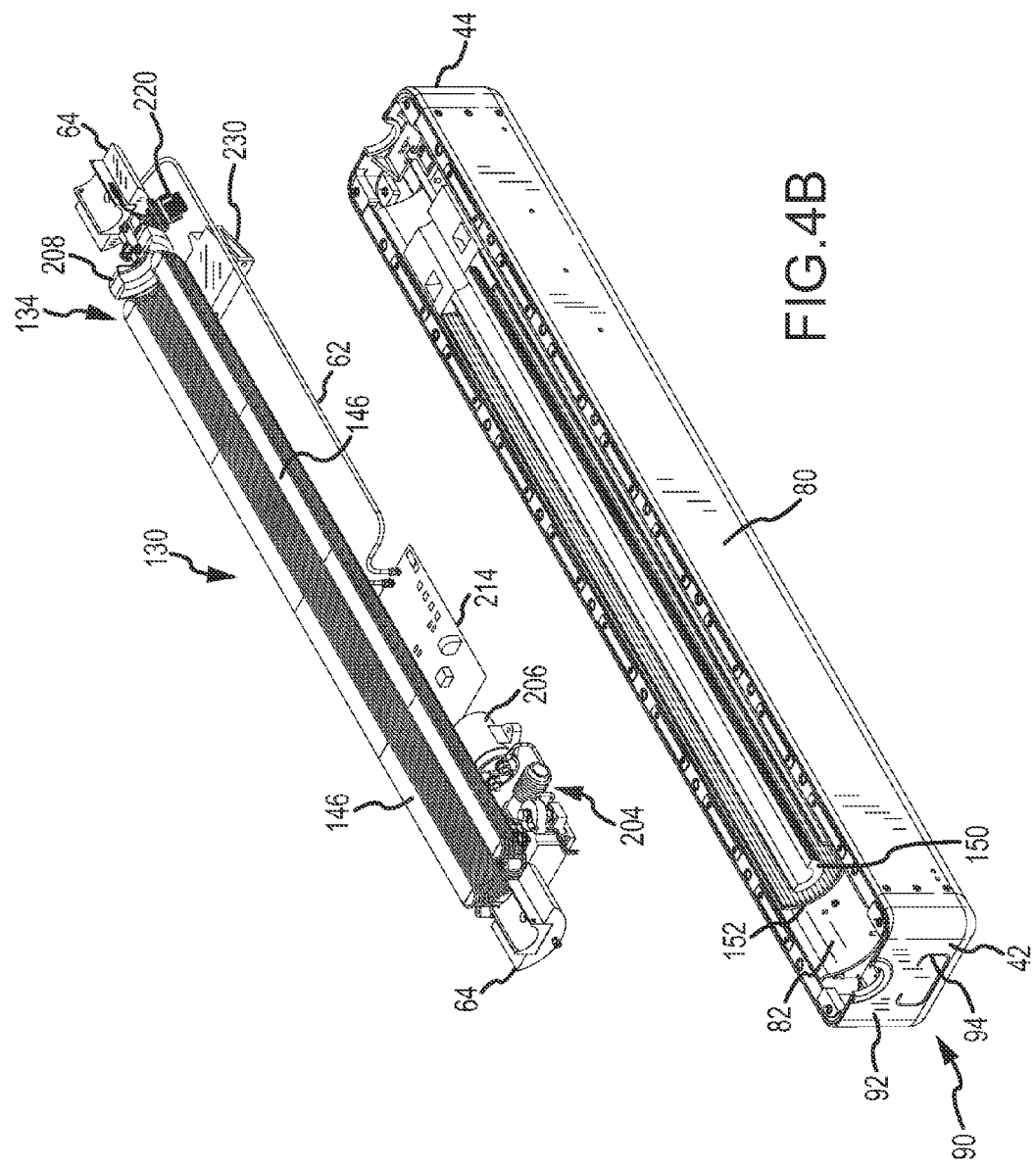
FIG. 4B is an exploded, perspective view of the lower core assembly and lower housing section from the reactance module of FIGS. 2A/2B.

Additional views of the lower housing section 80 and lower core assembly 130 are presented in FIGS. 4A-4G. FIG. 4A shows the lower core assembly 130 being positioned within the lower housing section 80, while FIG. 4B shows the lower core assembly 130 being exploded away from the lower housing section 80. A barrier or partition 82 is associated with the lower housing section 80, and defines a lower or electronics compartment 84 and an upper or core compartment 86 (e.g., FIG. 4C). In one embodiment, the electronics compartment 84 is at least substantially waterproof. Moreover and as noted, the electronics compartment 84 may be shielded from the core assembly 50, for instance by the above-noted barrier or partition 82. In any case, the electronics 200 are disposed within the electronics compartment 84, while the lower core assembly 130 is disposed within the core compartment 86.

Figure 4C:
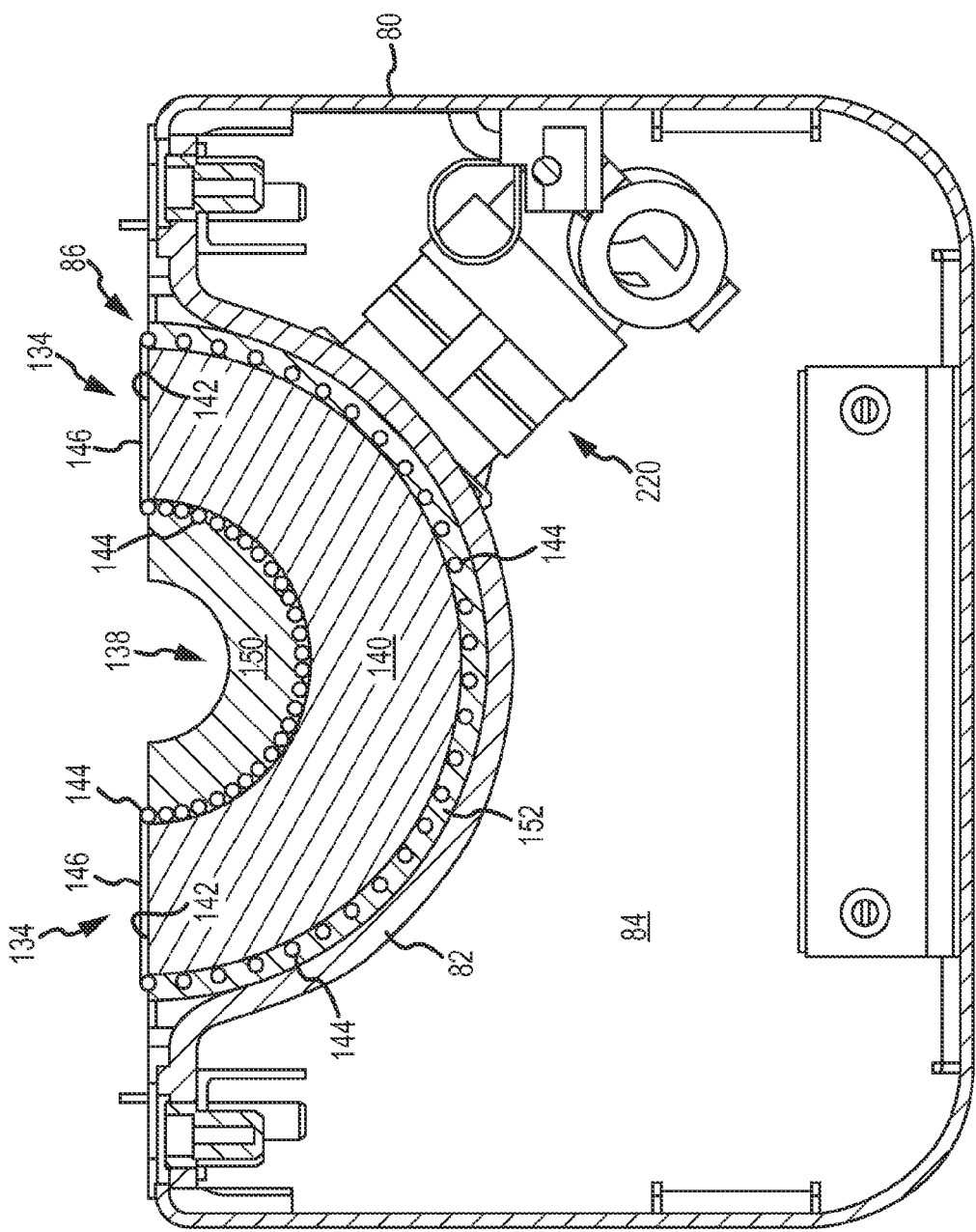
FIG. 4C is a cross-sectional view showing the lower core assembly seated within the lower housing section, and taken perpendicularly to the length dimension of the reactance module of FIGS. 2A/2B.
Figure 4D:
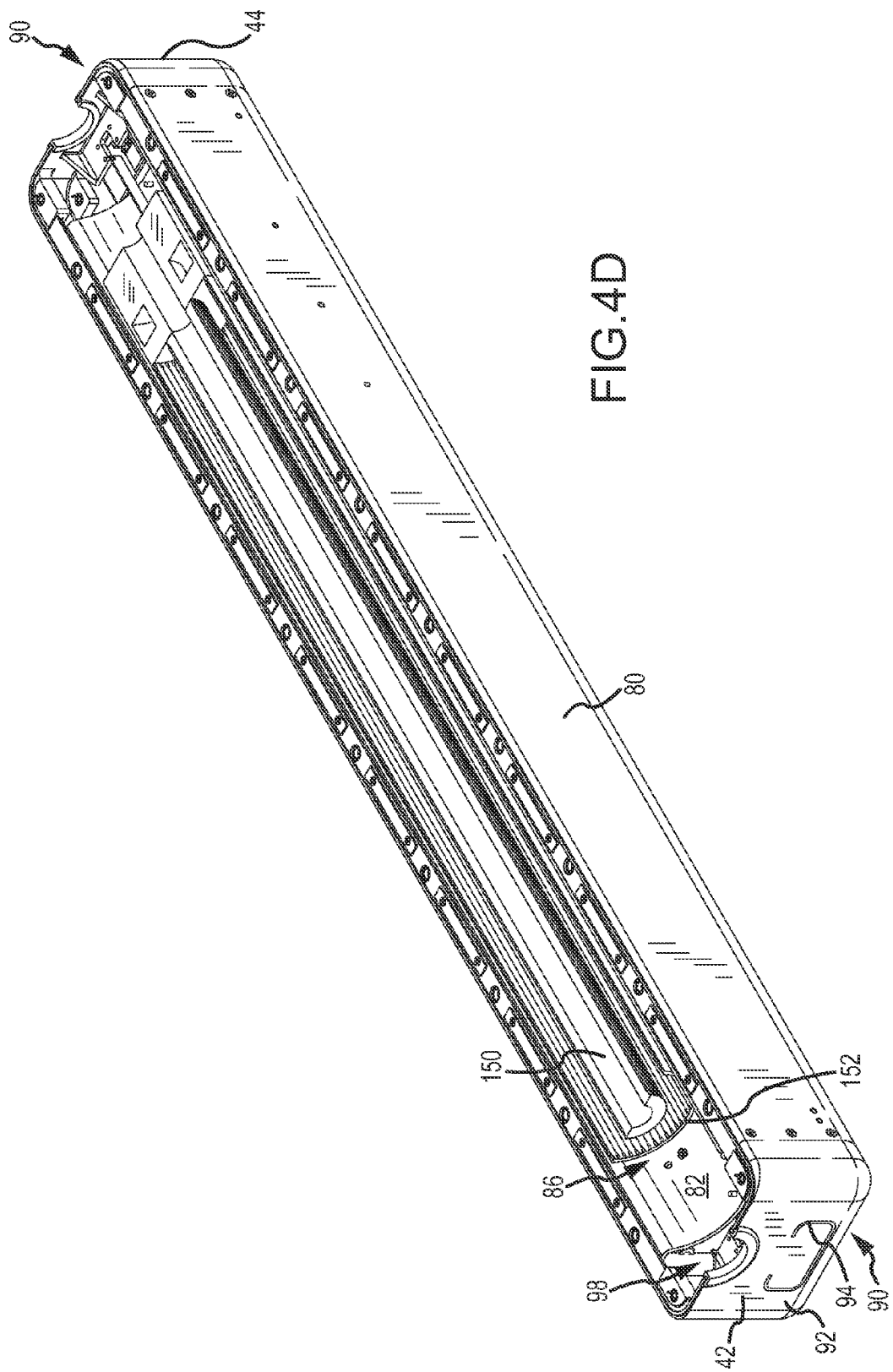
FIG. 4D is an enlarged, perspective view of the lower housing section from the reactance module of FIGS. 2A/2B, and illustrating the encapsulating sections for the lower core assembly.

The lower core assembly 130 is retained by encapsulating sections 150, 152 within the lower housing section 80 (e.g., FIGS. 4B, 4C, and 4D). In one embodiment, the encapsulating sections 150, 152 are each in the form of a silicone elastomer encapsulant such as Sylgard® available from Dow Corning (the Sylgard® for the encapsulating sections 150, 152 may be matched to the dielectric and operational performance rating of the DSR 30). The encapsulating section 152 is disposed between the lower core assembly 130 and the partition 82 of the lower housing section 80. The encapsulating section 150 is disposed between the lower core assembly 130 and the power line 16. A first or lower power line cavity 138 extends along the length of the lower core assembly 130 (within the encapsulating section 150) for receiving a lower portion of the corresponding power line 16. FIG. 4D shows the relative position of the encapsulating sections 150, 152, with the lower core assembly 130 being removed to show this relative position.

A pair of first or lower end caps 90 are disposed at each of the two ends 42, 44 of the DSR 30, and are each detachably connected in any appropriate manner to the lower housing section 80. Each lower end cap 90 includes an end wall 92. A slot 94 extends through the entire thickness of the end wall 92, may be of any appropriate shape, and is part of the associated antenna 100. The slot 94 may be characterized as having a "folded configuration" to provide for a desired length. An antenna compartment 98 is disposed within each lower end cap 90. An end plate 88 (FIG. 4F) separates this antenna compartment 98 from the electronics compartment 84. Generally, each antenna 100 utilizes an aperture that extends through the housing 40 of the DSR 30, and this aperture may be of any appropriate shape/size, and may be incorporated in any appropriate manner (e.g., such an aperture could actually project downwardly when the DSR 30 is installed on a power line 16).

Figure 4G:
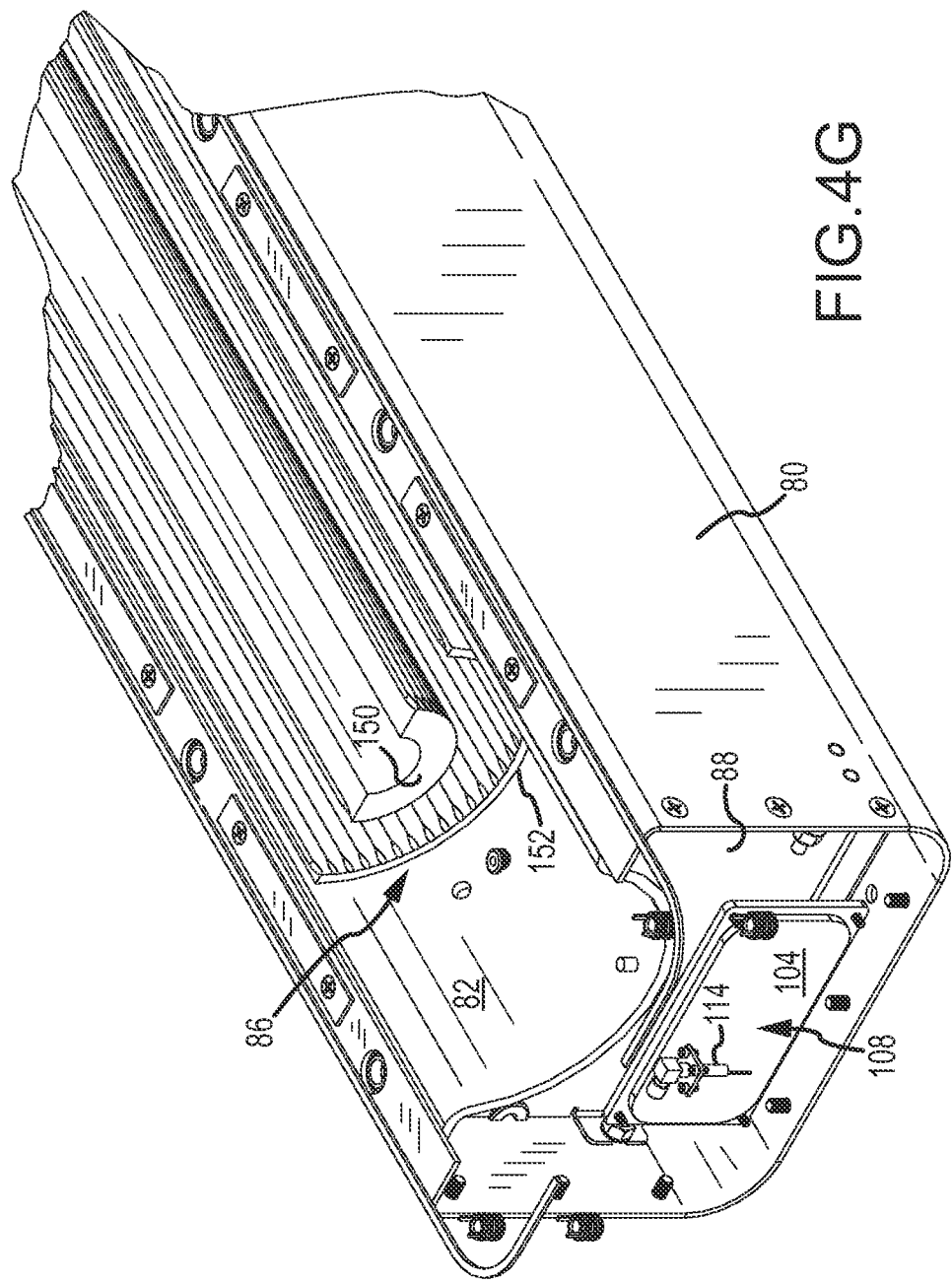
FIG. 4G is an enlarged, perspective view of an internal cavity for an antenna disposed at one of the ends of the reactance module of FIGS. 2A/2B, illustrating an exciter or probe of the antenna.

Other components of the antenna 100 are illustrated in FIGS. 4E, 4F, and 4G. Again, an antenna 100 is located at least generally at the two ends 42, 44 of the DSR 30 in the illustrated embodiment, with each antenna 100 being located within its corresponding antenna compartment 98. Each antenna 100 includes an antenna housing 102 of any appropriate size/shape and which may be formed from any appropriate material or combination of materials. The antenna housing 102 includes a back section 104, along with a plurality of side sections 106 (four in the illustrated embodiment) that extend to the back side of the end wall 92 of the corresponding lower end cap 90. As such, the end wall 92 of the corresponding lower end cap 90 may be characterized as defining an end of the antenna housing 102 that is disposed opposite of the back section 104.

An insert 110 (FIG. 4F) may be disposed within the antenna housing 102. This insert 110 may be formed from any appropriate material, for instance Teflon®. An insert 110 may not be required in all instances. In any case, a projection 112 may be formed on an end of the insert 110, and extends into the slot 94 on the end wall 92 of its corresponding lower end cap 90. The antenna housing 102 defines an internal cavity 108 having an exciter or probe 114. The antenna 100 may be characterized as a slotted antenna or as a cavity-backed slot antenna. Notably, neither antenna 100 protrudes beyond an outer perimeter of the housing 40 for the DSR 30.

Figure 4H:
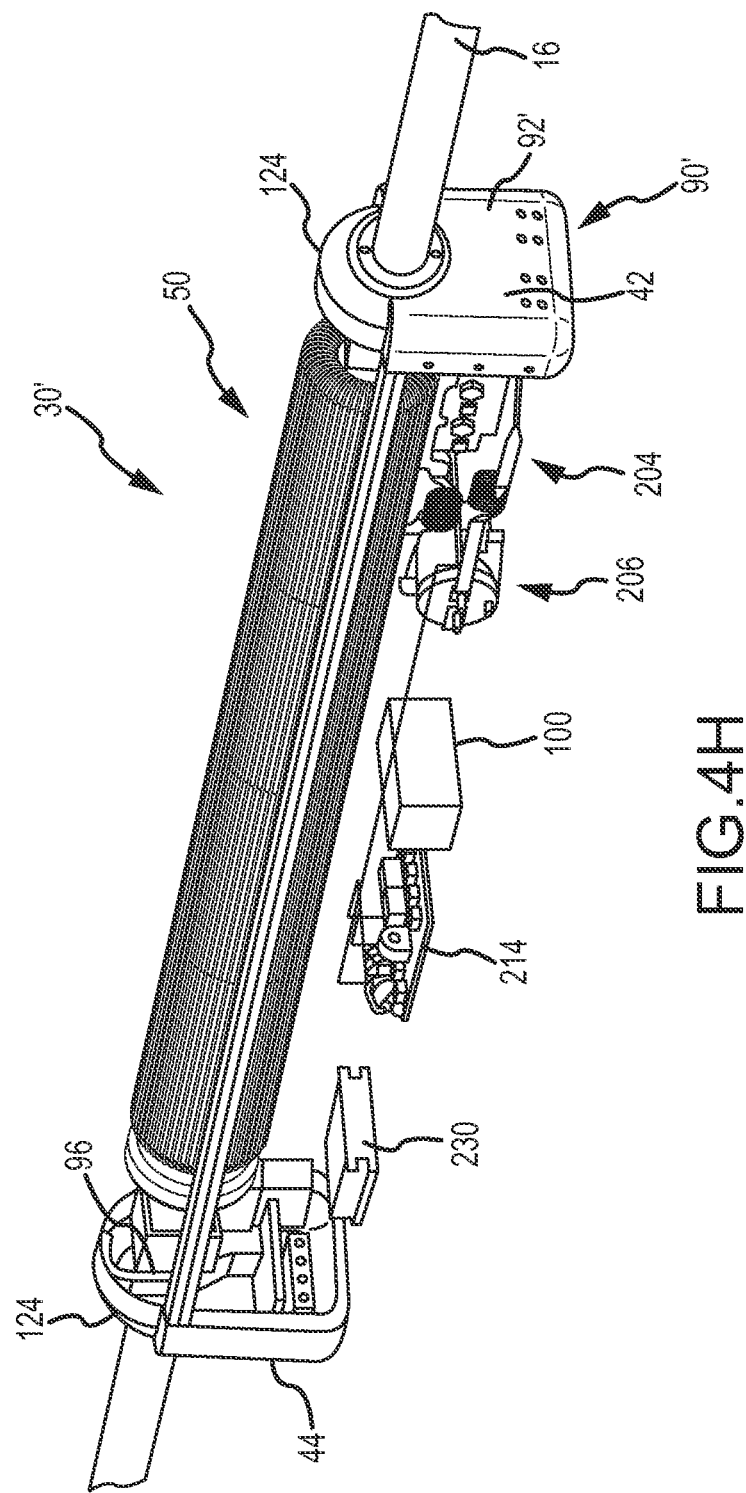
FIG. 4H is a perspective view of a variation of the lower housing section from the reactance module of FIGS. 2A/2B, and which incorporates installation hooks.

A variation of the DSR 30 is presented in FIG. 4H in the form of a DSR 30'. Corresponding components of these two embodiments are identified by the same reference numerals. Those corresponding components that differ are further identified by a "single prime" designation in FIG. 4H. Unless otherwise noted, the DSR 30' includes the same features as the DSR 30.

One difference between the DSR 30 and the DSR 30' is that there is a single antenna 100 in the case of the DSR 30' of FIG. 4H. This single antenna 100 may be disposed at an appropriate location between the ends 42, 44 of the DSR 30 (e.g., within the housing 40). In the illustrated embodiment, the antenna 100 is disposed at least generally midway between the ends 42, 44 of the DSR 30'. Relatedly, the end wall 92' of the two lower end caps 90' need not include a slot 94. Instead, a similar slot would be included on the bottom of the housing 40 to accommodate the antenna 100 for the DSR 30' (i.e., on the surface of the first housing section 80 that projects in a downward direction when the DSR 30' is installed on a power line 16).

Another difference between the DSR 30 and the DSR 30' of FIG. 4H is that the DSR 30' includes a pair of installation hooks 96. One installation hook 96 may be disposed within the lower end cap 90' at each of the ends 42, 44 of the DSR 30'. Each installation hook 96 may be anchored in any appropriate manner relative to the first housing section 80 of the DSR 30'. That is, the installation hooks 96 will move collectively with the lower housing section 80 during installation of the DSR 30' on a power line 16. It should be appreciated that the installation hooks 96 could also be integrated into the structure of the DSR 30 in any appropriate manner.

The installation hooks 96 facilitate installation of the DSR 30' on a power line 16. Generally, the first housing section 80 of the DSR 30' may be suspended from a power line 16 by disposing each of the installation hooks 96 on the power line 16 (the installation hooks 96 engaging the power line 16 at locations that are spaced along the length of the power line 16; the installation hooks 96 could be positioned directly on the power line 16, or on a corresponding line guard 20). The second housing section 120 may then be positioned over each of the power line 16 and the first housing section 80. At this time, the second housing section 120 may be supported by the power line 16 and/or the first housing section 80.

With the second housing section 120 being properly aligned with the first housing section 80, a plurality of fasteners may be used to secure the second housing section 120 to the first housing section 80. As the second housing section 120 is being connected to the first housing section 80, (e.g., as the various fasteners are rotated), the first housing section 80 may be lifted upwardly in the direction of the second housing section 120, which in turn will lift the installation hooks 96 (again, fixed relative to the first housing section 80) off of the power line 16. Ultimately, the installation hooks 96 are received within the hollow interior of the second or upper end caps 124 of the second housing section 120. Once the second housing section 120 and the first housing section 80 are appropriately secured together, both installation hooks 96 will be maintained in spaced relation to the power line 16.

Figure 5A:
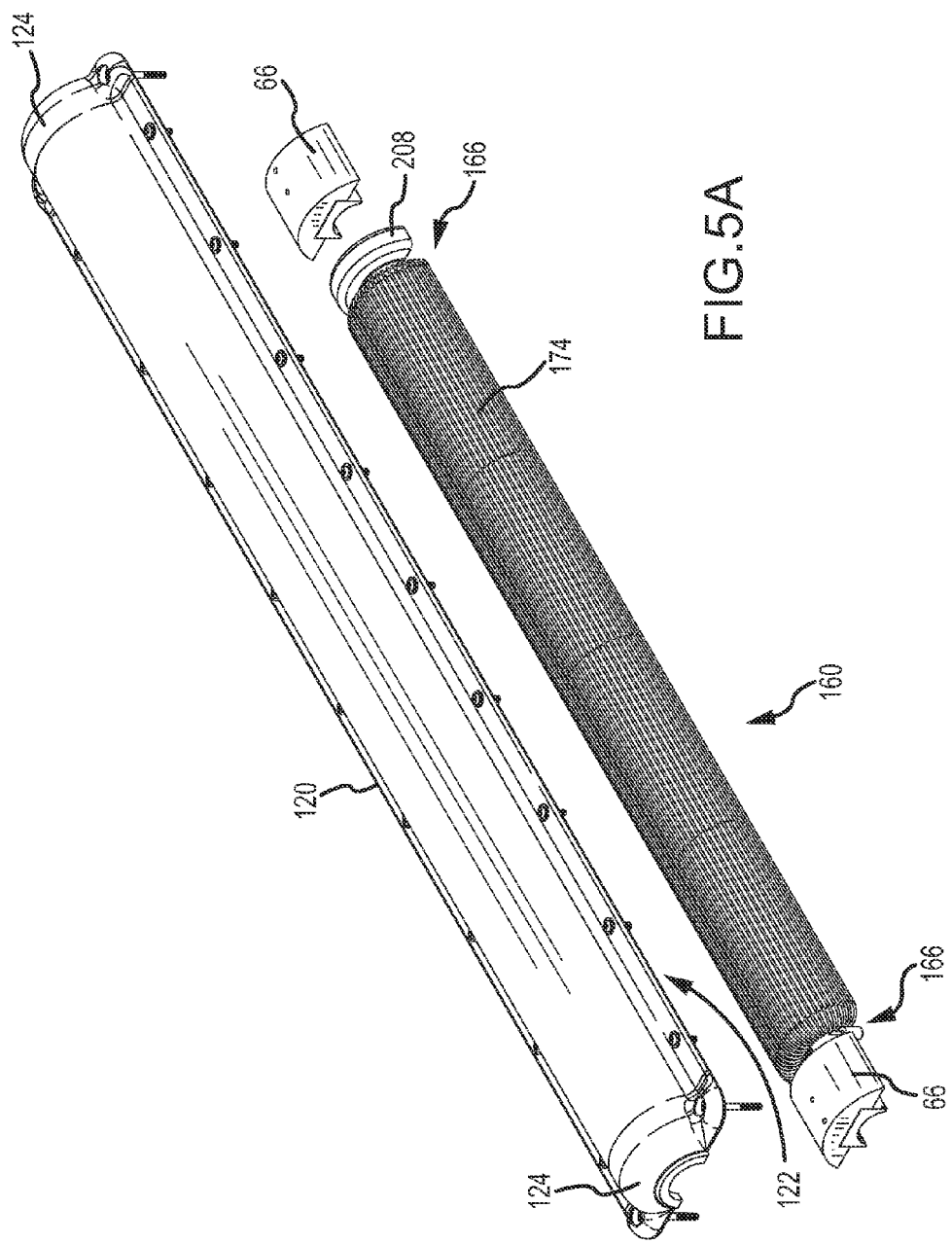
FIG. 5A is an exploded, perspective view of an upper core assembly and upper housing section from the reactance module of FIGS. 2A/2B.
Figure 5B:
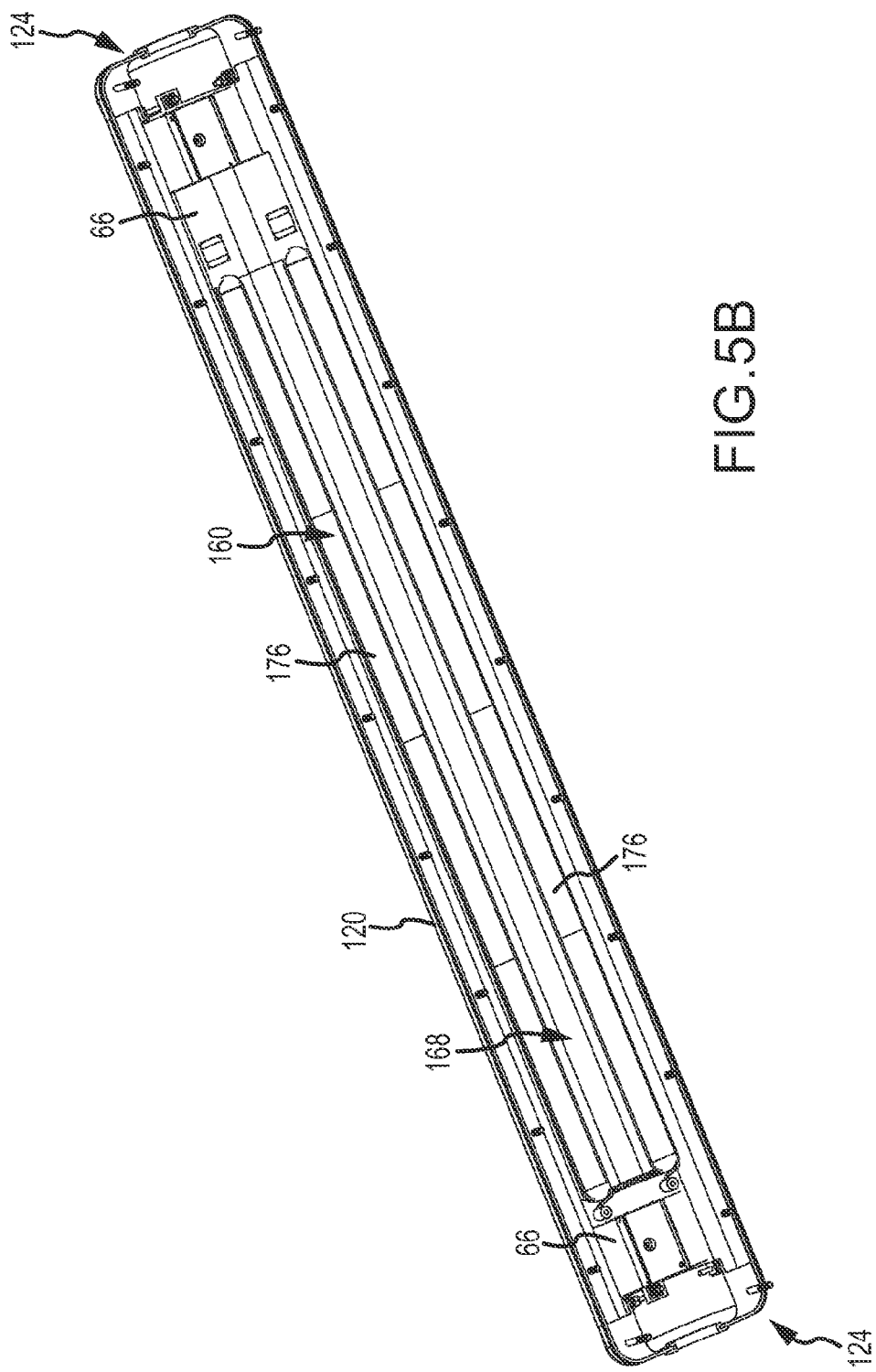
FIG. 5B is a bottom view of the upper core assembly seated within the upper housing section from the reactance module of FIGS. 2A/2B.

Additional views of the upper housing section 120 and upper core assembly 160 are presented in FIGS. 5A-5D. FIG. 5A shows the upper core assembly 160 being exploded away from the upper housing section 120 (the upper core assembly 160 being received within a core compartment 122 of the upper housing section 120), while FIG. 5B shows the upper core assembly 160 being positioned within the upper housing section 120 (more specifically within the core compartment 122). A pair of second or upper end caps 124 are detachably connected to opposite ends of the upper housing section 120 and define corresponding portions of the two ends 42, 44 of the DSR 30.

Figure 5D:
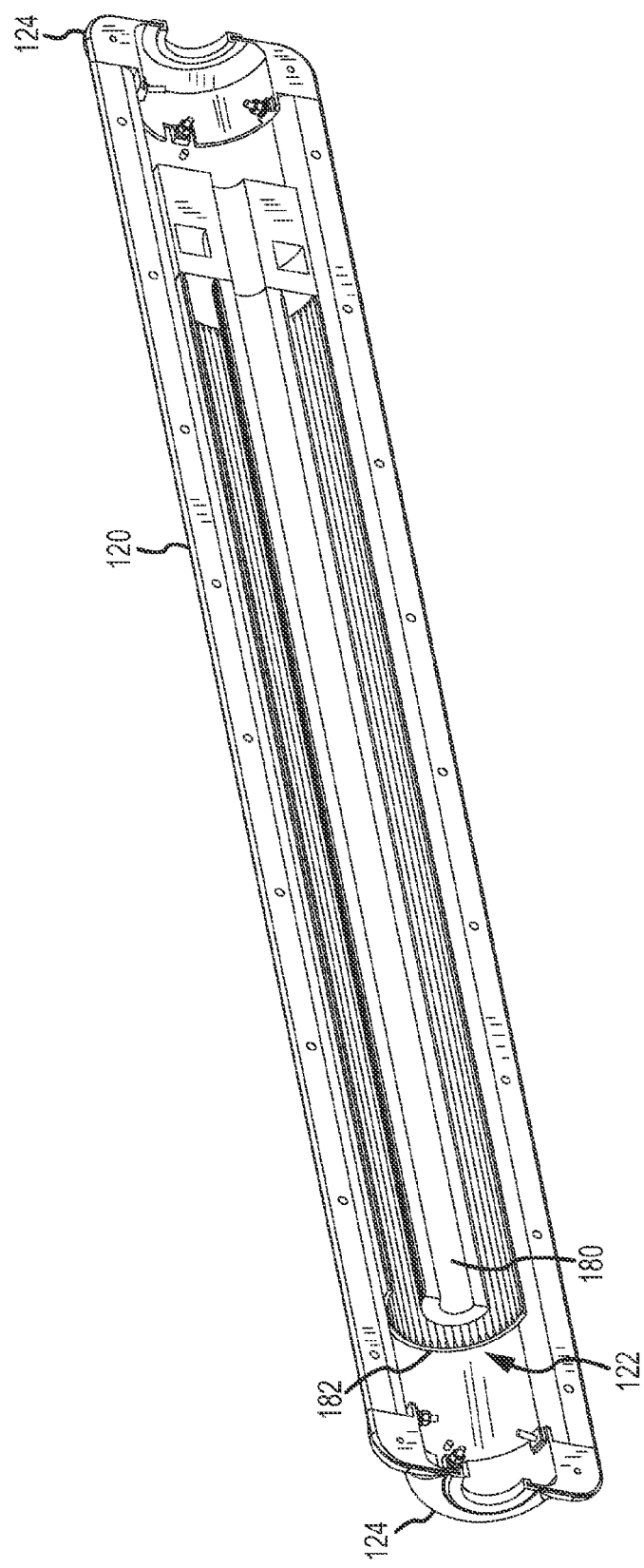
FIG. 5D is a perspective view of the interior of the upper housing section from the reactance module of FIGS. 2A/2B, and illustrating the encapsulating sections for the upper core assembly.

Referring now to FIG. 5C, the upper core assembly 160 is retained by encapsulating sections 180, 182 within the upper housing section 120. In one embodiment, the encapsulating sections 180, 182 are a silicone elastomer encapsulant such as the above-noted Sylgard®. The encapsulating section 182 is disposed between the upper core assembly 160 and the upper housing section 120. The encapsulating section 180 is disposed between the upper core assembly 160 and the power line 16. A second or upper power line cavity 168 extends along the length of the upper core assembly 160 (within the encapsulating section 180) for receiving an upper portion of the corresponding power line 16. FIG. 5D shows the relative position of the encapsulating sections 180, 182, with the upper core assembly 160 being removed to show this relative position.

Figure 6B:
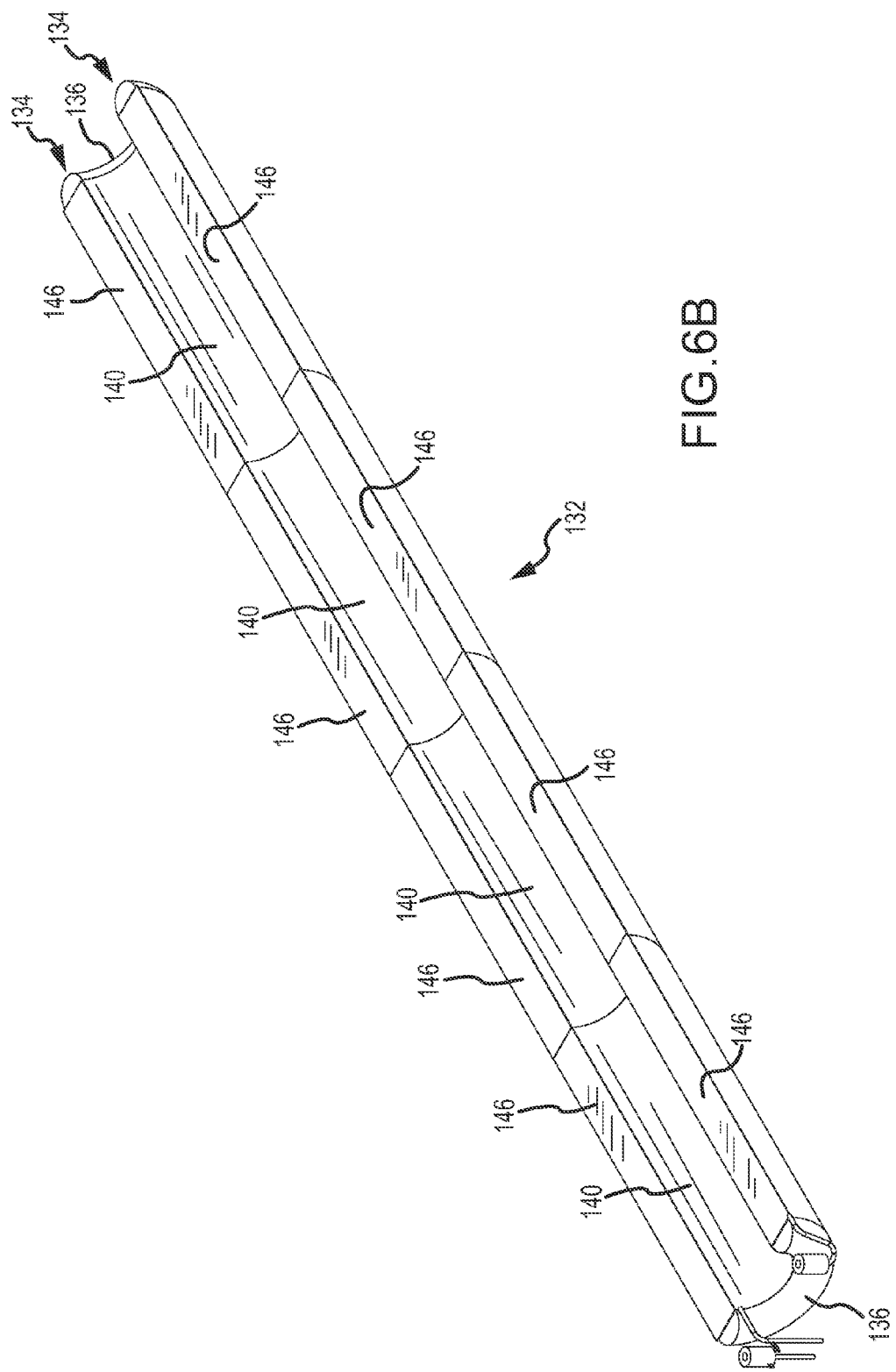
FIG. 6B is a perspective view of the lower core section for the lower core assembly from the reactance module of FIGS. 2A/2B, illustrating spacers installed on faces of the individual lower core segments that collectively define the lower core section.
Figure 7A:
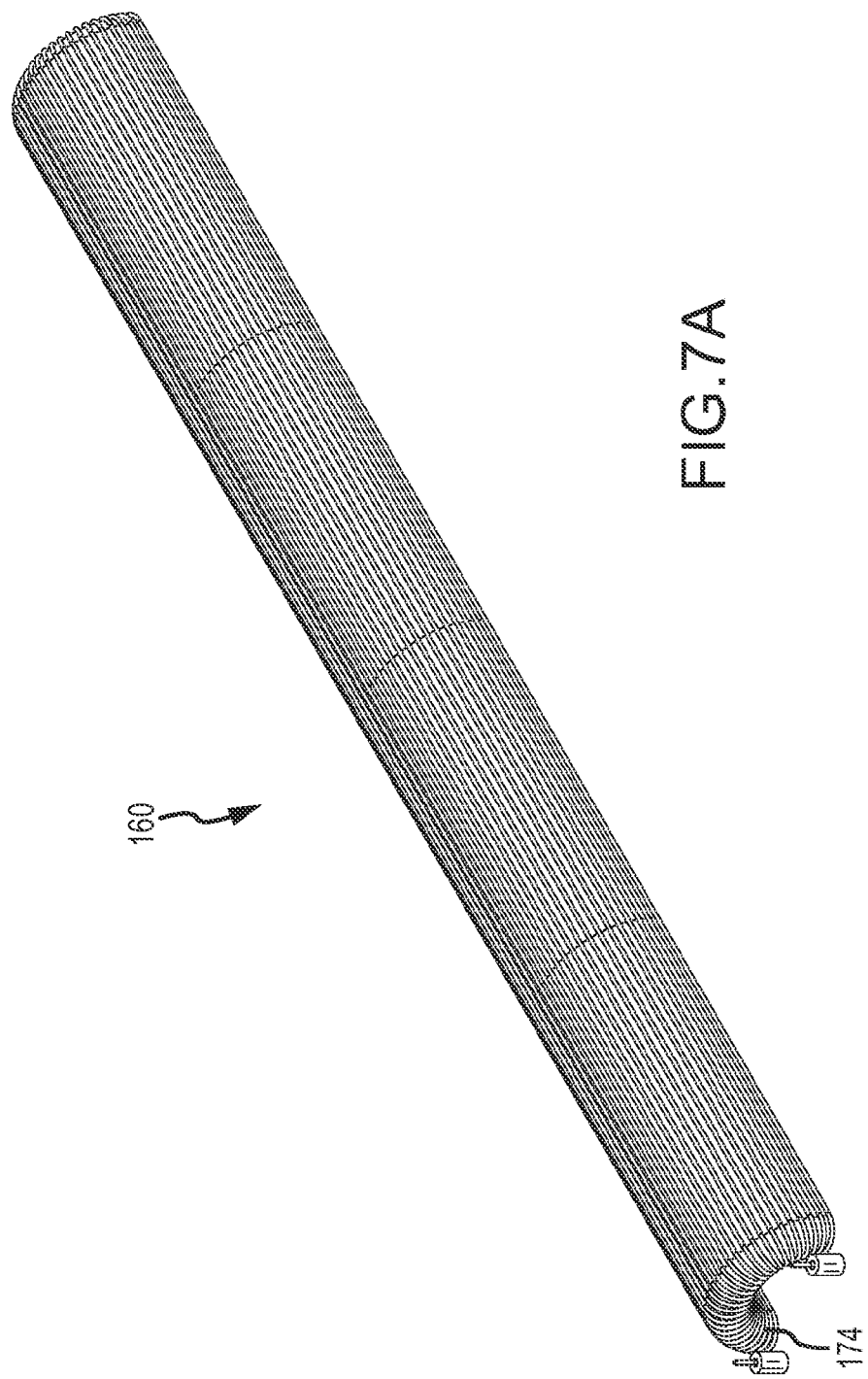
FIG. 7A is a perspective view of the upper core assembly from the reactance module of FIGS. 2A/2B.
Figure 7B:
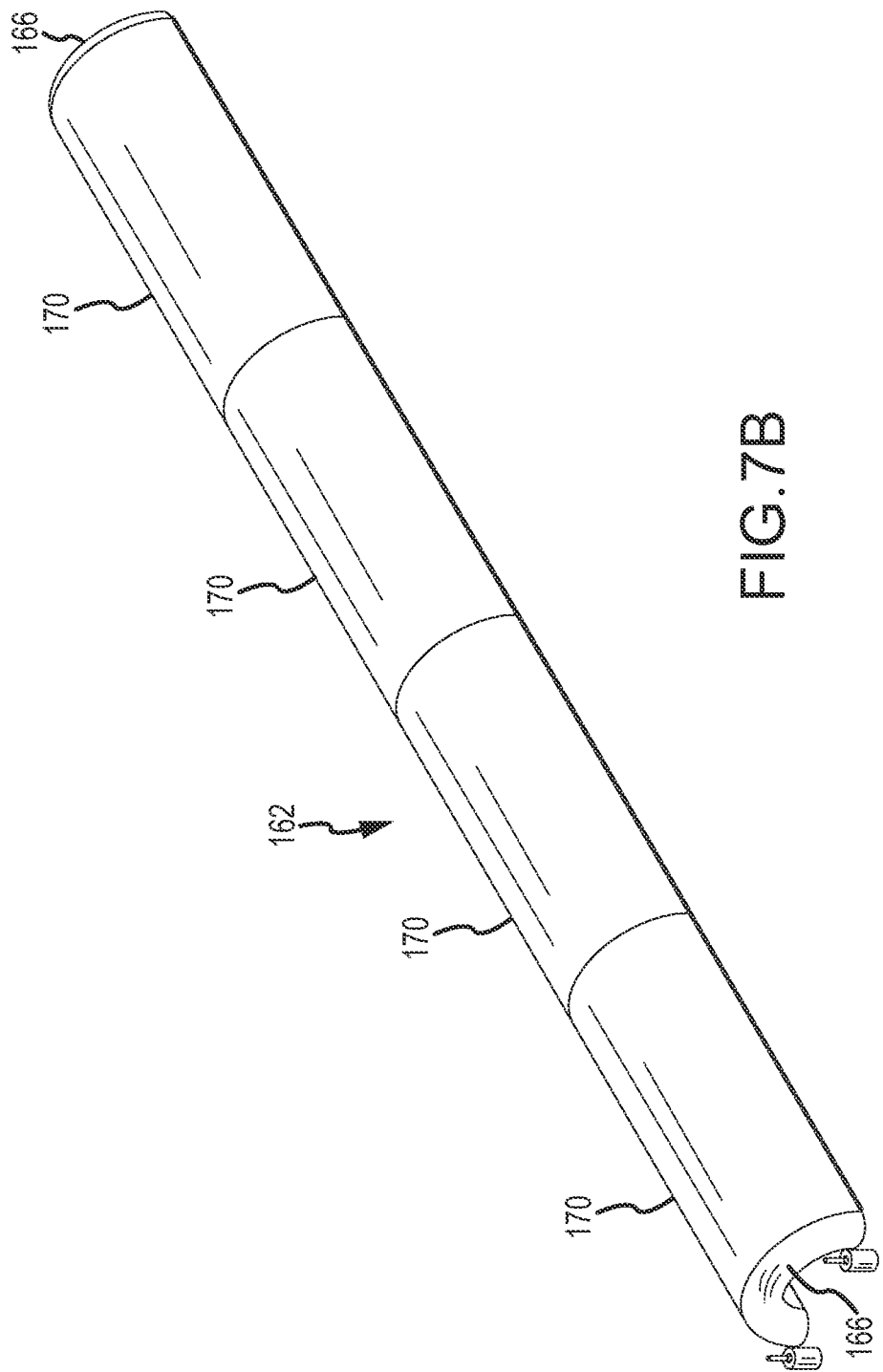
FIG. 7B is a top perspective view of the upper core section for the upper core assembly from the reactance module of FIGS. 2A/2B.

FIGS. 6A-6C present various enlarged views pertaining to the lower core assembly 130. The lower core assembly 130 includes a first or lower core section 132 (FIG. 6B) having a pair of oppositely disposed ends 136. A first or lower winding 144 (FIG. 6A) wraps around the lower core section 132 between its two ends 136.

The lower core section 132 of the lower core assembly 130 is collectively defined by a plurality of first or lower core segments 140 that are disposed in end-to-end relation. Any appropriate number of individual lower core segments 140 may be utilized (four in the illustrated embodiment). Adjacent lower core segments 140 may be disposed in abutting relation, or adjacent lower core segments 140 may be separated from one another by an appropriate space (typically a small space, such as a space of no more than about ⅛ inches).

Each lower core segment 140 includes a pair of faces 142 (FIGS. 6C and 4C) that extend along opposite sides of the corresponding lower core segment 140 in its length dimension. The faces 142 on each of the two sides of the lower core section 132 may be characterized as collectively defining a face section (i.e., the lower core section 132 may be characterized as having two face sections, with each of the face sections being defined by the faces 142 of the lower core segments 140 on a common side of the lower core section 132). Each face 142 is in the form of an at least substantially planar or flat surface. The faces 142 of the various lower core segments 140 are disposed in at least substantially coplanar relation (e.g., the various faces 142 are at least substantially disposed within a common reference plane). A separate spacer 146 (e.g., FIGS. 6A, 6B, 4C) is appropriately secured (e.g., bonded; adhesively attached) to each face 142 of each lower core segment 140. A single spacer could collectively extend over those faces 142 of the various lower core segments 142 that are on a common side of the lower core segments 142 (not shown). In any case and in one embodiment, each spacer 146 is in the form of tape or a dielectric film, for instance a polyamide film (e.g., Kapton® tape available from DuPont Company). Kapton® tape dimensions for each spacer 146 (as well as spacers 176 addressed below) may be specific to the magnetization and loss performance ratings of the DSR 30.

The spacers 146 on a common side of the lower core section 132 may be characterized as collectively defining an interface 134. Therefore, the lower core section 132 includes a pair of laterally spaced interfaces 134 that each extend along the entire length of the lower core section 132 (e.g., between its opposing ends 136). One embodiment has each spacer 146 having a thickness within a range of about 0.07 inches to about 0.13 inches, although other thicknesses may be appropriate (e.g., to realize a desired amount of reactance to be injected into the power line 16 by the core assembly 50). Generally, the spacers 146 associated with the lower core section 132 contribute to providing and maintaining a desired and controlled physical and electric/magnetic spacing between the lower core assembly 130 and the upper core assembly 160.

FIGS. 7A-7D present various enlarged views pertaining to the upper core assembly 160. The upper core assembly 160 includes a second or upper core section 162 (FIG. 7B) having a pair of oppositely disposed ends 166. A second or upper winding 174 (FIG. 7A) wraps around the upper core section 162 between its two ends 166.

The upper core section 162 of the upper core assembly 160 is collectively defined by a plurality of second or upper core segments 170 that are disposed in end-to-end relation. Any appropriate number of individual upper core segments 170 may be utilized (four in the illustrated embodiment). Adjacent upper core segments 170 may be disposed in abutting relation, or adjacent upper core segments 170 may be separated from one another by an appropriate space (e.g., in accordance with the discussion presented above on the lower core section 132).

Each upper core segment 170 includes a pair of faces 172 (FIGS. 7D and 5C) that extend along opposite sides of the corresponding upper core segment 170 in its length dimension. The faces 172 on each of the two sides of the upper core section 162 may be characterized as collectively defining a face section (i.e., the upper core section 162 may be characterized as having two face sections, with each of the face sections being defined by the faces 172 of the upper core segments 170 on a common side of the upper core section 162). Each face 172 is in the form of an at least substantially planar or flat surface. The faces 172 of the various upper core segments 170 are disposed in at least substantially coplanar relation (e.g., the various faces 172 are at least substantially disposed within a common reference plane). A separate spacer 176 (e.g., FIGS. 7A, 7B, 5C) is appropriately secured (e.g., bonded; adhesively attached) to each face 172 of each upper core segment 170. A single spacer could collectively extend over those faces 172 of the various upper core segments 170 that are on a common side of the upper core segments 170. In any case and in one embodiment, each spacer 176 is in the form of tape or a dielectric film, for instance a polyamide film (e.g., Kapton® tape, noted above).

The spacers 176 on a common side of the upper core section 162 may be characterized as collectively defining an interface 164. Therefore, the upper core section 162 includes a pair of laterally spaced interfaces 164 that each extend along the entire length of the upper core section 162 (e.g., between its opposing ends 166). One embodiment has each spacer 176 having a thickness within a range of about 0.07 inches to about 0.13 inches, although other thicknesses may be appropriate (e.g., to realize a desired amount of reactance to be injected into the power line 16 by the core assembly 50). Generally, the spacers 176 associated with the upper core section 162 contribute to providing and maintaining a desired and controlled physical and electric/magnetic spacing between the lower core assembly 130 and the upper core assembly 160.

When the upper core assembly 160 is properly aligned with the lower core assembly 130, the interface 164 on one side of upper core assembly 160 will engage the interface 134 on the corresponding side of the lower core assembly 130. Similarly, the interface 164 on the opposite side of upper core assembly 160 will engage the interface 134 on the corresponding side of the lower core assembly 130. Having each spacer 176 on the upper core assembly 160 engage a corresponding spacer 146 on the lower core assembly 130 maintains a desired physical and electric/magnetic spacing between the upper core assembly 160 and the lower core assembly 130 (e.g., a spacing within a range of about 0.14 inches to about 0.26 inches at the corresponding interfaces 134/164, although other spacings may be appropriate).

Figure 8A:
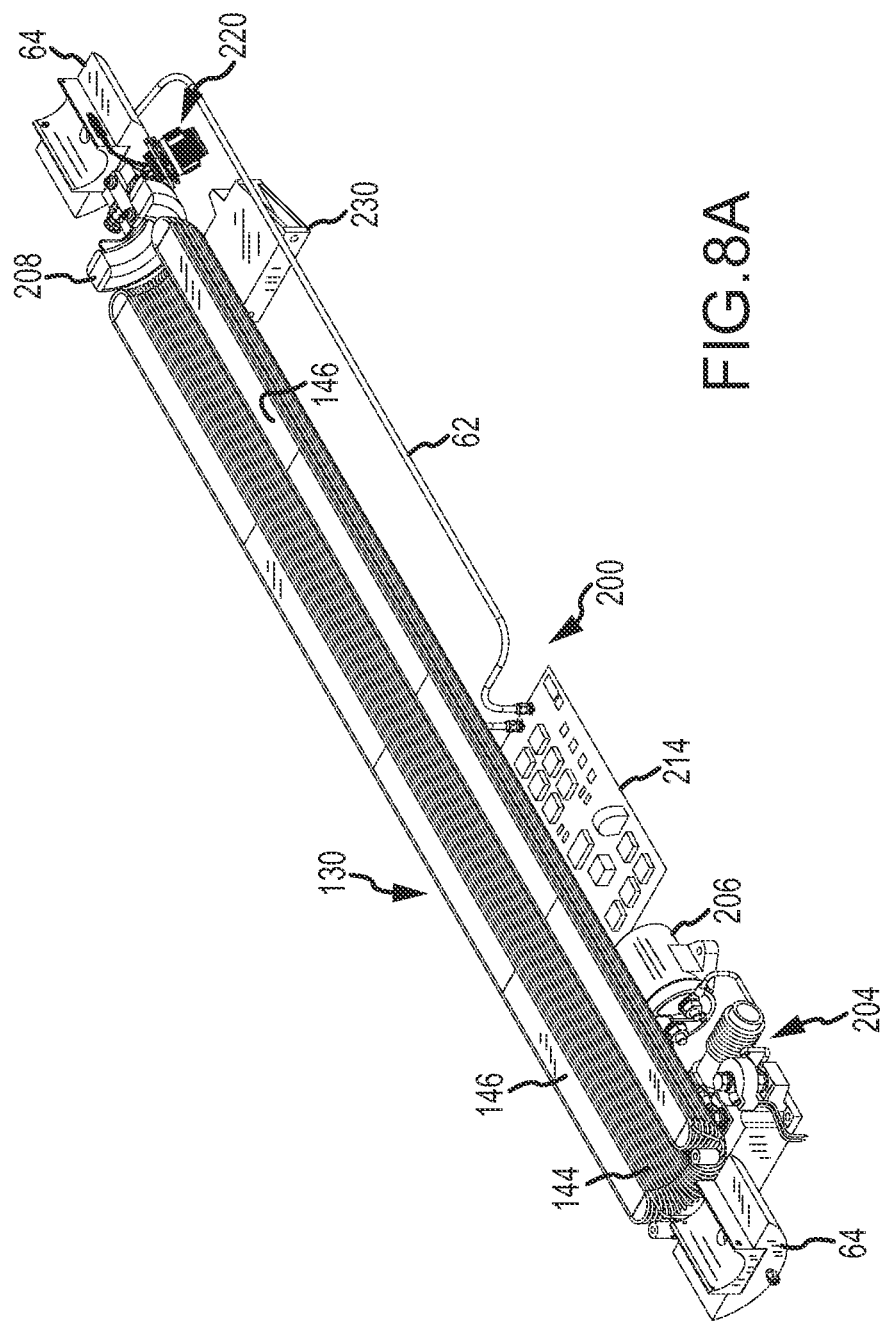
FIG. 8A is one perspective view of the lower core assembly and electronics from the reactance module of FIGS. 2A/2B.
Figure 8B:
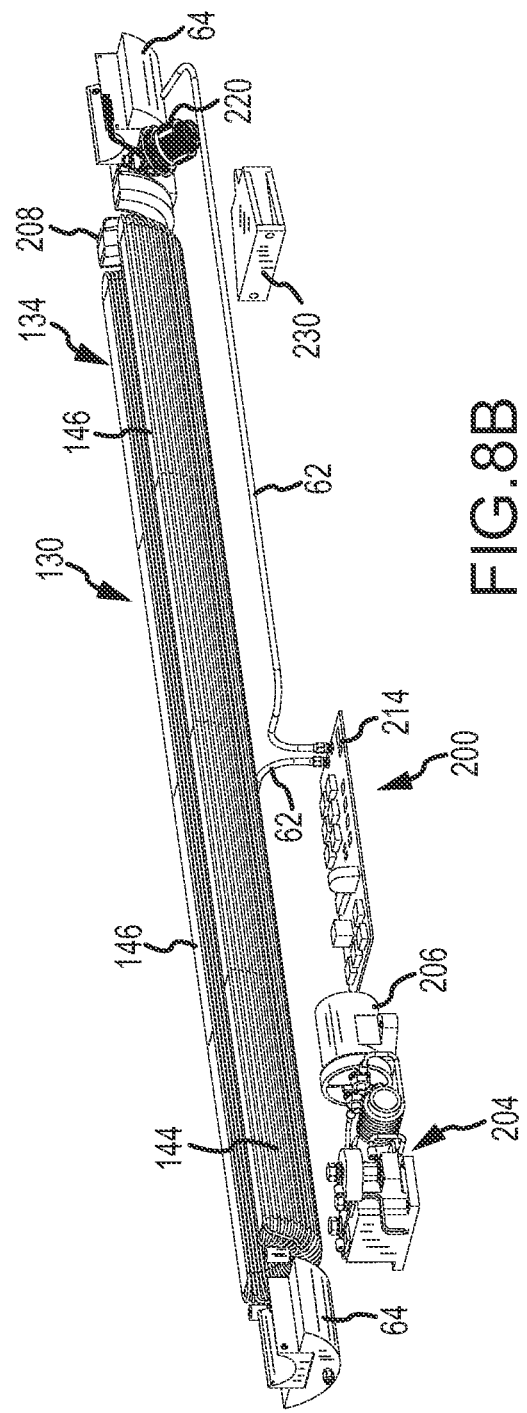
FIG. 8B is another perspective view of the lower core assembly and electronics from the reactance module of FIGS. 2A/2B.

FIGS. 8A and 8B present additional views of the lower core assembly 130 and the electronics 200. The electronics 200 includes a printed circuit, control board, or controller 214, a second electrical switch 206 (e.g., a contactor, bypass switch, or contact relay), a first electrical switch 204 (e.g., an SCR), an MOV (metal oxide varistor) 230, and a fault protection system 220 (again, these components are located within the electronics compartment 84 of the lower housing section 80, and are isolated from the core assembly 50 by the barrier or partition 82). A separate antenna cable 62 is also located within the electronics compartment 84 and extends from the controller 214 to each of the two antennas 100 for the DSR 30. The first electrical switch 204 (e.g., SCR) and the fault protection system 220 are utilized by the DSR 30 in fault current or surge conditions encountered in the power line 16 on which the DSR 30 is mounted. The MOV 230 is used by the DSR 30 for lightning protection. The controller 214 controls operation of the second electrical switch 206 (e.g., contactor), which in turn establishes the mode of the core assembly 50. The core assembly 50 may be disposed in either of first or second modes. In the second or injection mode, the core assembly 50 injects reactance into the power line 16 on which the DSR 30 is mounted (inductance for the illustrated configuration of the DSR 30, although the DSR 30 may be configured to instead inject capacitance as noted above). In the first or non-injection mode, the core assembly 50 injects little or no reactance into the power line 16 on which the DSR 30 is mounted.

Figure 9:
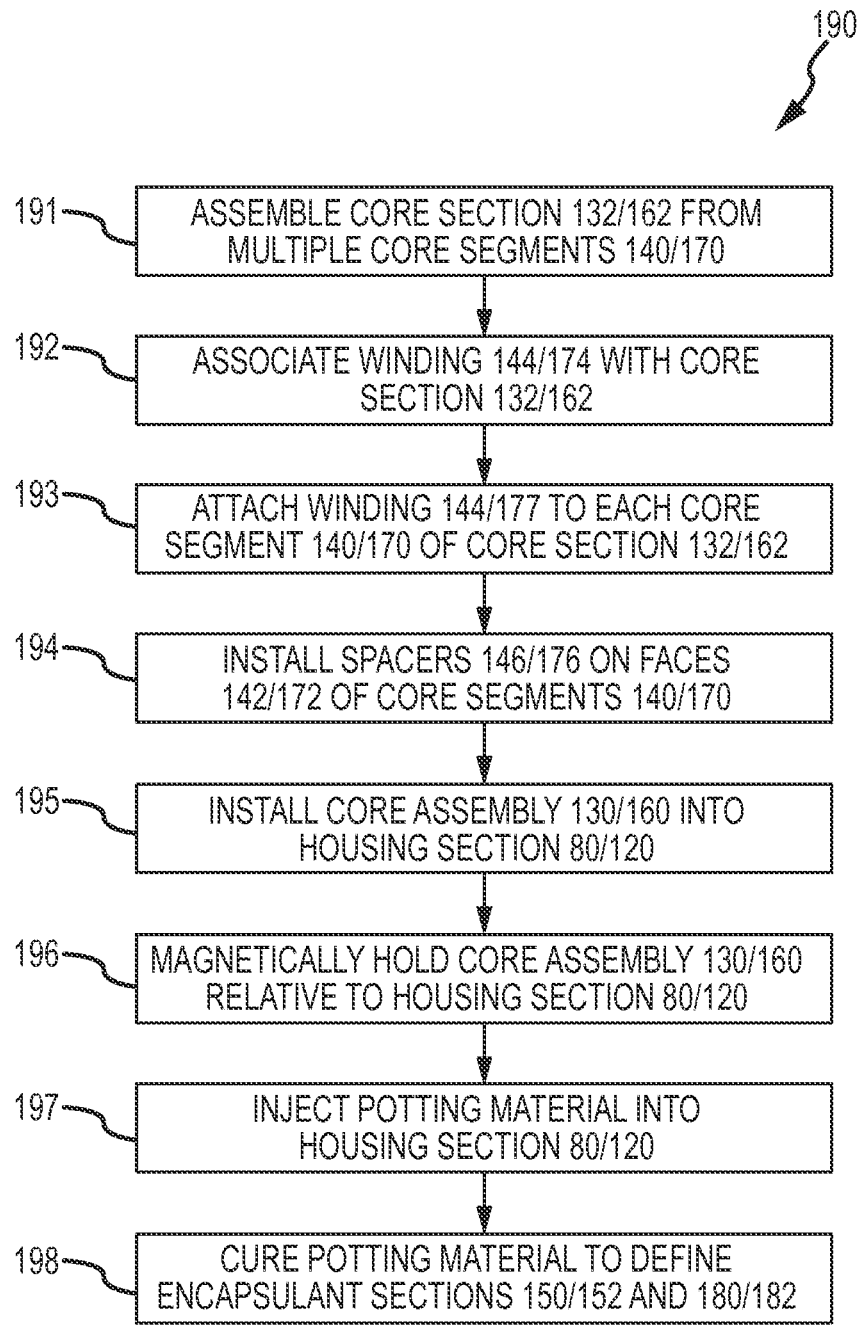
FIG. 9 is one embodiment of a protocol for assembling the reactance module of FIGS. 2A/2B.

One embodiment of a protocol for assembling the above-described DSR 30 is presented in FIG. 9 and is identified by reference 190. The protocol 190 is applicable to assembling the lower core assembly 130 within the lower housing section 80, as well as to assembling the upper core assembly 160 within the upper housing section 120 (including simultaneously (e.g., using different machine sets) or sequentially (e.g., using a common machine set). Hereafter, the protocol 190 will be described with regard to assembling the lower core assembly 130 within the lower housing section 80.

The lower core section 132 may be assembled by disposing the first core segments 140 in alignment (step 191). The ends of adjacent first core segments 140 may be disposed in abutting relation, or a small space may exist between each adjacent pair of first core segments 140. In one embodiment, the various first core segments 140 are positioned within an appropriate jig for purposes of step 191 of the protocol 190.

The first winding 144 may be associated with the assembled first core section 132 pursuant to step 192 of the protocol 190. The first winding 144 may be created/defined "off the first core section 132", and then separately positioned on the first core section 132 (so as to extend between its ends 136) for purposes of step 192. Another option would be to wind wire on the assembled first core section 132 (around its ends 136) to create/define the first winding 144 for purposes of step 192 of the protocol 190. In any case, the first winding 144 may be attached to the first core section 132 in any appropriate manner, for instance using an epoxy (step 193). In one embodiment, the first winding 144 is separately attached to each of the individual first core segments 140 that collectively define the first core section 132.

Spacers 146 may be installed on the various faces 142 of the first core segments 140 that collectively define the first core section 132 (step 194). Steps 192-194 may be executed in any appropriate order (e.g., step 194 could be executed prior to or after step 192; step 194 could be executed some time after completion of step 197, including after completion of step 198). In one embodiment, a separate spacer 146 is provided for each face 142 of each first core segment 140. Any appropriate adhesive and/or bonding technique may be used to attach the spacers 146 to the corresponding first core segment 140 (more specifically, to one of its faces 142).

The first core assembly 130 is positioned within the first housing section 80 (step 195). The lower core assembly 130 is magnetically held relative to the lower housing section 80 (step 196). An appropriate jig may be used for purposes of step 196. Step 196 may entail using one or more magnets to maintain the various faces 142 (of the lower core segments 140 that collectively define the lower core section 132) in at least substantially coplanar relation (e.g., to dispose the faces 142 in a common reference plane), to maintain a desired spacing between the lower core assembly 130 and the interior of the lower housing section 80 in a desired spaced relation (e.g., the partition 82), or both. In one embodiment, each face 142 of each lower core segment 140 (or a spacer 146 previously installed on such a face 142) is positioned against a flat or planar surface of a corresponding magnet (e.g., a separate magnet may be provided for each lower core segment 140). Thereafter, a potting material (e.g., Sylgard®) is injected to encapsulate all but the upper surfaces of the spacers 146 of the lower core assembly 130 within the lower housing section 80 (step 197), and this potting material is allowed to cure in any appropriate manner to define the encapsulating sections 150, 152 discussed above (step 198). As noted, the installation of one or more spacers 146 on the lower core section 132 (step 194) may be undertaken at some point in time after step 197 (and possibly after step 198). The magnetic holding provided by step 196 may be terminated after a sufficient degree of curing has occurred from execution of step 198.

Figure 10:
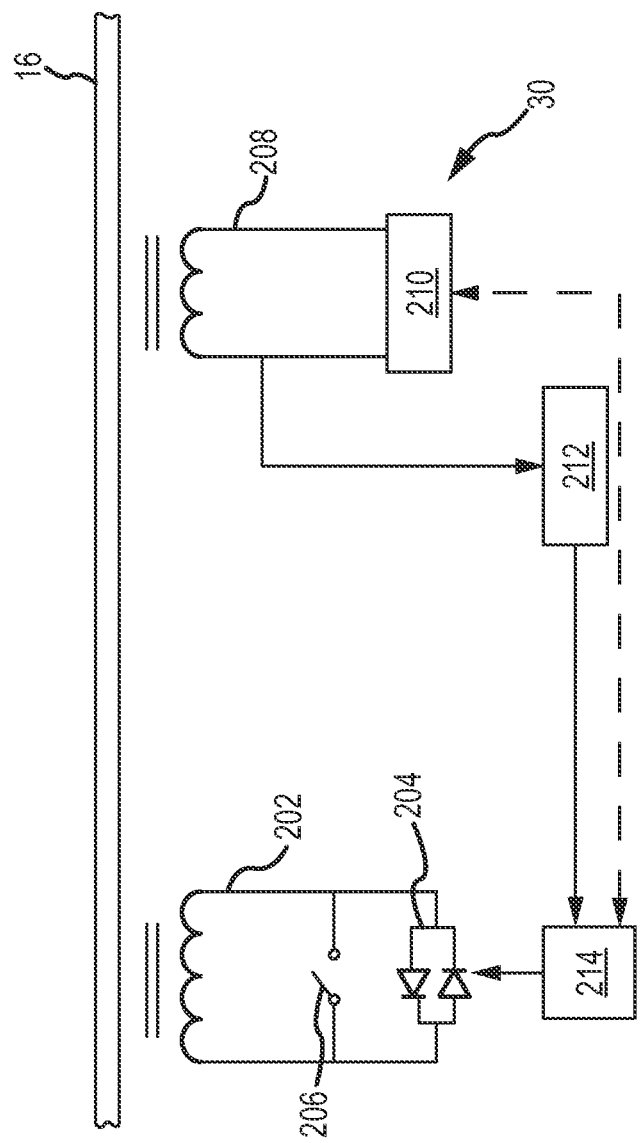
FIG. 10 is an electrical block diagram for an embodiment of the reactance module of FIGS. 2A/2B.

A representative electrical block diagram of the DSR 30 is presented in FIG. 10. The DSR 30 may be characterized as including a first device 202 (e.g., a transformer that includes the core assembly 50 of the DSR 30), the above-noted first electrical switch 204 (e.g., an SCR), the above-noted second electrical switch 206 (e.g., a contact relay), a current transformer 208, a power supply 210, a current monitor 212, and the above-noted controller 214. Again, the DSR 30 may be mounted on a power line 16 such that reactance may be injected into the power line 16. The first device 202 may be in the form of (or part of) a reactance injecting circuit, for instance a single turn transformer. The first device 202 may be disposable in each of first and second modes. For example, switching the first device 202 from the first mode to the second mode may increase the injected reactance being input to the power line 16 when the DSR 30 is mounted on the power line 16. The first device 202 may be operably connected to the controller 214 via the first electrical switch 204 (e.g., SCR) and/or the second electrical switch 206 (e.g., a contact relay). In other words, the first device 202 may be operably connected with the first electrical switch 204, the second electrical switch 206, and/or the controller 214.

In one embodiment, the first electrical switch 204 (e.g., an SCR) may be a solid-state semiconductor device, for instance a thyristor pair. The first electrical switch 204 may be operably connected to the first device 202 and/or the controller 214. In this regard, the first electrical switch 204 may be operable to control the injection of reactance into the power line 16. For example and when the first electrical switch 204 is closed, a minimum level of reactance, corresponding to the first device 202 leakage reactance, is injected into power line 16. In another example and when the first electrical switch 204 is open and the second electrical switch 206 (e.g., a contact relay) is open, reactance is injected into power line 16. As will be discussed in more detail below, the first electrical switch 204 also may be operable to pass an overcurrent.

The controller 214 may be any computerized device (e.g., a microcontroller) that is operable to manage the operation of multiple devices and/or communicate with multiple devices in order to implement one or more control objectives. For example, the controller 214 may be operable to switch the first device 202 from the first mode to the second mode and/or communicate with any device of the DSR 30. In this regard, the controller 214 may be operably connected to the first electrical switch 204 (e.g., an SCR), the second electrical switch 206 (e.g., a contact relay), the first device 202, the current monitor 212, and/or the power supply 210. The controller 214 may switch the first device 202 from the first mode to the second mode via the second electrical switch 206. The first mode for the DSR 30 may be characterized as a bypass mode and the second mode for the DSR 30 may be characterized as an injection mode. When the second electrical switch 206 is closed (i.e., is conducting), the first device 202 is in bypass mode (e.g., the first device 202 is shorted) and little or no reactance is injected into the power line 16 via the DSR 30. When the second electrical switch 206 is open (such that the first device 202 is not shorted) the first device 202 is in injection mode where reactance is injected into the power line 16. At this time and if the DSR 30 incorporates the first electrical switch 204, the first electrical switch 204 should also be open (along with the second electrical switch 206, and again such that the first device 202 is not shorted) such that the first device 202 is in injection mode where reactance is injected into the power line 16.

The controller 214 may switch the first device 202 from bypass mode to injection mode when the current monitor 212 determines that a current of the power line 16 satisfies a predetermined threshold. For example, the current monitor 212 may be operable to measure the current on the power line 16 (at the DSR 30) and communicate the measured current to the controller 214. If the measured current satisfies the predetermined threshold (e.g., if the current is greater than the threshold, or is equal to or greater than the threshold, as the case may be), the controller 214 may switch the first device 202 from bypass mode to injection mode by opening the second electrical switch 206 (e.g., contact relay) such that reactance is injected into the power line 16. Similarly, if the measured current thereafter no longer satisfies the predetermined threshold (e.g., if the measured current drops below the predetermined threshold), the controller 214 may switch the first device 202 from injection mode back to bypass mode by closing the second electrical switch 206 such that the first device 202 is shorted and such that no substantial reactance is injected into the power line 16. As such, the controller 214 may be operable to switch the first device 202 between the bypass and injection modes.

The current monitor 212 may measure the current on the power line 16 via the current transformer 208. In this regard, the current transformer 208 may be mounted on the power line 16 and may be a separate component from the first device 202. In one embodiment, the current transformer 208 may be operable to produce a reduced current that is proportional to the current of the power line 16 such that the current may be processed and/or measured by a measuring device (e.g., the current monitor 212) and/or the current may provide power to electronic components (e.g., the power supply 210). The power supply 210 may be operably connected with the current transformer 208 and/or the controller 214. In this regard, the power supply 210 may receive power from the current transformer 208 and provide power to the controller 214.

The DSR 30 may be mounted on the power line 16 such that an injected reactance may be input to the power line 16. In one embodiment, the injected reactance may be an inductive reactance (e.g., inductance). For example, when inductance is injected into the power line 16, the flow of current in the power line 16 may be reduced and diverted to underutilized power lines in interconnected and/or meshed power networks. In another embodiment, the injected reactance may be a capacitive reactance (e.g., capacitance). For example, when capacitance is injected into the power line 16, the flow of current in the power line 16 may be increased and diverted from power lines in interconnected and/or meshed power networks.

Figure 11A:
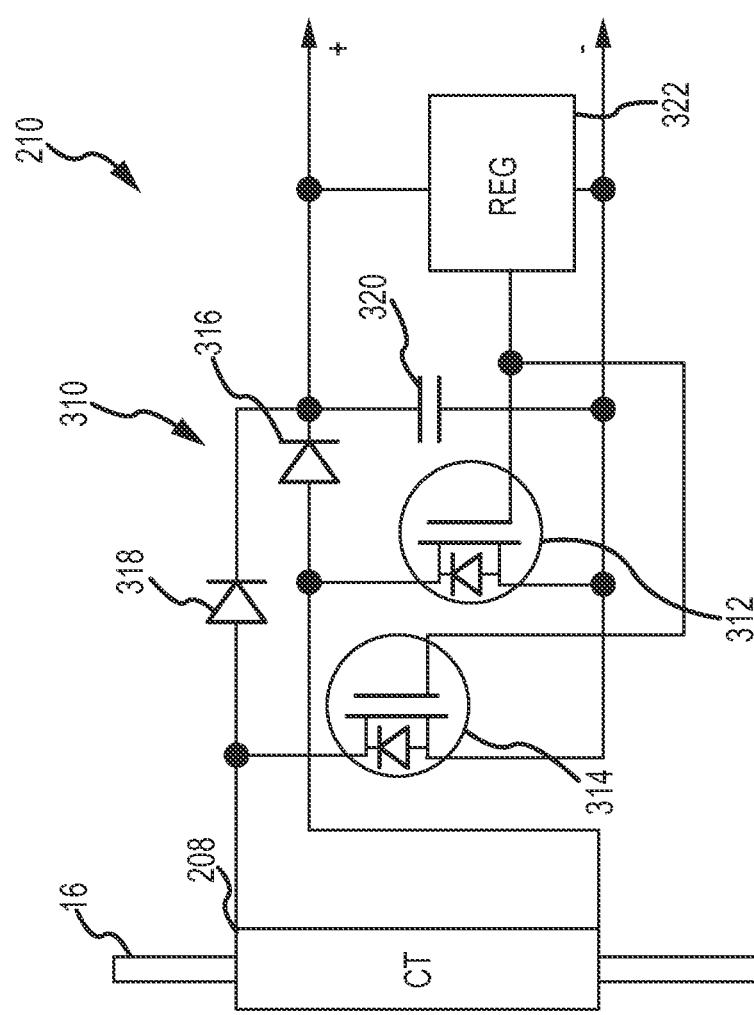
FIG. 11A is a schematic of an embodiment of a power supply from the electrical block diagram of FIG. 10.

FIG. 11A illustrates one embodiment that may be used as the power supply 210 for the DSR 30 addressed above in relation to FIG. 10. The power supply 210 of FIG. 11A includes a bridgeless power factor correction circuit or a bridgeless PFC 310 and a regulator 322. As discussed above, the power supply 210 may receive power from the current transformer 208 (where the power line 16 is the primary of the current transformer 208), and the current transformer 208 may be operable to produce a reduced current that is proportional to the current on the power line 16 such that the current transformer 208 may provide power to the power supply 210. In one embodiment, the current of the power line 16 may be characterized as a first current and the reduced current provided by the current transformer 208 may be characterized as a second current. In this regard, the current transformer 208 receives the first current and outputs the second current, the second current is different than the first current, and the second current is proportional to the first current.

The second current may be based at least on the number of turns of a secondary winding (not illustrated) of the current transformer 208. For example, the secondary winding of the current transformer 208 may comprise 100 turns. In this example, the second current would be $\frac{1}{100}$ of the first current (i.e., the first current is 100 times the second current). The current transformer 208 may be configured to provide any desired reduction of the current on the power line 16.

The bridgeless PFC 310 includes the current transformer 208, a first controllable switch 312, a second controllable switch 314, a first rectifier 316, a second rectifier 318, and a capacitor 320. The first rectifier 316 may be operably connected to the first controllable switch 312 and the second rectifier 318 may be operably connected to the second controllable switch 314. In this regard, the operation of the first and second rectifiers 316, 318 may be dependent on the operation of the first and second controllable switches 312, 314, respectively. For example, the first and second rectifiers 316, 318 may output a current to the capacitor 320 based on the state of the first and second controllable switches 312, 314, respectively. The first and second rectifiers 316, 318 may be any silicon-based semiconductor switch (e.g., diodes). The first and second controllable switches 312, 314 may be any semiconductor transistors (e.g., MOSFETs). The first and second controllable switches 312, 314 also may be operably connected to the regulator 322. In this regard, the regulator 322 may be configured to switch each of the first and second controllable switches 312, 314 between a conducting state and a non-conducting state.

As discussed above in relation to FIG. 10, the power supply 210 may provide power to the controller 214 of the DSR 30. The power supply 210 may be operable to output a regulated voltage (e.g., a 24 VDC output) to the controller 214. When the regulated voltage satisfies a predetermined threshold (e.g., if the regulated voltage is greater than the threshold, or is equal to or greater than the threshold), the regulator 322 may switch the first and second controllable switches 312, 314 to the conducting state. In one embodiment, the predetermined threshold may be within a range from about 23.9V to about 24.1V. This predetermined threshold may be a standard design power supply voltage for the system. When the first and second controllable switches 312, 314 are in the conducting state, the output current from the first and second rectifiers 316, 318 may be shunted. For example, the second current received from the current transformer 208 may flow through the first and second controllable switches 312, 314 such that the power supply 210 is shorted and no or very little current flows through the first and second rectifiers 316, 318. As discussed above, the capacitor 320 may receive current from the first and second rectifiers 316, 318. As such, when the output current from the first and second rectifiers 316, 318 is shunted, the capacitor 320 may begin to discharge.

When the regulated voltage no longer satisfies the predetermined threshold (e.g., if the regulated voltage drops below the predetermined threshold), the regulator 322 switches the first and second controllable switches 312, 314 to the non-conducting state. When the first and second controllable switches 312, 314 are in the non-conducting state, the second current from the current transformer 208 may flow through the first and second rectifiers 316, 318. As such, the capacitor 320 may receive the output current from the first and second rectifiers 316, 318 and may begin to charge. In turn, the output voltage of the power supply 210 is regulated. In one embodiment, the regulator 322 may have an operating frequency substantially higher than the current frequency on the power line 16.

Figure 11B:
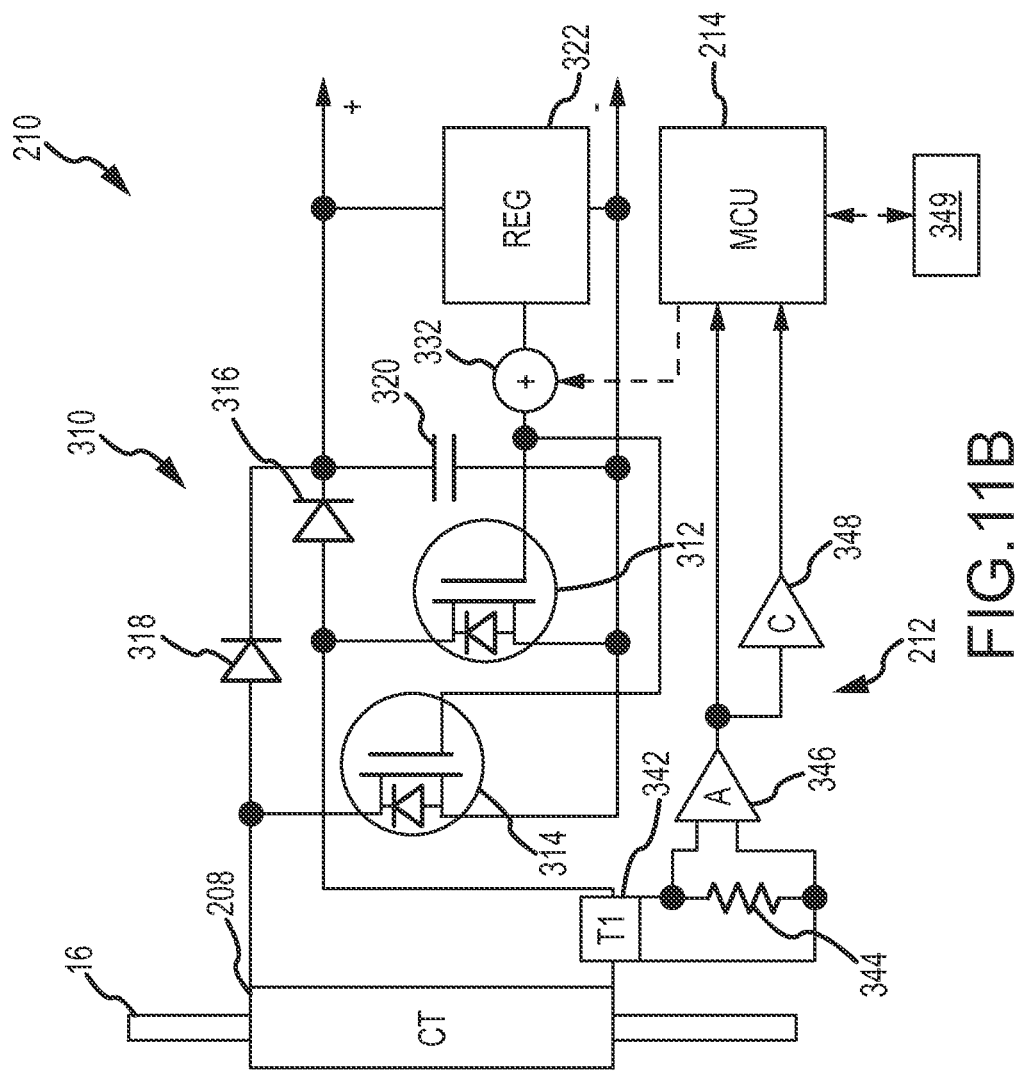
FIG. 11B is a schematic of an embodiment of a power supply and a current monitor from the electrical block diagram of FIG. 10.

As discussed above in relation to FIG. 10, the current monitor 212 may be operable to measure the current on the power line 16 (at the DSR 30) and communicate the measured current to the controller 214. One embodiment that may be used as the current monitor 212 is illustrated in FIG. 11B. The current monitor 212 of FIG. 11B may be operably connected to the current transformer 208, and furthermore may be configured to measure the second current from the current transformer 208. The current transformer 208 may be operable to output the second current to the power supply 210 through the current monitor 212. In this regard, the controller 214 may be configured to switch the current transformer 208 from a first state to a second state. The first state may include the current transformer 208 outputting the second current to the power supply 210. When the current transformer 208 is in the first state, the power supply 210 outputs the regulated voltage. The second state may include a measurement of the second current via the current monitor 212. When the current transformer 208 is in the second state, the first and second controllable switches 312, 314 are in the conducting state and the power supply 210 is shorted such that the second current flows through the first and second controllable switches 312, 314. Shunting the power supply 210 operation while the current transformer 208 is in the second state may remove any contribution of high-frequency switching noise, or other non-linearity associated with the power supply 210 operation from the measurement of the second current. As a result, the quality and signal-to-noise ratio of the current monitor 212 may be increased.

As illustrated in FIG. 11B, the controller 214 may include a logical summing device 332. The logical summing device 332 may be any simple logic element or programmable logic device such as a programmable logic array and a field-programmable gate array, to name a few. The logical summing device 332 may be configured to output a control signal. When the control signal is active, the current transformer 208 is in the second state and the first and second controllable switches 312, 314 are in the conducting state. This is true even if the regulated voltage no longer satisfies the predetermined threshold. In other words, when the power supply 210 is in normal operation, and the regulated voltage no longer satisfies the predetermined threshold, the first and second controllable switches 312, 314 are switched to the non-conducting state. However, if the control signal from the logical summing device 332 is active, the first and second controllable switches 312, 314 remain in the conducting state, resulting in the absence of influence of control pulses from the regulator 322 on the measurement of the second current. In this regard, the control signal from the logical summing device 332 may facilitate the measurement of the second current via the current monitor 212. When the current monitor 212 measures the second current, the second current may have a signal-to-noise ratio of at least about 48 dB.

The current monitor 212 may include an instrument or instrumental current transformer 342, a burden resistor 344, a differential amplifier 346, a comparator 348, and/or an analog-to-digital converter 349. The instrument current transformer 342 may be operably connected to the current transformer 208 and configured to reduce the second current from the current transformer 208 to a third current. This third current may be less than the second current and proportional to the second current. This third current may be less than the first current (i.e., the current of the power line 16), and is proportional to the first current. The burden resistor 344 may be operably connected to the output of the instrument current transformer 342 such that a voltage develops on the burden resistor 344. The voltage on the burden resistor 344 is proportional to the third current, and thus to the first and second currents. The differential amplifier 346 may be operably connected to the burden resistor 344 and may be configured to convert and/or amplify the voltage on the burden resistor 344. The analog-to-digital converter 349 may be operably connected to the differential amplifier 346 and the controller 214. As such, the differential amplifier 346 may send the analog-to-digital converter 349 an analog signal representative of the voltage on the burden resistor 344. In turn, the analog-to-digital converter 349 may be configured to convert the analog signal from the differential amplifier 346 into a digital signal from which the controller 214 can determine the current on the power line 16. As will be discussed in more detail below, the comparator 348 may be operably connected to the differential amplifier 346 and the controller 214, and may be configured to send an interrupt signal to the controller 214.

Figure 12A:
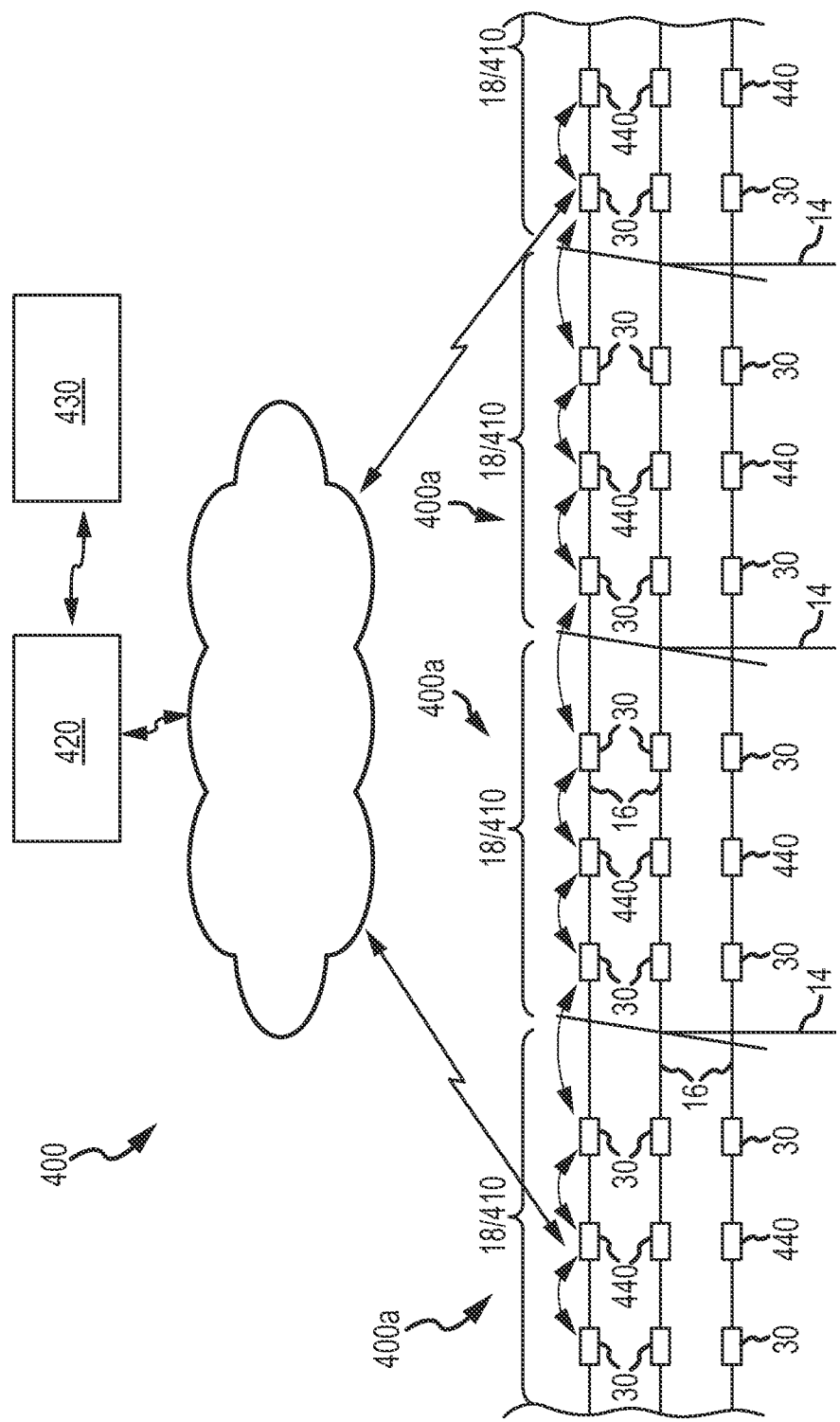
FIG. 12A is a schematic of an embodiment of a power transmission system with distributed control for multiple arrays of reactance modules of the type presented in FIGS. 2A/2B.

FIG. 12A illustrates one embodiment of a power transmission system 400, or more generally a distributed control architecture for use by such a power transmission system. The power transmission system 400 includes at least one power line 16 (three shown in the illustrated embodiment). One or more power lines 16 may be supported by a plurality of towers 14 that are spaced along the length of the power line(s) 16. As in the case of FIG. 1, the power transmission system 400 of FIG. 12A may include one or more electrical power sources 12 (not shown) and one or more electrical loads 22 (not shown).

A plurality of DSRs 30 are installed on a given power line 16—multiple power lines 16 each may have multiple DSRs 30 installed thereon. One or more DSR array controllers 440 may be mounted on each power line 16 that incorporates DSRs 30. Alternatively, a given DSR array controller 440 could be mounted on a tower 14. In any case, each DSR array controller 440 may be associated with a dedicated power line section 18 of the power line 16. A given power line section 18 could have a single DSR array controller 440, or a given power line section 18 could have a primary DSR array controller 400, along with one or more backup DSR array controllers 440.

Any number of DSR array controllers 440 may be associated with a given power line 16. A given power line 16 may be defined by one or more power line sections 18 of the same length, by one or more power line sections 18 of different lengths, or both (e.g., a power line section 18 is not limited to a portion of a given power line 16 that spans between adjacent towers 14 as shown in FIG. 12A; a given power line 16 may be divided up in any appropriate manner into multiple power line sections 18, each of which may have one or more DSR array controllers 440 that are dedicated to such a power line section 18).

One or more DSRs 30 are mounted on each power line section 18 of a given power line 16. Any appropriate number of DSRs 30 may be mounted on each power line section 18.

The various DSRs 30 that are mounted on a given power line section 18 define what may be referred to as a DSR array 410. Each DSR array 410 may have one or more DSR array controllers 440 that are dedicated to such a DSR array 410 (e.g., multiple controllers 440 may be used for any given DSR array 410 to provide redundancy). In one embodiment, a given DSR array controller 440 is only associated with one DSR array 410. As such, one or more DSR array controllers 440 and each DSR 30 of their dedicated DSR array 410 may be associated with the same power line section 18. It should be appreciated that DSRs 30 need not be placed along the entire length of a given power line 16 (although such could be the case), and as such there may be a gap between one or more adjacent pairs of power line sections 18 that each have an associated DSR array 410.

Each DSR 30 in a given DSR array 410 only communicates (directly or indirectly) with one or more DSR array controllers 440 that are assigned to the DSR array 410 (e.g., the primary DSR array controller 440 for the DSR array 410 and any redundant or backup DSR array controllers 440). A given DSR array controller 440 could communicate directly with each DSR 30 in its associated DSR array 410. Another option would be to utilize a relay-type communication architecture, where a DSR array controller 440 could communicate with the adjacent-most DSR 30 on each side of the DSR array controller 440, and where the DSRs 30 could then relay this communication throughout the remainder of the DSR array 410 on the same side of the DSR array controller 440 (e.g., DSRs 30 in a given DSR array 410 could relay a communication, from DSR 30-to-DSR 30, toward and/or away from the associated DSR array controller 440).

DSR array controllers 440 associated with multiple DSR arrays 410 communicate with a common DSR server 420 of the power transmission system 400. Each of these DSR array controllers 440 could communicate directly with this DSR server 420. Alternatively, the DSR server 420 could directly communicate with one or more DSR array controllers 440, and these DSR array controllers 440 could then relay the communication to one or more other DSR array controllers 440 in the power transmission system 400. It should also be appreciated that the power transmission system 400 could incorporate one or more backup DSR servers (not shown), for instance to accommodate a given DSR server 420 going "offline" for any reason. In any case, the DSR server 420 in turn communicates with what may be characterized a utility-side control system 430. Representative forms of the utility-side control system 430 include without limitation an energy management system (EMS), a supervisory control and data acquisition system (SCADA system), or market management system (MMS).

The power transmission system 400 could utilize any appropriate number of DSR servers 420. A single DSR server 420 could communicate with a given utility-side control system 430. Another option would be to have multiple DSR servers 420 that each communicate with a common utility-side control system 430. The power transmission system 400 could also utilize any appropriate number of utility-side control systems 430, where each utility-side control system 430 communicates with one or more DSR servers 420.

A given DSR server 420 may be characterized as providing an interface between a utility-side control system 430 and a plurality of DSR array controllers 440 for multiple DSR arrays 410. A DSR server 420 may receive a communication from a utility-side control system 430. This communication may be in any appropriate form and of any appropriate type. For instance, this communication could be in the form of a system objective, a command, a request for information, or the like (e.g., to change the inductance on one or more power lines 16 by a stated amount; to limit the current on one or more power lines 16 to a stated amount; to limit the power flow on one or more power lines 16 to a stated amount; to set a temperature limit for one or more power lines 16).

The DSR array controllers 440 may send information on their corresponding power line section 18 to a DSR server 420. The DSR server 420 in this case may consolidate this information and transmit the same to the utility-side control system 430 on any appropriate basis (e.g., using a push-type communication architecture; using a pull-type communication architecture; using a push/pull type communication architecture). The DSR server 420 may also store information received from the various DSR array controllers 440, including information from the DSR array controllers 440 that has been consolidated by the DSR server 420 and at some point in time transmitted to an utility-side control system 430.

Each DSR array controller 440 may be characterized as a "bridge" between a DSR server 420 (and ultimately a utility-side control system 430) and its corresponding DSR array 410. For instance, one communication scheme may be used for communications between a DSR array controller 410 and the DSRs 30 of its DSR array 410, and another communication scheme may be used for communications between this same DSR array controller 410 and the DSR server 420. In this case, a DSR array controller 410 may require two different interfaces—one interface/communication module for communicating with the DSRs 30 of its DSR array 410, and another interface/communication module for communicating with a DSR server 420.

As noted, FIG. 12A may be characterized as a distributed control architecture for a power transmission system (or as a power transmission system with a distributed control architecture). In this regard, consider the case where the utility-side control system 430 sends a communication to a DSR server 420. The DSR server 420 may repackage/translate/reformat this communication, but in any case sends a corresponding communication to one or more DSR array controllers 440. Each such DSR array controller 440 that receives such a communication makes a determination as to the modal configuration for each DSR 30 in its corresponding DSR array 410 (i.e., determines whether a given DSR 30 should be in a first or bypass mode, or whether this DSR 30 should be in a second or injection mode, and this may be undertaken for each DSR 30 in its corresponding DSR array 410). Notably, the communication that is received by the DSR array controller 440 does not itself indicate as to what the modal configuration should be for each DSR 30 in the DSR array 410 for the recipient DSR array controller 440. As such, each DSR array controller 440 must have sufficient intelligence so as to be able to be able to make this determination on its own.

Figure 12B:
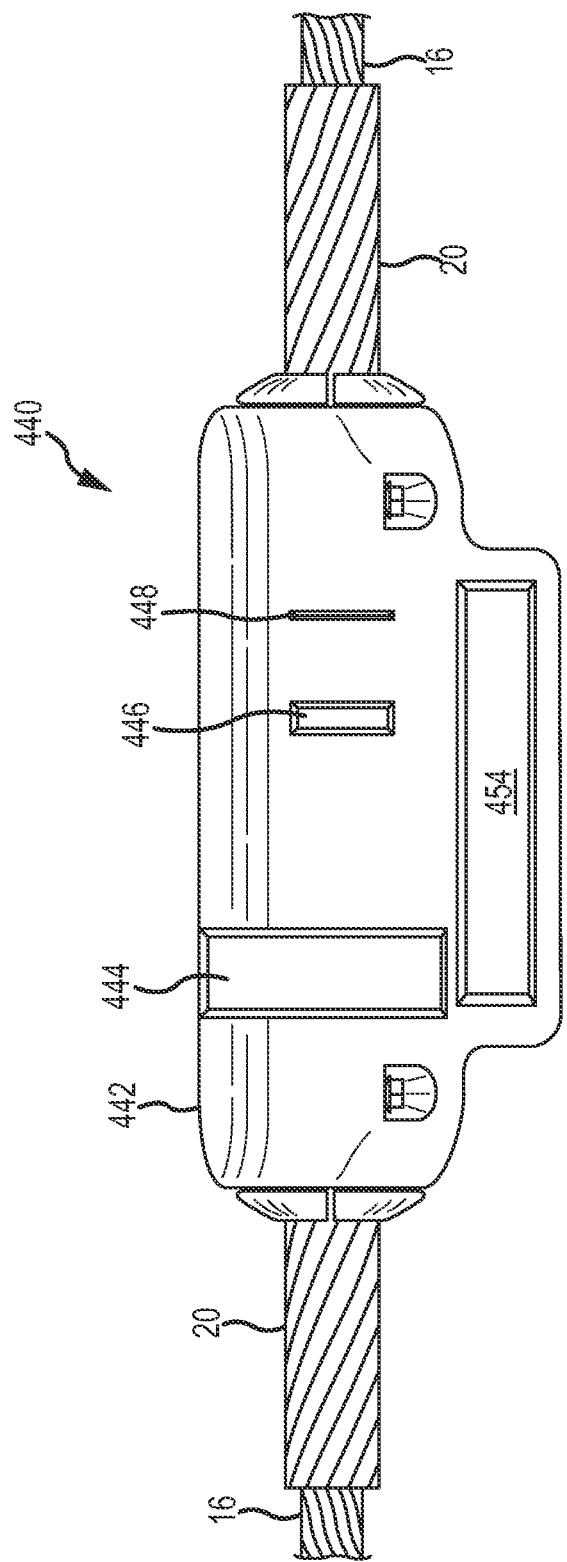
FIG. 12B is a schematic of a DSR array controller used to provide distributed control for the power transmission system of FIG. 12A.

FIG. 12B presents a representative configuration for a DSR array controller 440 that may be utilized by the power transmission system 400 of FIG. 12A. The DSR array controller 440 includes a housing 442. Preferably, the housing 442 allows the DSR array controller 440 to be mounted on a power line 16 without having to break the power line 16 (e.g., by using detachably connectable housing sections at least generally of the type discussed above in relation to the DSR 30). Moreover, preferably the housing 442 is configured to reduce the potential for Corona discharges.

The DSR array controller 440 includes a current transformer 444 that is disposed within the housing 442 and that derives power from the power line 16 to power electrical components of the DSR array controller 440. Various sensors may be utilized by the DSR array controller 440, such as a fault current sensor 446 and a temperature sensor 448. Moreover, the DSR array controller 440 utilizes a processing unit 454 (e.g., defined by one or more processors of any appropriate type, and utilizing any appropriate processing architecture).

Figure 12C:
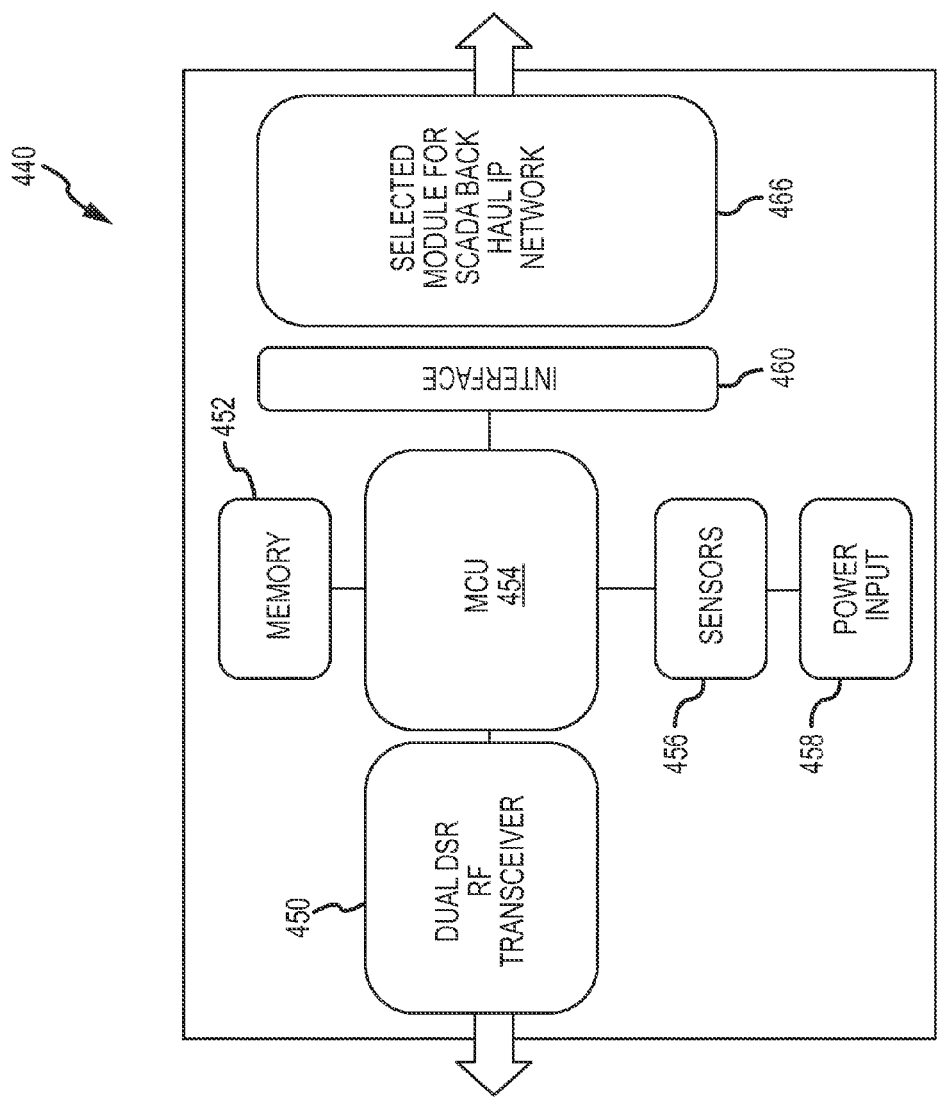
FIG. 12C is an electrical block diagram that may be utilized by DSR array controllers from the power transmission system of FIG. 12A.

FIG. 12C presents a functional schematic that may be implemented by a DSR array controller 440. The DSR array controller 440 includes the above-noted processing unit 454. Memory 452 (e.g., any appropriate computer readable storage medium) may be operatively interconnected with the processing unit 454. The memory 452 may be of any appropriate type or types, and may utilize any appropriate data storage architecture(s). One or more sensors 456 (e.g. the above-noted fault current sensor 446; the above-noted temperature sensor 448) may also be operatively interconnected with the processing unit 454.

One or more antennas 450 may be utilized by the DSR array controller 440 for communicating with the DSRs 30 in its corresponding DSR array 410. Any appropriate type of antenna 450 may be utilized by the DSR array controller 440, including a cavity-backed slot antenna of the type utilized by the DSRs 30. Multiple antennas 450 could also be used to communicate with the DSRs 30 in its corresponding DSR array 410, including where two antennas 450 are incorporated by the DSR array controller 440 in the same manner as discussed above with regard to the DSRs 30 (e.g., an antenna 450 may be provided on each end of the DSR array controller 440). As noted, the DSR array controller 440 may use one communication scheme (e.g., a first communication scheme) for communicating with the DSRs 30 of its DSR array 410.

The DSR array controller 440 also communicates with the utility-side control system 430 through the DSR server 420 in the embodiment of FIG. 12A. In this regard, the DSR array controller 440 may include a communications module 466 of any appropriate type and an interface 460. If the communications module 466 provides for wireless communications with the DSR server 420, the DSR array controller 440 may require one or more antennas of any appropriate type. For example, the communications module may be at least one of an Ethernet adapter, a cellular modem, and a satellite modem, to name a few. In another example, the interface 460 may be part of the processing unit 454 and may include at least one of a SPI bus, UART, and a I2C serial bus, to name a few. In any case, the DSR array controller 440 may use another communication scheme (e.g., a second communication scheme) for communicating with the DSR server 420. In one embodiment, the DSR array controller 440 uses different communication schemes for communications with the DSR array 410 and the DSR server 420. It could be appreciated that a dedicated antenna(s) may be required for communications with the DSRs 30 of the corresponding DSR array 410, and that a dedicated antenna(s) may be required for communications with the DSR server 420. However, it may be possible that a common antenna(s) may be used to communicate with both the DSRs 30 of the corresponding DSR array 410 and with the DSR server 420.

The DSR array controller 440 may also incorporate a power supply 458 of any appropriate type, and that is operatively interconnected with the above-noted current transformer 444 (FIG. 12B). The power supply 458 may receive a current flow from the current transformer 444, and may provide power to one or more of the processing unit 454, the memory 452, the antenna(s) 450, one or more antennas associated with the communication module 466 (for communicating with the DSR server 420), one or more sensors 456, or any combination thereof.

FIG. 12D presents one embodiment of a first data structure 480 (e.g., a lookup table) that may be stored/reside in the memory 452 of a given DSR array controller 440. The first data structure 480 may utilize any appropriate data storage architecture. Generally, for each of a plurality of system contingencies or conditions 482, the first data structure 480 includes a corresponding model configuration for at least one control objective for each DSR 30 associated with the DSR array controller 440. Again, there are two "model configurations" for the DSRs 30. One modal configuration (e.g., a first modal configuration or first mode) for each DSR 30 is where the DSR is disposed in a non-injection or bypass mode (e.g., where little or no reactance is being injected into the corresponding power line 16 by the DSR 30, or more specifically into the corresponding power line section 18 on which the DSR 30 is mounted). The other modal configuration (e.g., a second modal configuration or second mode) for each DSR 30 is where it is configured to inject reactance into the corresponding power line 16 (e.g., an injection mode). The amount of reactance injected by a given DSR 30 when in its second modal configuration (or when in its second mode) is substantially greater than the amount of reactance, if any, that is injected by a given DSR 30 when in its first modal configuration (or when in its first mode).

The first data structure 480 includes a modal configuration for two different control objectives for each DSR 30 that is associated with the DSR array controller 440 (three representative DSRs 30 being shown for purposes of the first data structure 480 of FIG. 12D; each DSR 30 within the corresponding DSR array 410 would of course be included in the first data structure 480). The first data structure 480 presents both a power factor control modal configuration 484 (one control objective) and a low-frequency oscillation control modal configuration 486 (a different control objective) for each DSR 30 associated with the DSR array controller 440, and for each system condition or contingency 482. Any number of control objectives may be stored in the first data structure 480, including a single control objective or any appropriate number of multiple control objectives.

The system conditions or contingencies that are loaded into the first data structure 480 may represent at least some or all of the permutations for a power transmission system in relation to each power source utilized by the power transmission system (whether on line or off line), the load level presently imposed on the system, the operating status of the transmission lines forming the interconnected grid, the operating status of the transformers and substation equipment supporting the operation of the transmission lines forming the interconnected grid, or any combination of the above that combine to create a normal, abnormal or emergency operating condition for the grid. The same system conditions or contingencies may be loaded into the memory 452 of one or more DSR array controllers 440. In one embodiment, a set of DSR array controllers 440 will have the same system conditions or contingencies loaded into their corresponding memory 452. However, each DSR array controller 440 will have its own modal configuration for each of its DSRs 30, and for each control objective. It should be appreciated that the first data structure 480 for each DSR array controller 440 may be updated without having to dismount the DSR array controller 440 from its corresponding power line 16 (e.g., using the built-in communication capabilities of the DSR array controllers 440).

Figure 12E:
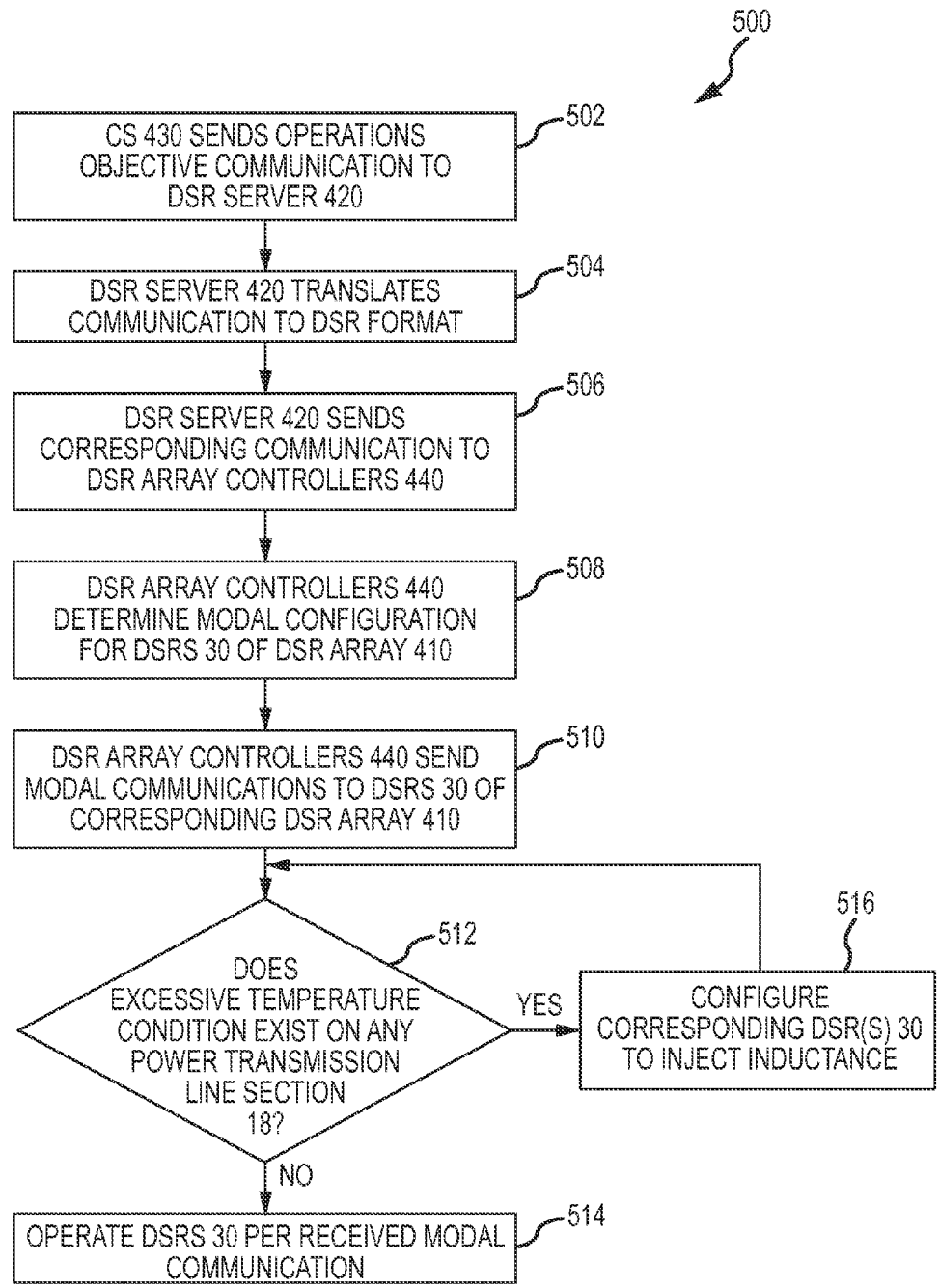
FIG. 12E is an embodiment of an operations protocol that may be used by the power transmission system of FIG. 12A to control operation of individual reactance modules.

One embodiment of an operations protocol for the power transmission system 400 of FIG. 12A is presented in FIG. 12E and is identified by reference numeral 500. The utility-side control system 430 sends an operations objective communication to the DSR server 420 (step 502). This operations objective communication may be of any appropriate type. The DSR server 420 may translate this communication from the utility-side control system 430 into an appropriate DSR format (step 504). In any case, the DSR server 420 sends a corresponding communication to the relevant DSR array controllers 440 (step 506). Each of the DSR array controllers 440 will independently determine the modal configuration for the DSRs 30 in its corresponding DSR array 410 based upon receipt of this communication (step 508). The communication associated with step 506 does not itself indicate the modal configurations that are determined by step 508. Thereafter, the DSR array controllers 440 may send a modal communication to one or more of the DSRs 30 in its corresponding DSR array 410 (step 510), and the DSRs 30 may be operated in accordance with any modal communication that has been received (step 514). It should be appreciated that the protocol 500 could be configured such that a modal communication is sent by a given DSR array controller 440 to each of its corresponding DSRs 30 (step 510), or a given DSR array controller 440 could be configured to send a modal communication (step 510) only to those associated DSRs 30 that have been determined to be in need of a modal change in accordance with step 508.

The operations protocol 500 of FIG. 12E may include what may be characterized as an optional "temperature override" feature. In this regard, step 512 of the protocol 500 is directed to determining if an excessive temperature condition exists on any given power line section 18 (e.g., determining whether an operating temperature meets or exceeds a predetermined temperature threshold, and which may be undertaken in any appropriate manner). Each power line section 18 may be monitored for the existence of an excessive temperature condition. An excessive temperature condition may be triggered in any appropriate manner, such as based upon the current flow through the power line section 18, the temperature of the power line section 18, and/or the angle of sag of the power line section 18. This monitoring for an excessive temperature condition may be undertaken by the DSR array controller(s) 440 and/or the DSRs 30 for such a power line section 18. In any case and in the event that such an excessive temperature condition has been determined to exist, the protocol 500 may be configured to execute step 516. Step 516 is directed to configuring one or more of the DSRs 30 on the subject power line section 18 (with an excessive temperature condition) to inject inductance into this power line section 18. Injecting inductance into a given power line section 18 that is experiencing an excessive temperature condition should reduce the current flow through such a power line section 18, which in turn should reduce its operating temperature. It should be appreciated that steps 512 and 516 on the noted temperature override feature may be implemented at any appropriate location within the protocol 500. Moreover, it should be appreciated that the temperature override logic could be incorporated by the DSR array controllers 440 (which would then send an appropriate communication to the DSRs 30 of their corresponding DSR array 410, such that step 516 would be executed by the individual DSRs 30 upon receiving such a communication from their corresponding DSR array controller(s) 440), that the temperature override logic could be incorporated by the individual DSRs 30 of each DSR array 410 (e.g., such that each individual DSR 30 could independently determine when step 516 should be executed), or both.

Figure 12F:
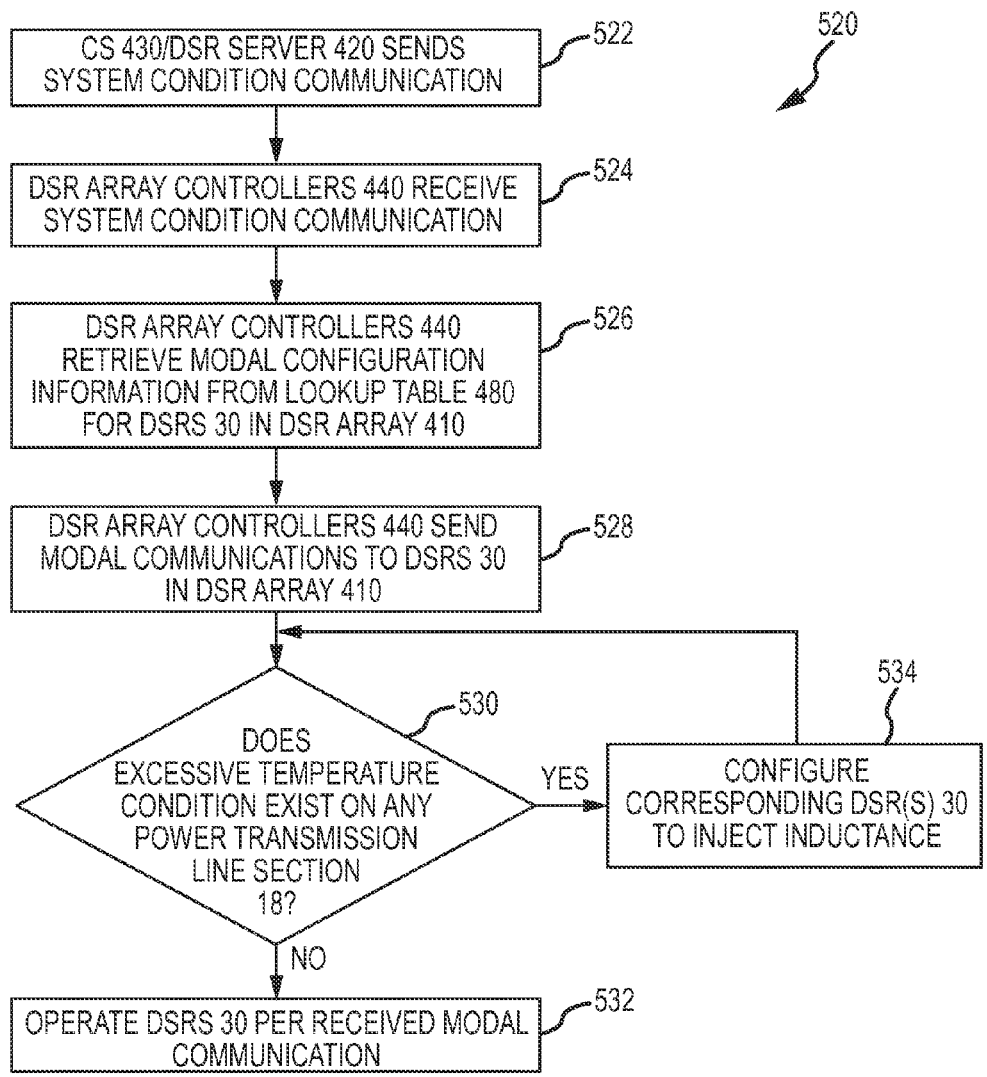
FIG. 12F is an embodiment of a system condition/contingency-based protocol that may be used by the power transmission system of FIG. 12A to control operation of individual reactance modules.

One embodiment of an operations protocol for addressing system conditions or contingencies is illustrated in FIG. 12F and is identified by reference numeral 520. Step 522 of the protocol 520 is directed to sending or transmitting a system condition or system contingency communication to one or more DSR array controllers 440 of the power transmission system 400. This system condition/contingency communication may come directly from the utility-side control system 430 or through the DSR server 420. In any case, one or more DSR array controllers 440 may receive the system condition/contingency communication (step 524). Each DSR array controller 440 will then retrieve the modal configuration information from the first data structure 480 for all DSRs 30 in its corresponding DSR array 410 (step 526). That is, each DSR array controller 440 will locate the system condition/contingency within its first data structure 480, and will then retrieve the associated modal configuration for each DSR 30 in its DSR array 410 for the associated control objective. Each DSR array controller 440 may then send a modal communication to each DSR 30 in its corresponding DSR array 410 (step 528) to specify whether a given DSR 30 should be in its first or bypass mode, or whether this DSR 30 should be in its second or injection mode. The controller 54 of a DSR 30 that receives such a modal communication from its corresponding DSR array controller 440 will then dispose the DSR 30 in the communicated mode pursuant to step 532 (either by switching the mode of the DSR 30, or maintaining the DSR 30 in its then current mode). It should be appreciated that the protocol 520 could be configured such that a modal communication is sent by a given DSR array controller 440 to each of its corresponding DSRs 30 (step 528), or a given DSR array controller 440 could be configured to send a modal communication (step 528) only to those associated DSRs 30 that have been determined to be in need of a modal change based upon step 526.

The operations protocol 520 of FIG. 12F may include what may be characterized as an optional "temperature override" feature. In this regard, step 530 of the protocol 520 is directed to determining if an excessive temperature condition exists on any given power line section 18 (e.g., determining whether an operating temperature meets or exceeds a predetermined temperature threshold, and which may be undertaken in any appropriate manner). Each power line section 18 may be monitored for the existence of an excessive temperature condition. An excessive temperature condition may be triggered in any appropriate manner, such as based upon the current flow through the power line section 18, the temperature of the power line section 18, and/or the angle of sag of the power line section 18. This monitoring for an excessive temperature condition may be undertaken by the DSR array controller(s) 440 and/or the DSRs 30 for such a power line section 18. In any case and in the event that such an excessive temperature condition has been determined to exist, the protocol 520 may be configured to execute step 534. Step 534 is directed to configuring one or more of the DSRs 30 on the subject power line section 18 (with an excessive temperature condition) to inject inductance into this power line section 18. Injecting inductance into a given power line section 18 that is experiencing an excessive temperature condition should reduce the current flow through such a power line section 18, which in turn should reduce its operating temperature. It should be appreciated that steps 530 and 534 on the noted temperature override feature may be implemented at any appropriate location within the protocol 520. Moreover, it should be appreciated that the temperature override logic could be incorporated by the DSR array controllers 440 (which would then send an appropriate communication to the DSRs 30 of their corresponding DSR, array 410, such that step 534 would be executed by the individual DSRS 30 upon receiving such a communication from their corresponding DSR array controller(s) 440), that the temperature override logic could be incorporated by the individual DSRs 30 of each DSR array 410 (e.g., such that each individual DSR 30 could independently determine when step 534 should be executed), or both.

The operations protocol 520 of FIG. 12F assumes that the various DSR array controllers 440 are able to receive system condition/contingency communications from the utility-side control system 430 and/or the DSR server 420. That may not always be the case, and is accommodated by the operations protocol that is set forth in FIG. 12G and that is identified by reference numeral 540. Step 542 of the protocol 540 is directed to assessing receipt of system condition/contingency communications. In the event a predetermined number of DSR array controllers 440 are not receiving system condition/contingency communications, the protocol 540 proceeds from step 544 to step 546. Step 546 of the protocol 540 is directed to the DSR array controllers 440 communicating with one another and sharing information regarding their corresponding power line section 18. From this information, the present state system condition/contingency is derived (step 548). A derived system condition/contingency communication is then sent to the various DSR array controllers 440 pursuant to step 550 of the protocol 540. Each DSR array controller 440 will then retrieve the modal configuration information from the first data structure 480 for all DSRs 30 in its corresponding DSR array 410 (step 552). That is, each DSR array controller 440 will locate the system condition/contingency within its first data structure 480 that corresponds to the derived system condition/contingency communication, and will then retrieve the associated modal configuration for each DSR 30 in its DSR array 410 (and for the associated control objective). Each DSR array controller 440 may then send a modal communication to each DSR 30 in its corresponding DSR array 410 (step 556) to specify whether a given DSR 30 should be in its first or bypass mode, or whether this DSR 30 should be in its second or injection mode. The controller 54 of a DSR 30 that receives such a modal communication from its corresponding DSR array controller 440 will then dispose the DSR 30 in the communicated mode pursuant to step 560 (either by switching the mode of the DSR 30, or maintaining the DSR 30 in its then current mode). It should be appreciated that the protocol 540 could be configured such that a modal communication is sent by a given DSR array controller 440 to each of its corresponding DSRs 30 (step 556), or a given DSR array controller 440 could be configured to send a modal communication (step 556) only to those associated DSRs 30 that have been determined to be in need of a modal change based upon step 552.

Figure 12G:
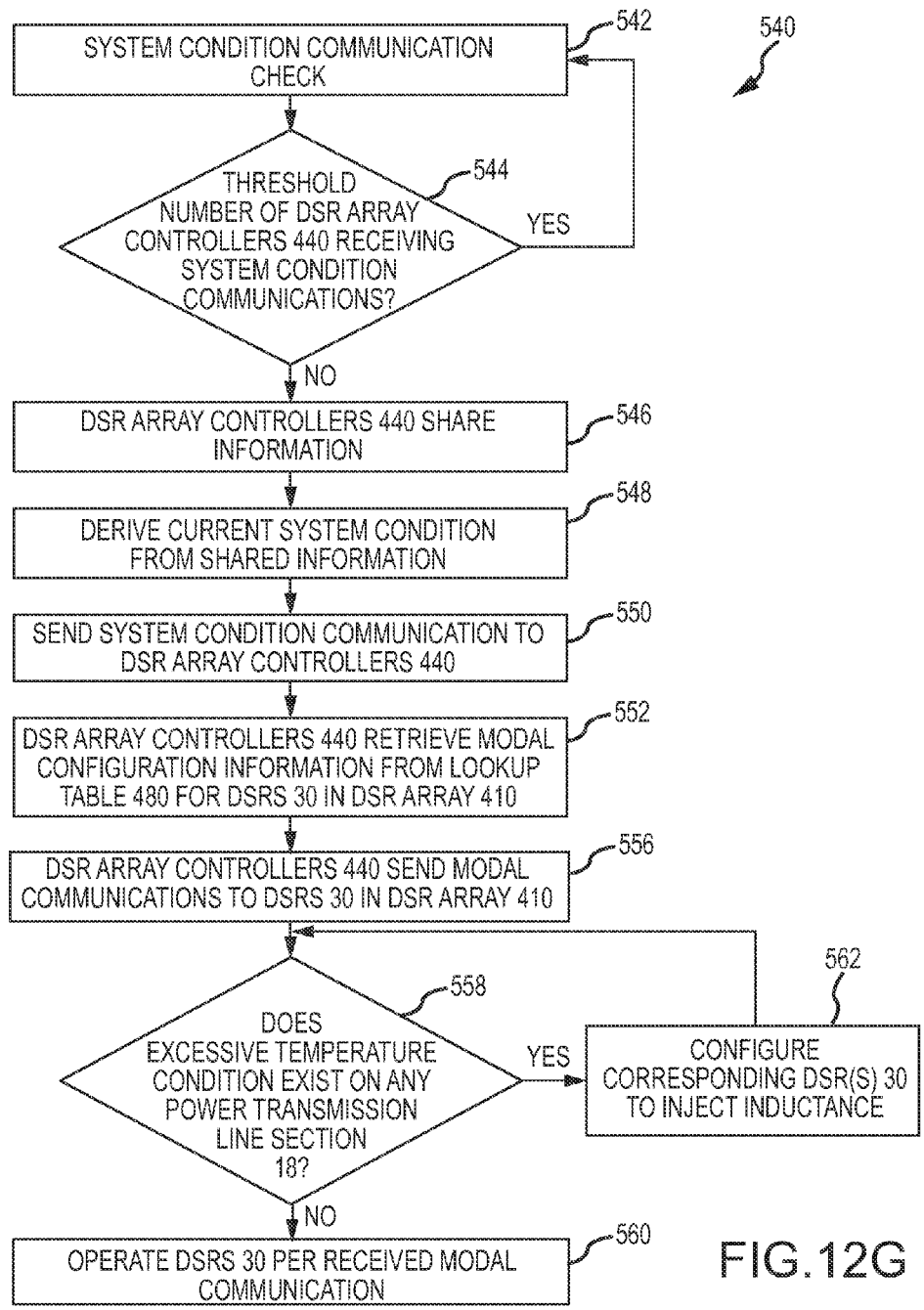
FIG. 12G is another embodiment of a system condition/contingency-based protocol that may be used by the power transmission system of FIG. 12A to control operation of individual reactance modules.

The operations protocol 540 of FIG. 12G may include what may be characterized as an optional "temperature override" feature. In this regard, step 558 of the protocol 540 is directed to determining if an excessive temperature condition exists on any given power line section 18 (e.g., determining whether an operating temperature meets or exceeds a predetermined temperature threshold, and which may be undertaken in any appropriate manner). Each power line section 18 may be monitored for the existence of an excessive temperature condition. An excessive temperature condition may be triggered in any appropriate manner, such as based upon the current flow through the power line section 18, the temperature of the power line section 18, and/or the angle of sag of the power line section 18. This monitoring for an excessive temperature condition may be undertaken by the DSR array controller(s) 440 and/or the DSRs 30 for such a power line section 18. In any case and in the event that such an excessive temperature condition has been determined to exist, the protocol 540 may be configured to execute step 562. Step 562 is directed to configuring one or more of the DSRs 30 on the subject power line section 18 (with an excessive temperature condition) to inject inductance into this power line section 18. Injecting inductance into a given power line section 18 that is experiencing an excessive temperature condition should reduce the current flow through such a power line section 18, which in turn should reduce its operating temperature. It should be appreciated that steps 558 and 562 on the noted temperature override feature may be implemented at any appropriate location within the protocol 540. Moreover, it should be appreciated that the temperature override logic could be incorporated by the DSR array controllers 440 (which would then send an appropriate communication to the DSRs 30 of their corresponding DSR array 410, such that step 562 would be executed by the individual DSRS 30 upon receiving such a communication from their corresponding DSR array controller(s) 440), that the temperature override logic could be incorporated by the individual DSRs 30 of each DSR array 410 (e.g., such that each individual DSR 30 could independently determine when step 562 should be executed), or both.

Each DSR array controller 440 may incorporate any one of the protocols 500, 520, and 540, or may incorporate any two or more of these protocols. For instance, each DSR array controller 440 could incorporate both the protocol 500 of FIG. 12E and the protocol 520 of FIG. 12F. Each DSR array controller 440 could then determine the modal configuration for each DSR 30 in its corresponding DSR array 410 based upon the type of communication that is received. Another option would be for each DSR array controller 440 to incorporate both the protocol 520 of FIG. 12F and the protocol 540 of FIG. 12G. Each DSR array controller 440 could be configured to operate simultaneously in accordance with the protocol 520 of FIG. 12F and the protocol 540 of FIG. 12G. That is, the protocol 520 would be used to control a given DSR array control 440 until step 546 of the protocol 540 of FIG. 12G was reached, in which case the protocol 540 would then be used to control a given DSR array controller 440.

As noted above in relation to FIG. 12A, the power transmission system 400 is defined by a plurality of power lines 16 (three power lines 16 in the illustrated embodiment, although any appropriate number of power lines 16 could be utilized), each of which is at a different phase. Also each power line 16 includes a plurality of power line sections 18, with each power line section 18 having a plurality of DSRs 30. The DSRs 30 on a given power line section 18 define a DSR array 410, where each DSR array 410 has one or more DSR array controllers 440 that are dedicated to the DSR array 410. Corresponding power line sections 18 of the power lines 16 may be characterized as a power transmission section 400a for the power transmission system 400 (e.g., portions of the power lines 16 that each extend from location number 1 to location number 2 along the power transmission system 400 may be characterized as a power transmission section 400a). In a three-phase power transmission system (e.g., power transmission system 400), each power transmission section 400a will have three power lines 16 (and may optionally have a neutral line), and the phases of the current flow through each power line 16 may be delayed by ⅓ of a cycle from one another. A given power transmission section 400a may be any appropriate portion of the power transmission system 400 (e.g., one or more power line sections 18 for each of the power lines 16), or may coincide with the entirety of the power transmission system 400.

In an ideal power transmission system, the multi-phase systems are balanced (e.g., the transmission lines are transposed, the loads are evenly distributed among the phases, and the generator outputs are balanced). A current method used to balance the line impedance of a power transmission system is to transpose each power line at certain intervals k×N times, k being a positive integer and N being the number of phases, proceeding along the power transmission system such that each power line is in a different position after k×N transpositions. Typically, the power lines are transposed at a transposition tower, utility pole, transposition structure, or the like. Non-transposed transmission lines will have a different mutual coupling among the pairs of phase conductors, resulting in a different power flow through the power line. Such unbalanced power systems may result in errors in the positive sequence state estimates, among other things. A number of phase balancing protocols are addressed herein and are directed to balancing the current flow between adjacent pairs of the plurality of power lines on the power transmission system 400.

Figure 13A:
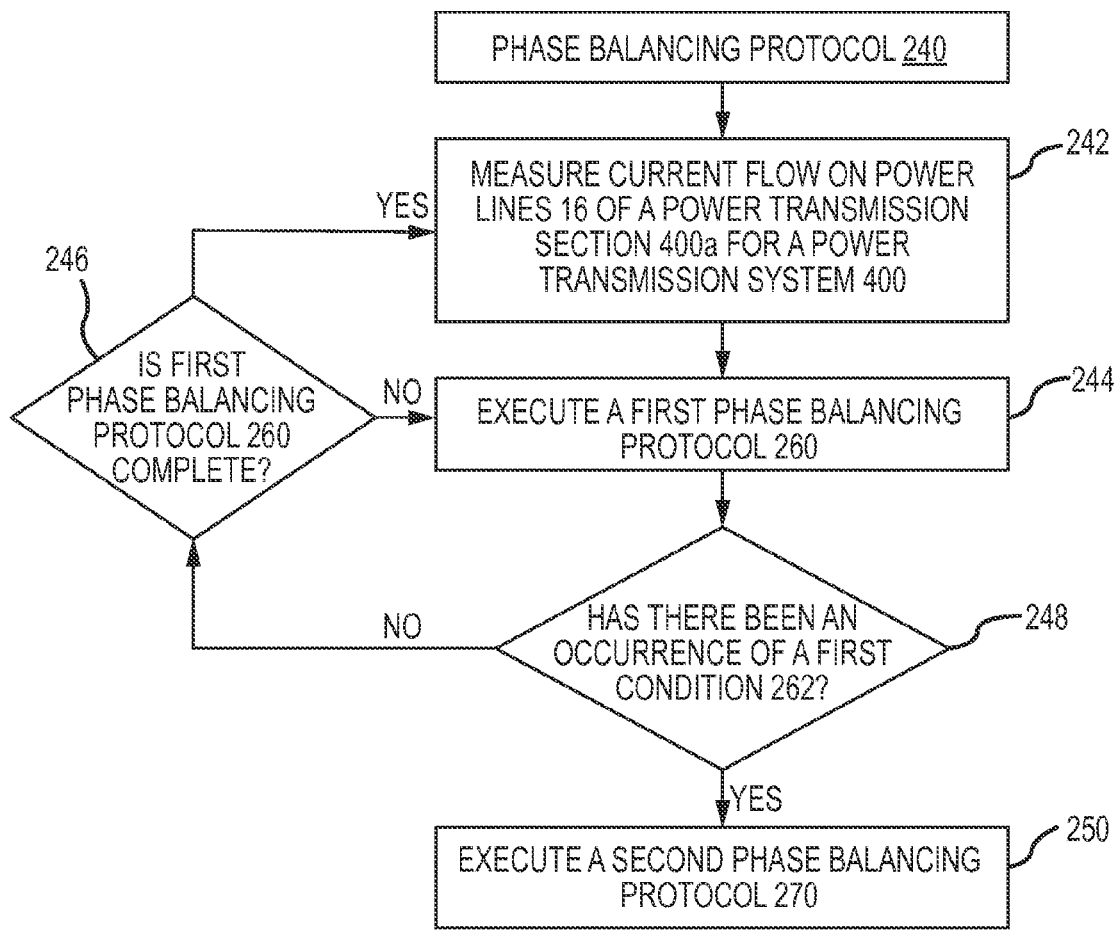
FIG. 13A is one embodiment of a protocol for balancing the phases of power lines of a section of a power transmission system, and which utilizes two different balancing loops.

One embodiment of a phase balancing protocol is presented in FIG. 13A and is identified by reference numeral 240. The phase balancing protocol 240 may be executed in relation to a power transmission section 400a of the power transmission system 400 (or any portion of the power transmission system 400, or for the entirety of the power transmission system 400—FIG. 12A), and may be executed for purposes of attempting to achieve a phase balanced condition for the power transmission section 400a. Generally, the phase balancing protocol 240 is configured to execute a first phase balancing protocol or loop 260, and to execute a second phase balancing protocol or loop 270 if the first phase balancing protocol/loop 260 does not produce a phase balanced condition. For instance, the first phase balancing protocol 260 may be directed to increasing the current flow on at least some of the power lines 16 of a power transmission section 400a, while the second phase balancing protocol 270 may be directed to decreasing the current flow on at least some of the power lines 16 of this same power transmission section 400a, all such that the difference in current flow between adjacent pairs of power lines 16 of the power transmission section 400a does not exceed a predetermined threshold (e.g., does not qualify as a phase imbalance condition on the power transmission section 400a). Alternatively, the first phase balancing protocol 260 may be directed to decreasing the current flow on at least some of the power lines 16 of a power transmission section 400a, while the second phase balancing protocol 270 may be directed to increasing the current flow on at least some of the power lines 16 of this same power transmission section 400a, all such that the difference in current flow between adjacent pairs of power lines 16 of the power transmission section 400a does not exceed a predetermined threshold (e.g., does not qualify as a phase imbalance condition on the power transmission section 400a). In either case, the power lines 16 of the power transmission section 400a may be phase balanced through execution of the phase balancing protocol 240. It should be appreciated that the phase balancing protocol 240 may not in fact be able to achieve a phase balanced condition in all circumstances. However, the phase balancing protocol 240 may be repeated on any appropriate basis in an attempt to achieve a phase balanced condition on the power transmission section 400a.

Each power line 16 of a given power transmission section 400a may have at least one DSR 30 mounted thereon, and each such DSR 30 may be disposable in each of first and second modes. As described above, the first mode for the DSRs 30 described herein is a bypass mode, and the second mode for the DSRs 30 described herein is an injection mode. Depending upon the configuration of the DSRs 30, its injection mode (a second mode as described herein) may decrease the current flow on the corresponding power line 16 (e.g., when the DSR 30 is configured to inject inductance into its corresponding power line 16; a current-decreasing modal configuration), or it may increase the current flow on the corresponding power line 16 (e.g., when the DSR 30 is configured to inject capacitance into its corresponding power line 16; a current-increasing modal configuration).

In the phase balancing protocols described herein, switching a DSR 30 into a first modal configuration may encompass switching the DSR 30 from its first mode (bypass) to its second mode (injection), or vice versa. Switching a given DSR 30 into a second modal configuration would be the reverse of such a first modal configuration (e.g., if switching the DSR 30 into a first modal configuration entailed switching the DSR from its first mode to its second mode, switching the DSR 30 into a second modal configuration would entail switching the DSR 30 from its second mode into its first mode). It should be appreciated that if the purpose of changing the modal configuration of a DSR 30 is to increase the current flow on its corresponding power line 16 (a current-increasing modal configuration), this could entail: 1) switching the DSR 30 from its second mode to its first mode if the DSR 30 is configured to inject inductance when in its second/injection mode; or 2) switching the DSR from its first mode to its second mode if the DSR 30 is configured to inject capacitance when in its second/injection mode. It should be appreciated that if the purpose of changing the modal configuration of a DSR 30 is to decrease the current flow on its corresponding power line 16 (a current-decreasing modal configuration), this could entail: 1) switching the DSR 30 from its first mode to its second mode if the DSR 30 is configured to inject inductance when in its second/injection mode; or 2) switching the DSR from its second mode to its first mode if the DSR 30 is configured to inject capacitance when in its second/injection mode. In any case, changing a given DSR 30 between its first and second modes should change the current flow on its corresponding power line 16 (e.g., increase or decrease the current flow on its corresponding power line 16, as the case may be).

Execution of the phase balancing protocol 240 of FIG. 13A for a power transmission section 400a of a power transmission system 400 may include measuring the current flow on each of the plurality of power lines 16 of the power transmission section 400a (step 242). Current flow may be measured in any appropriate manner (e.g., using the above-described current monitor 212) and on any appropriate basis (e.g., periodically; continually) for purposes of step 242. After the current flow has been measured on each power line 16, a first phase balancing protocol 260 may be executed (step 244). The first phase balancing protocol 260 of step 244 may include generating a first ranking of the plurality of power lines 16 (e.g., ranking the current flow on each power line 16 of the power transmission section 400a from high to low or from low to high), comparing the current flow between adjacent pairs of power lines 16 in the first ranking, and switching at least one DSR 30 into a first modal configuration.

Generally, the first phase balancing protocol 260 of step 244 for the phase balancing protocol 240 of FIG. 13A may be executed for each successive pair of adjacent power lines 16 (of the power transmission section 400a) in the first ranking until the entire first ranking has been assessed. When successively comparing each adjacent pair of power lines 16 in the first ranking, at least one DSR 30 may be switched into a first modal configuration to attempt to achieve a phase balanced condition between the adjacent pair of power lines 16 in the first ranking that is currently being analyzed. After each such switch, the current flowing on the two power lines 16 of the power transmission section 400a that are currently being assessed for purposes of step 244 may be measured again (step 242) and then re-assessed to determine if a phase balanced condition has been realized between this particular adjacent pair of power lines 16 in the first ranking. Only after a phase balanced condition has been realized for a given adjacent pair of power lines 16 in the first ranking will the first phase balancing protocol 260 of step 244 proceed to the next adjacent pair of power lines in the first ranking in accordance with one configuration of the first phase balancing protocol 260 of step 244.

Assuming that there has not been an occurrence of a first condition 262 (step 248), the phase balancing protocol 240 proceeds to step 246. Step 246 is directed to determining whether the first phase balancing protocol 260 (step 244) has been completed. The first phase balancing protocol 260 (step 244) may be considered as having been completed when each pair of adjacent power lines 16 (of the power transmission section 400a) in the first ranking have been successively assessed and are in a phase balanced condition. In such a case, step 242 (current measurement) and step 244 (execution of the first phase balancing protocol 260) could be repeated on any appropriate basis (e.g., immediately; after expiration of a predetermined/programmed amount of time). That is, although the phase balancing protocol 240 could be initiated on any appropriate basis and terminated upon achieving a phase balanced condition through execution of the first phase balancing protocol 260 (step 244), the phase balancing protocol 240 could be configured to be continually executed on at least some basis.

The second phase balancing protocol 270 (step 250) of the phase balancing protocol 240 of FIG. 13A may be executed upon an occurrence of a first condition 262 (step 248). A "first condition 262" for purposes of step 248 of the protocol 240 may be where the first phase balancing protocol 260 of step 244 could not produce a phase balanced condition for the power lines 16 in the entire first ranking in accordance with the foregoing, or could not produce a phase balanced condition for these power lines 16 within a predetermined amount of time. The second phase balancing protocol 270 for step 250 of the phase balancing protocol 240 also requires data on the current flow on each of the power lines 16 of the power transmission section 400a for which the phase balancing protocol 240 is being executed. As such, step 242 may also be executed in relation to the second phase balancing protocol 270 of step 250. After the current flow has been measured on each power line 16 of the power transmission section 400a being addressed by the phase balancing protocol 240, the second phase balancing protocol 270 may be executed (step 250). The second phase balancing protocol 270 is similar to the first phase balancing protocol 260 in that the second phase balancing protocol 270 may include generating a second ranking of the plurality of power lines 16 on the power transmission section 400a being phase balanced (ranking the current flow on each power line 16 of the power transmission section 400a, but in the opposite order from what was done for the first phase balancing protocol 260 of step 244), comparing the current flow between adjacent pairs of the plurality of power lines 16 in the second ranking, and switching at least one DSR 30 into a second modal configuration (which is directly opposite of the first modal configuration used by the phase balancing protocol 260 of step 244). As such, the first phase balancing protocol 260 (step 244) and the second phase balancing protocol 270 (step 250) rank the plurality of power lines 16 of the power transmission section 400a in directly opposite ordering sequences (one ranks the power lines 16 from high current flow to low current flow, and the other ranks the same power lines 16 from low current flow to high current flow), while the change in DSR 30 modal configuration used by the first phase balancing protocol 260 (step 244) has the direct opposite effect on the current flow in the corresponding power line 16 compared to the change in DSR 30 modal configuration used by the second phase balancing protocol 270 (step 250).

Generally, the second phase balancing protocol 270 of step 250 for the phase balancing protocol 240 of FIG. 13A may be executed for each successive pair of adjacent power lines 16 (of the power transmission section 400a) in the second ranking until the entire second ranking has been assessed, and in the same general manner discussed above with regard to the first phase balancing protocol 260 of step 244. If the second phase balancing protocol 270 (step 250) is able to achieve a phase balanced condition for the power lines 16 of the power transmission section 400a being assessed, the phase balancing protocol 240 could be terminated (and may be re-initiated on any appropriate basis). Alternatively (as well as for the case where the second phase balancing protocol 270 cannot produce a phase balanced condition for the power lines 16 of the power transmission section 400a being assessed), the entire phase balancing protocol 240 could be repeated (e.g., the phase balancing protocol 240 could be configured to be continually executed on at least some basis).

Figure 13B:
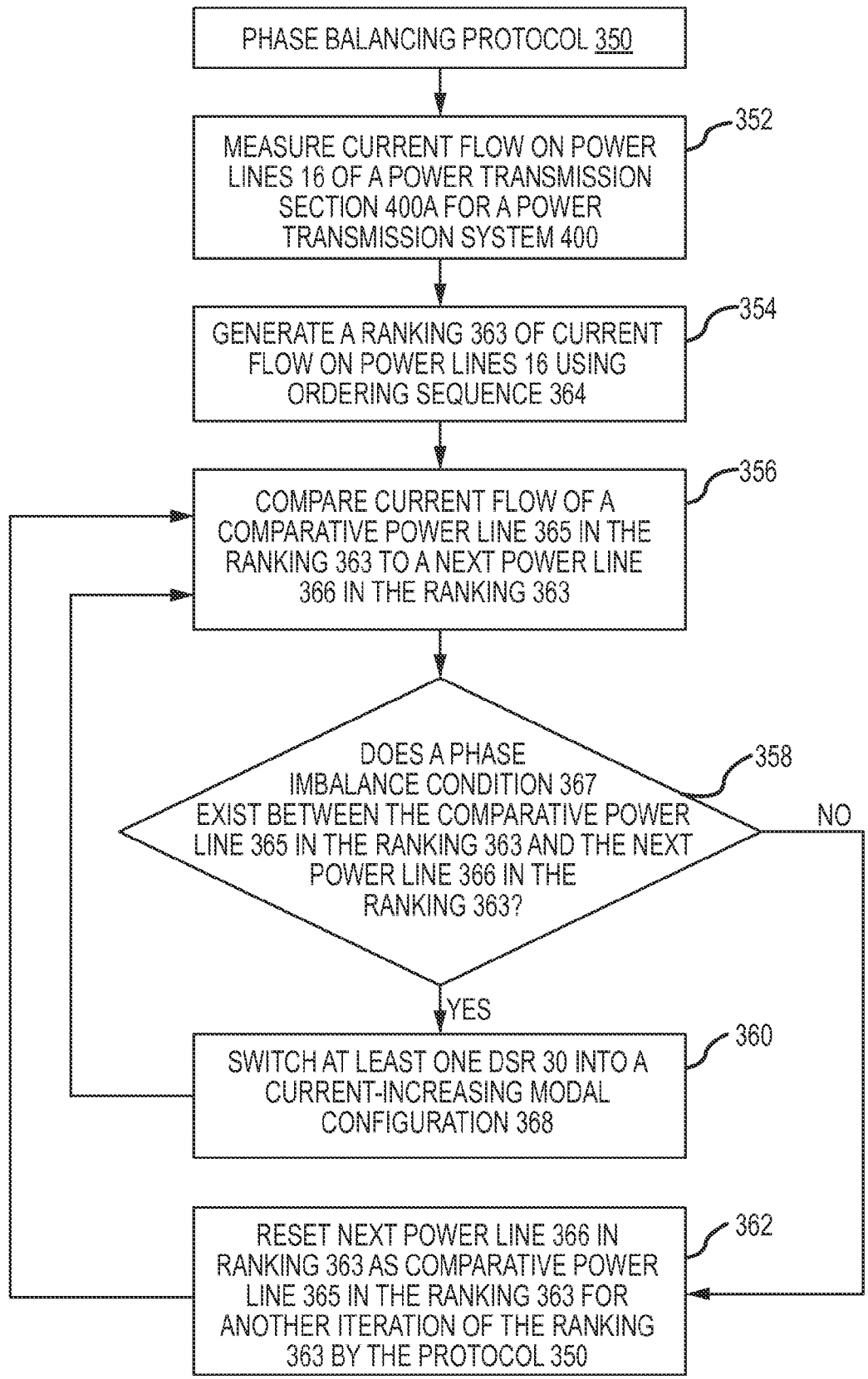
FIG. 13B is another embodiment of a protocol for balancing the phases of power lines of a section of a power transmission system, and which may be used by any one of the loops of the phase balancing protocol of FIG. 13A.

One embodiment of a phase balancing protocol is presented in FIG. 13B and is identified by reference numeral 350. The phase balancing protocol 350 may be used for either step 244 (the first phase balancing loop or protocol 260) or step 250 (the second phase balancing loop or protocol 270) of the phase balancing protocol 240 of FIG. 13A, and may be executed in relation to a power transmission section 400a of a power transmission system 400 (e.g., to phase balance the power lines 16 of a given power transmission section 400a, to phase balance any portion of the power transmission system 400, or to phase balance the entirety of the power transmission system 400). When the phase balancing protocol 350 is used as the first phase balancing loop 260 for the phase balancing protocol 240 of FIG. 13A, the word "first" may precede each of the terms/phrases ranking 363, ordering sequence 364, phase imbalance condition 367 (and associated current differential threshold), and modal configuration 368 that will be discussed below. When the phase balancing protocol 350 is used as the second phase balancing loop 270 for the phase balancing protocol 240 of FIG. 13A, the word "second" may precede each of the terms/phrases ranking 363, ordering sequence 364, phase imbalance condition 367 (and associated current differential threshold), and modal configuration 368 that will be discussed below.

The phase balancing protocol 350 of FIG. 13B generally includes measuring the current flow on each of the plurality of power lines 16 of a power transmission section 400a, ranking the plurality of power lines 16 of the power transmission section 400a based on the measured current flow and using a certain ordering sequence (from low to high), comparing the current flow between adjacent pairs of the plurality of power lines 16 in the ranking, determining whether a phase imbalance condition exists between adjacent pairs of power lines 16 in its associated ranking, and if so, switching at least one DSR 30 (on at least one of the power lines 16 of the power transmission section 400a) into a modal configuration (either switching the DSR 30 from its first/bypass mode to its second/injection mode, or vice versa as described above) to attempt to increase the current flow on its corresponding power line 16 on the power transmission section 400a. An overview of the phase balancing protocol 350 will be provided before addressing the same in relation to FIG. 13B.

In a three-phase power transmission system, the current flow on a first power line 16 of a given power transmission section 400a (e.g., Phase 1), a second power line 16 of this same power transmission section 400a (e.g., Phase 2), and a third power line 16 of this same power transmission section 400a (e.g., Phase 3) may be measured for purposes of the phase balancing protocol 350 of FIG. 13B. In this example and for the case of the phase balancing protocol 350, the noted power lines 16 may be ranked from a lowest measured current flow to a highest measured current flow (e.g., the phase balancing protocol 350 may be characterized as a "roll up" phase balancing loop; ranking from low to high in relation to the current flow may be referred to as an "ordering sequence" used by the ranking for the protocol 350). For example, Phase 2 may have the lowest measured current flow and therefore may be ranked first for the noted ordering sequence (e.g., Phase 2 may be referred to as $R_1$ in the ranking used by the protocol 350). Phase 3 may have the second lowest measured current flow and therefore may be ranked second for the noted ordering sequence (e.g., Phase 3 may be referred to as $R_2$ in the ranking used by the protocol 350). Finally, Phase 1 may have the third lowest measured current flow (stated another way, the highest current flow in this example) and therefore may be ranked third for the noted ordering sequence (e.g., Phase 1 may be referred to as $R_3$ in the ranking used by the protocol 350).

Again, a power transmission section 400a includes a plurality of power lines 16 (in this example, it has three power lines 16) and each power line 16 of the plurality of power lines 16 has at least one DSR 30 mounted thereon. In a first iteration of the ranking used by the phase balancing protocol 350 of FIG. 13B, and because the power lines 16 have been ranked from a lowest measured current flow to a highest measured current flow, the measured current flow of Phase 2 ($R_1$ in the ranking used by the protocol 350) is compared with the measured current flow of Phase 3 ($R_2$ in the ranking used by the protocol 350). That is, a first iteration of the phase balancing protocol 350 is a current flow comparison of a first adjacent pair of power lines 16 in the ranking used by the protocol 350—Phase 2 and Phase 3 in this example. If the difference between the measured current flow of Phase 2 ($R_1$) and Phase 3 ($R_2$) satisfies a predetermined threshold (e.g., if a current differential of at least a predetermined amount exists between these two power lines 16, and which may be equated with a phase imbalance condition), at least one DSR 30 mounted on Phase 2 ($R_1$) is switched into a current-increasing modal configuration to attempt to increase the current flow on Phase 2 ($R_1$, which again is the power line 16 with the lowest current flow in the ranking used by the protocol 350). These steps may be repeated for these same two power lines 16 until a phase imbalance condition does not exist between Phase 2 ($R_1$) and Phase 3 ($R_2$). In other words and for purposes of the phase balancing protocol 350, more than one DSR 30 mounted on Phase 2 ($R_1$) may be switched into a current-increasing modal configuration, and this switching may be undertaken on any appropriate basis (e.g., sequentially, simultaneously, or both).

When a phase imbalance condition no longer exists between Phase 2 ($R_1$) and Phase 3 ($R_2$), the next iteration of the ranking may be executed by the phase balancing protocol 350 of FIG. 13B. For example, the measured current flow of Phase 3 ($R_2$ in the ranking used by the protocol 350) may be compared with the measured current flow of the next power line 16 in the ranking, which in the example is Phase 1 ($R_3$ in the ranking used by the protocol 350). That is and for this second iteration, the next adjacent pair of power lines 16 in the ranking used by the protocol 350 may undergo a current flow comparison in accordance with the foregoing. Again, if a phase imbalance condition exists between Phase 3 ($R_2$) and Phase 1 ($R_3$), at least one DSR 30 mounted on Phase 3 ($R_2$) will be switched into a current-increasing modal configuration in an attempt to increase the current flow on Phase 3 ($R_2$). As Phase 2 ($R_1$) and Phase 3 ($R_2$) were previously phase balanced, this same change should also be made on Phase 2 ($R_1$) in an attempt to increase the current flow on Phase 2 ($R_1$) by at least substantially the same amount as the current flow is being increased on Phase 3 ($R_2$). This process may be repeated for each adjacent pair of power lines 16 in the ranking used by the protocol 350. In this example where there are three power lines 16 for the power transmission section 400a, the phase balancing protocol 350 may go through two iterations to assess the two adjacent pairs of power lines 16 in the ranking (e.g., $R_1$ and $R_2$ being one pair, and $R_2$ and $R_3$ being the other pair).

The phase balancing protocol 350 will now be described in relation to FIG. 13B for phase balancing a given power transmission section 400a having any appropriate number of multiple power lines 16, where each power line 16 of the power transmission section 400a may be of a different phase. A current flow on each power line 16 of the plurality of power lines 16 for the power transmission section 400a may be measured (step 352). After the current flow is measured on each power line 16 for the power transmission section 400a, a ranking 363 of the plurality of power lines 16 is generated using an ordering sequence 364 of the current flows on the plurality of power lines 16 (step 354). The ordering sequence 364 for purposes of the phase balancing protocol 350 is a sequence from a lowest measured current flow to a highest measured current flow (i.e., a low-to-high ordering sequence).

The first power line 16 in the ranking 363 (after the initial current flow measurement of step 352) may be characterized as an initial comparative power line 365 for the ranking 363 for purposes of initiating the sequencing through the ranking 363 by the phase balancing protocol 350. In other words, the initial comparative power line 365 for the ranking 363 may be the power line 16 with the lowest measured current flow for the power transmission section 400a. In any case, the current flow of the comparative power line 365 in the ranking 363 may be compared to the current flow of the next power line 366 in the ranking 363 (step 356). The next power line 366 in the ranking 363 will be the power line 16 with the second lowest measured current flow thereon on the first iteration of the ranking 363 by the phase balancing protocol 350. After the current flow of the comparative power line 365 in the ranking 363 is compared with the current flow of the next power line 366 in the ranking 363 (step 356), step 358 of the phase balancing protocol 350 may be executed.

The phase balancing protocol 350 of FIG. 13B includes determining whether a phase imbalance condition 367 exists between the comparative power line 365 and the next power line 366 in the ranking 363 (step 358). For example, if a difference between the current flow on the comparative power line 365 in the ranking 363 and the current flow on the next power line 366 in the ranking 363 satisfies a predetermined threshold associated with a phase imbalance condition 367 (e.g., if the difference in measured current flow on these two power lines 16 is greater than a predetermined threshold, or is equal to or greater than a predetermined threshold, as the case may be), a phase imbalance condition 367 may be characterized as existing between this particular pair of power lines 16 in the ranking 363. The predetermined threshold for a phase imbalance condition 367 may be any appropriate value (e.g., a current differential of at least about "x" Amps). In other words, if the current flow in the comparative power line 365 and the current flow in the next power line 366 in the ranking 363 are not within a predetermined amperage of each other, a phase imbalance condition 367 may be characterized as existing for purposes of the phase balancing protocol 350. If a phase imbalance condition 367 does exist (step 358), at least one DSR 30 on the comparative power line 365 (the power line 16 that is higher in the ranking 363 of the two power lines 16 currently being compared by the protocol 350) may be switched into a current-increasing modal configuration 368 (step 360). Switching at least one DSR 30 on the comparative power line 365 into a current-increasing modal configuration 368 (step 360) should increase the current flow on the comparative power line 365. The switching associated with step 360 may be characterized as attempting to phase balance to the next power line 366. After at least one DSR 30 has been switched into a current-increasing modal configuration 368 pursuant to step 360, the comparing step 356 and phase imbalance assessment step 358 may be executed again for this same pair of power lines 16.

In one example, one or more DSR 30s may be switched into a current-increasing modal configuration 368 after determining that a phase imbalance condition 367 exists (step 360), and thereafter the current flow in the same comparative power line 365 (i.e., the corresponding power line 16 for the DSR(s) 30 that has been switched into a current-increasing modal configuration 368) may be compared with the current flow in the same next power line 366 in the ranking 363. If it is determined that a phase imbalance condition 367 still exists, one or more additional DSRs 30 on the comparative power line 365 again may be switched into a current-increasing modal configuration 368 (step 360). As such, the current flow in the comparative power line 365 should continue to increase. Steps 356, 358, and 360 may be repeated as often as necessary until a phase imbalance condition 367 no longer exists between the two power lines 16 currently being assessed (the comparative power line 365 and the next power line 366 in the ranking 363). In other words, it may be the case that every time one or more DSRs 30 are switched into a current-increasing modal configuration 368 on the comparative power line 365 (step 360), the current flow on the same comparative power line 365 and the same next power line 366 is measured again (step 352) and compared (step 356) to determine if the difference between the current flow on the comparative power line 365 and the next power line 366 in the ranking 363 satisfies a predetermined threshold associated with the phase imbalance condition 367 (step 358).

It should be appreciated that the phase balancing protocol 350 could "over-adjust" the current flow on the comparative power line 365 (i.e., such that the current flow on the comparative power line 365 is now actually greater than the current flow on the next power line 366—not illustrated in FIG. 13B). The phase balancing protocol 350 could be configured to reduce the current flow on the comparative power line 365 so that it is once again less than the current flow on the next power line 366 (e.g., in the manner discussed below in relation to the phase balancing protocol 370 of FIG. 13C, such as by implementing step 380 from the protocol 370).

After the measuring step 352, comparing step 356, and switching step 360 have been executed for a first iteration of the ranking 363 in accordance with the foregoing such that a first phase imbalance condition 367 does not exist for the first two power lines 16 of the ranking 363, the second power line 16 in the ranking 363 (the above-referenced next power line 366) is reset as the comparative power line 365 for purposes of continued execution of the phase balancing protocol 350 (step 362). Stated another way, the phase balancing protocol 350 increments down one power line 16 in the ranking 363, and then repeats the foregoing in relation to the next adjacent pair of power lines 16 in the ranking 363. The updated comparative power line 365 in the ranking 363 is now the power line 16 with the second lowest measured current thereon, and the updated next power line 366 in the ranking 363 is now the power line 16 with the next successive lowest measured current thereon (in this case, the third lowest measured current.) The comparing step 356, phase imbalance assessment step 358, and switching step 360 may be repeated for the updated comparative power line 365 and the updated next power line 366. This comparison of the second or next adjacent pair of power lines 16 in the ranking 363 may be characterized as a second iteration of the ranking 363 by the phase balancing protocol 350. In any case, if a phase imbalance condition 367 exists between the updated comparative power line 365 and the updated next power line 366 in the ranking 363 (step 358), at least one DSR 30 on the updated comparative power line 365 may be switched into a current-increasing modal configuration 368 (step 360). As the updated comparative power line 365 was previously phase balanced with the immediately preceding power line 16 in the ranking 363, this same change should also be made on each power line 16 in the ranking 363 that precedes the updated comparative power line 365 in the ranking 363. For example and in the second iteration of the ranking 363 by the phase balancing protocol 350, the current flow on the first two power lines 16 in the ranking 363 should be increased by at least substantially the same amount pursuant to step 360 when attempting to phase balance the updated comparative power line 365 and the updated next power line 366 for the second iteration of the ranking 363 by the phase balancing protocol 350.

The comparing step 356, phase imbalance assessment step 358, and switching step 360 may be executed and/or repeated for the entirety of the ranking 363 in the above-noted manner. Again, when attempting to phase balance to a particular power line 16 in the ranking 363, the current flow on each preceding power line 16 in the ranking 363 should be increased by at least substantially the same amount (e.g., via execution of step 360). It should be appreciated that the phase balancing protocol 350 could be terminated on any appropriate basis and/or anywhere within the ranking 363 (e.g., upon achieving a phase balanced condition between all adjacent pairs of power lines 16 in the ranking 363; failing to achieve a phase balanced condition between a given adjacent pair of power lines 16 in the ranking 363; failing to achieve a phase balanced condition between a given adjacent pair of power lines 16 in the ranking 363 within a predetermined amount of time; failing to achieve a phase balanced condition throughout the entirety of the ranking 363 within a predetermined amount of time).

Figure 13C:
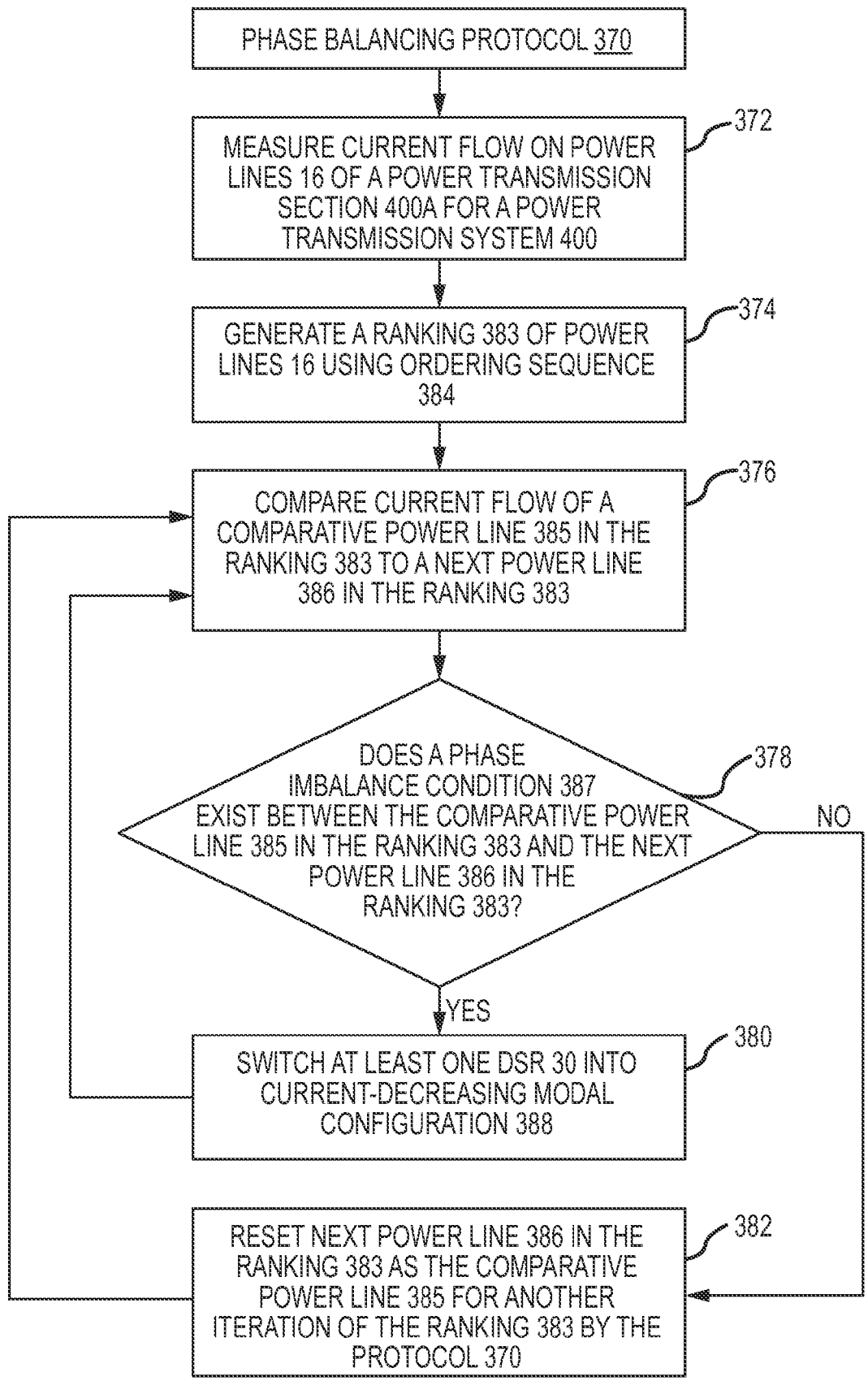
FIG. 13C is another embodiment of a protocol for balancing the phases of power lines of a section of a power transmission system, and which may be used by any one of the loops of the phase balancing protocol of FIG. 13A.

Another embodiment of a phase balancing protocol is presented in FIG. 13C and is identified by reference numeral 370. The phase balancing protocol 370 may be used for either step 244 (the first phase balancing loop or protocol 260) or step 250 (the second phase balancing loop or protocol 270) of the phase balancing protocol 240 of FIG. 13A, and may be executed in relation to a power transmission section 400*a* of a power transmission system 400 (e.g., to phase balance the power lines 16 of a given power transmission section 400*a*, to phase balance any portion of the power transmission system 400, or to phase balance the entirety of the power transmission system 400). When the phase balancing protocol 370 is used as the first phase balancing loop 260 for the phase balancing protocol 240 of FIG. 13A, the word "first" may precede each of the terms/phrases ranking 383, ordering sequence 384, phase imbalance condition 387 (and associated current differential threshold), and modal configuration 388 that will be discussed below. When the phase balancing protocol 370 is used as the second phase balancing loop 270 for the phase balancing protocol 240 of FIG. 13A, the word "second" may precede each of the terms/phrases ranking 383, ordering sequence 384, phase imbalance condition 387 (and associated current differential threshold), and modal configuration 388 that will be discussed below.

The phase balancing protocol 370 of FIG. 13C generally includes measuring the current flow on each of the plurality of power lines 16 of a power transmission section 400a, ranking the plurality of power lines 16 of the power transmission section 400a based on the measured current flow and using a certain ordering sequence (from high to low), comparing the current flow between adjacent pairs of the plurality of power lines 16 in the ranking, determining whether a phase imbalance condition exists between adjacent pairs of power lines 16 in its associated ranking, and if so, switching at least one DSR 30 (on at least one of the power lines 16 of the power transmission section 400a) into a modal configuration (either switching the DSR 30 from its first/bypass mode to its second/injection mode, or vice versa as described above) to attempt to decrease the current flow on its corresponding power line 16 on the power transmission section 400a. An overview of the phase balancing protocol 370 will be provided before addressing the same in relation to FIG. 13C.

In a three-phase power transmission system, the current flow on a first power line 16 of a given power transmission section 400a (e.g., Phase 1), a second power line 16 of this same power transmission section 400a (e.g., Phase 2), and a third power line 16 of this same power transmission section 400a (e.g., Phase 3) may be measured for purposes of the phase balancing protocol 370 of FIG. 13C. In this example and for the case of the phase balancing protocol 370, the noted power lines 16 may be ranked from a highest measured current flow to a lowest measured current flow (e.g., the phase balancing protocol 370 may be characterized as a "roll down" phase balancing loop; ranking from high to low in relation to the current flow may be referred to as an "ordering sequence" used by the ranking for the protocol 370). For example, Phase 2 may have the highest measured current flow and therefore may be ranked first for the noted ordering sequence (e.g., Phase 2 may be referred to as $R_1$ in the ranking used by the protocol 370). Phase 3 may have the second highest measured current flow and therefore may be ranked second for the noted ordering sequence (e.g., Phase 3 may be referred to as $R_2$ in the ranking used by the protocol 370). Finally, Phase 1 may have the third highest measured current flow (stated another way, the lowest current flow in this example) and therefore may be ranked third for the noted ordering sequence (e.g., Phase 1 may be referred to as $R_3$ in the ranking used by the protocol 370).

Again, a power transmission section 400a includes a plurality of power lines 16 (in this example, it has three power lines 16) and each power line 16 of the plurality of power lines 16 has at least one DSR 30 mounted thereon. In a first iteration of the ranking used by the phase balancing protocol 370 of FIG. 13C, and because the power lines 16 have been ranked from a highest measured current flow to a lowest measured current flow, the measured current flow of Phase 2 ($R_1$ in the ranking used by the protocol 370) is compared with the measured current flow of Phase 3 ($R_2$ in the ranking used by the protocol 370). That is, a first iteration of the phase balancing protocol 370 is a current flow comparison of a first adjacent pair of power lines 16 in the ranking used by the protocol 350—Phase 2 and Phase 3 in this example. If the difference between the measured current flow of Phase 2 ($R_1$) and Phase 3 ($R_2$) satisfies a predetermined threshold (e.g., if a current differential of at least a predetermined amount exists between these two power lines 16, and which may be equated with a phase imbalance condition), at least one DSR 30 mounted on Phase 2 ($R_1$) is switched into a current-decreasing modal configuration to attempt to decrease the current flow on Phase 2 ($R_1$, which again is the power line 16 with the highest current flow in the ranking used by the protocol 370). These steps may be repeated for these same two power lines 16 until a phase imbalance condition does not exist between Phase 2 ($R_1$) and Phase 3 ($R_2$). In other words and for purposes of the phase balancing protocol 370, more than one DSR 30 mounted on Phase 2 ($R_1$) may be switched into a current-decreasing modal configuration, and this switching may be undertaken on any appropriate basis (e.g., sequentially, simultaneously, or both).

When a phase imbalance condition no longer exists between Phase 2 ($R_1$) and Phase 3 ($R_2$), the next iteration of the ranking may be executed by the phase balancing protocol 370 of FIG. 13C. For example, the measured current flow of Phase 3 ($R_2$ in the ranking used by the protocol 370) may be compared with the measured current flow of the next power line 16 in the ranking, which in the example is Phase 1 ($R_3$ in the ranking used by the protocol 370). That is and for this second iteration, the next adjacent pair of power lines 16 in the ranking used by the protocol 370 may undergo a current flow comparison in accordance with the foregoing. Again, if a phase imbalance condition exists between Phase 3 ($R_2$) and Phase 1 ($R_3$), at least one DSR 30 mounted on Phase 3 ($R_2$) will be switched into a current-decreasing modal configuration in an attempt to decrease the current flow on Phase 3 ($R_2$). As Phase 2 ($R_1$) and Phase 3 ($R_2$) were previously phase balanced, this same change should also be made on Phase 2 ($R_1$) in an attempt to decrease the current flow on Phase 2 ($R_1$) by at least substantially the same amount as the current flow is being decreased on Phase 3 ($R_2$). This process may be repeated for each adjacent pair of power lines 16 in the ranking used by the protocol 370. In this example where there are three power lines 16 for the power transmission section 400a, the phase balancing protocol 370 may go through two iterations to assess the two adjacent pairs of power lines 16 in the ranking (e.g., $R_1$ and $R_2$ being one pair, and $R_2$ and $R_3$ being the other pair).

The phase balancing protocol 370 will now be described in relation to FIG. 13C for phase balancing a given power transmission section 400a having any appropriate number of multiple power lines 16, where each power line 16 of the power transmission section 400a may be of a different phase. A current flow on each power line 16 of the plurality of power lines 16 for the power transmission section 400a may be measured (step 372). After the current flow is measured on each power line 16 for the power transmission section 400a, a ranking 383 of the plurality of power lines 16 is generated using an ordering sequence 384 of the current flows on the plurality of power lines 16 (step 374). The ordering sequence 384 for purposes of the phase balancing protocol 370 is a sequence from a highest measured current flow to a lowest measured current flow (i.e., a high-to-low ordering sequence).

The first power line 16 in the ranking 383 (after the initial current flow measurement of step 372) may be characterized as an initial comparative power line 385 for the ranking 383 for purposes of initiating the sequencing through the ranking 383 by the phase balancing protocol 370. In other words, the initial comparative power line 385 for the ranking 383 may be the power line 16 with the highest measured current flow for the power transmission section 400a. In any case, the current flow of the comparative power line 385 in the ranking 383 may be compared to the current flow of the next power line 386 in the ranking 383 (step 376). The next power line 386 in the ranking 383 will be the power line 16 with the second highest measured current flow thereon on the first iteration of the ranking 383 by the phase balancing protocol 370. After the current flow of the comparative power line 385 in the ranking 383 is compared with the current flow of the next power line 386 in the ranking 383 (step 376), step 378 of the phase balancing protocol 370 may be executed.

The phase balancing protocol 370 of FIG. 13C includes determining whether a phase imbalance condition 387 exists between the comparative power line 385 and the next power line 386 in the ranking 383 (step 378). For example, if a difference between the current flow on the comparative power line 385 in the ranking 383 and the current flow on the next power line 386 in the ranking 383 satisfies a predetermined threshold associated with a phase imbalance condition 387 (e.g., if the difference in measured current flow on these two power lines 16 is greater than a predetermined threshold, or is equal to or greater than a predetermined threshold, as the case may be), a phase imbalance condition 387 may be characterized as existing between this particular pair of power lines 16 in the ranking 383. The predetermined threshold for the phase imbalance condition 387 may be any appropriate value (e.g., a current differential of at least about "x" Amps). In other words, if the current flow in the comparative power line 385 and the current flow in the next power line 386 in the ranking 383 are not within a predetermined amperage of each other, a phase imbalance condition 387 may be characterized as existing for purposes of the phase balancing protocol 370. If a phase imbalance condition 387 does exist (step 378), at least one DSR 30 on the comparative power line 385 (the power line 16 that is higher in the ranking 383 of the two power lines 16 currently being compared by the protocol 370) may be switched into a current-decreasing modal configuration 388 (step 380). Switching at least one DSR 30 on the comparative power line 385 into a current-decreasing modal configuration 388 (step 380) should decrease the current flow on the comparative power line 385. The switching associated with step 380 may be characterized as attempting to phase balance to the next power line 386. After at least one DSR 30 has been switched into a current-decreasing modal configuration 388 pursuant to step 380, the comparing step 376 and phase imbalance assessment step 378 may be executed again for this same pair of power lines 16.

In one example, one or more DSR 30s may be switched into a current-decreasing modal configuration 388 after determining that a phase imbalance condition 387 exists (step 380), and thereafter the current flow in the same comparative power line 385 (i.e., the corresponding power line 16 for the DSR(s) 30 that has been switched into a current-decreasing modal configuration 388) may be compared with the current flow in the same next power line 386 in the ranking 383. If it is determined that a phase imbalance condition 387 still exists, one or more additional DSRs 30 on the comparative power line 385 again may be switched into a current-decreasing modal configuration 388 (step 380). As such, the current flow in the comparative power line 385 should continue to decrease. Steps 376, 378, and 380 may be repeated as often as necessary until a phase imbalance condition 387 no longer exists between the two power lines 16 currently being assessed (the comparative power line 385 and the next power line 386 in the ranking 383). In other words, it may be the case that every time one or more DSRs 30 are switched into a current-decreasing modal configuration 388 on the comparative power line 385 (step 380), the current flow on the same comparative power line 385 and the same next power line 386 is measured again (step 372) and compared (step 376) to determine if the difference between the current flow on the comparative power line 385 and the next power line 386 in the ranking 383 satisfies a predetermined threshold associated with the phase imbalance condition 387 (step 378).

It should be appreciated that the phase balancing protocol 370 could "over-adjust" the current flow on the comparative power line 385 (i.e., such that the current flow on the comparative power line 385 is now actually less than the current flow on the next power line 386—not illustrated in FIG. 13C). The phase balancing protocol 370 could be configured to increase the current flow on the comparative power line 385 so that it is once again greater than the current flow on the next power line 386 (e.g., in the manner discussed above in relation to the phase balancing protocol 350 of FIG. 13B, such as by implementing step 360 from the protocol 350).

After the measuring step 372, comparing step 376, and switching step 380 have been executed for a first iteration of the ranking 383 in accordance with the foregoing such that a phase imbalance condition 387 does not exist for the first two power lines 16 of the ranking 383, the second power line 16 in the ranking 383 (the above-referenced next power line 386) is reset as the comparative power line 385 for purposes of continued execution of the phase balancing protocol 370 (step 382). Stated another way, the phase balancing protocol 370 increments down one power line 16 in the ranking 383, and then repeats the foregoing in relation to the next adjacent pair of power lines 16 in the ranking 383. The updated comparative power line 385 in the ranking 383 is now the power line 16 with the second highest measured current thereon, and the updated next power line 386 in the ranking 383 is now the power line 16 with the next successive highest measured current thereon (in this case, the third highest measured current.) The comparing step 376, phase imbalance assessment step 378, and switching step 380 may be repeated for the updated comparative power line 385 and the updated next power line 386. This comparison of the second or next adjacent pair of power lines 16 in the ranking 383 may be characterized as a second iteration of the ranking 383 by the phase balancing protocol 370. In any case, if a phase imbalance condition 387 exists between the updated comparative power line 385 and the updated next power line 386 in the ranking 383 (step 378), at least one DSR 30 on the updated comparative power line 385 may be switched into a current-decreasing modal configuration 388 (step 380). As the updated comparative power line 385 was previously phase balanced with the immediately preceding power line 16 in the ranking 383, this same change should also be made on each power line 16 in the ranking 383 that precedes the updated comparative power line 385 in the ranking 383. For example and in the second iteration of the ranking 383 by the phase balancing protocol 370, the current flow on the first two power lines 16 in the ranking 383 should be decreased by at least substantially the same amount pursuant to step 380 when attempting to phase balance the updated comparative power line 385 and the updated next power line 386 for the second iteration of the ranking 383 by the phase balancing protocol 370.

The comparing step 376, phase imbalance assessment step 378, and switching step 380 may be executed and/or repeated for the entirety of the ranking 383 in the above-noted manner. Again, when attempting to phase balance to a particular power line 16 in the ranking 383, the current flow on each preceding power line 16 in the ranking 383 should be decreased by at least substantially the same amount (e.g., via execution of step 380). It should be appreciated that the phase balancing protocol 370 could be terminated on any appropriate basis and/or anywhere within the ranking 383 (e.g., upon achieving a phase balanced condition between all adjacent pairs of power lines 16 in the ranking 383; failing to achieve a phase balanced condition between a given adjacent pair of power lines 16 in the ranking 383; failing to achieve a phase balanced condition between a given adjacent pair of power lines 16 in the ranking 383 within a predetermined amount of time; failing to achieve a phase balanced condition throughout the entirety of the ranking 383 within a predetermined amount of time).

Figure 13D:
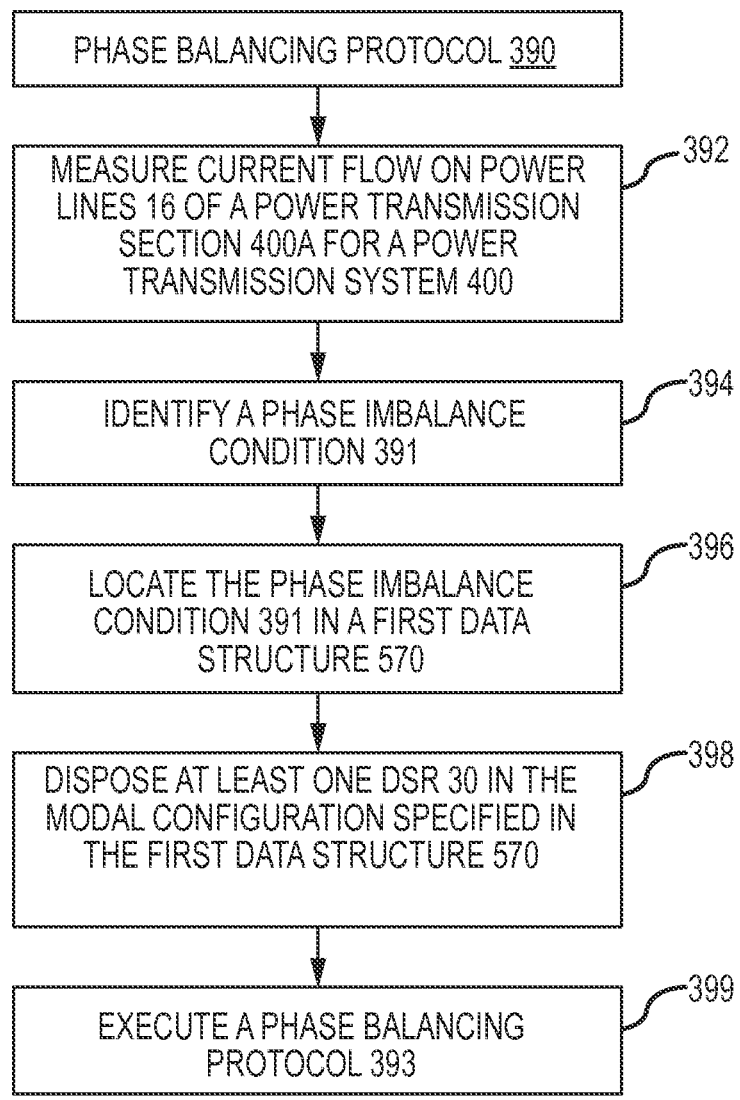
FIG. 13D is another embodiment of a protocol for balancing the phases of power lines of a section of a power transmission system, which utilizes a data structure of stored phase imbalance conditions, and which may use one or both of the phase balancing protocols of FIGS. 13B and 13C.

Another embodiment of a phase balancing protocol is presented in FIG. 13D and is identified by reference numeral 390. Generally, the phase balancing protocol 390 is directed to addressing a phase imbalance condition by using information from a lookup table or the like to dispose one or more DSRs 30 in a modal configuration that should reduce the magnitude of the phase imbalance, and thereafter executing a separate phase balancing protocol (e.g., phase balancing protocol 240 of FIG. 13A, phase balancing protocol 350 of FIG. 13B; phase balancing protocol 370 of FIG. 13C). This configuration may reduce the amount of time for the balancing protocols 240, 350, and/or 370 to achieve a phase balanced condition on a given portion of a power transmission system.

The phase balancing protocol 390 of FIG. 13D will be addressed with regard to the above-noted power transmission section 400a (FIG. 12A), but it may be used for any portion of the power transmission system 400 or for the entirety of the power transmission system 400. Again, corresponding power line sections 18 of the power lines 16 may be characterized as a power transmission section 400a for the power transmission system 400 (e.g., portions of the power lines 16 that each extend from location number 1 to location number 2 along the power transmission system 400 may be characterized as a power transmission section 400a—FIG. 12A). A given power transmission section 400a of the power transmission system 400 may include a separate DSR array 410 for each of the power lines 16 of the power transmission section 400a, where each DSR array 410 includes a plurality of DSRs 30 that are mounted on the corresponding power line 16 (e.g., discussion of FIGS. 12A-12G).

In a three-phase power transmission system 400, the power transmission section 400a may include three DSR arrays 410 (one for each of the three power lines 16). Each DSR array 410 has one or more DSR array controllers 440 that are dedicated to the DSR array 410. A given DSR array controller 440 may be in communication with each DSR 30 of its corresponding DSR array 410 such that a DSR array controller 440 may send communications to each DSR 30 within its corresponding DSR array 410 (e.g., a modal configuration communication that embodies a desired modal configuration for the DSR 30). Each DSR array controller 440 may include at least part of a first data structure 570 (FIG. 13E). Generally, such a first data structure 570 includes a plurality of stored phase imbalance conditions 572, along with a modal configuration 574 for one or more DSRs 30 on one or more of the power lines 16 of the power transmission section 400a, where disposing these DSRs 30 in the associated modal configuration 574 from the data structure 570 should at least reduce the magnitude of a corresponding phase imbalance on the power transmission section 400a. As such, a given DSR array controller 440 may locate a stored phase imbalance condition 572 in the first data structure 570, retrieve the modal configuration 574 for its DSRs 30 that have been associated with this stored phase imbalance condition 572 in the data structure 570, and send a modal configuration communication to these DSRs 30 for purposes of attempting to reduce the magnitude of the phase imbalance on the power transmission section 400a.

The phase balancing protocol 390 of FIG. 13D will now be described in relation to phase balancing a given power transmission section 400a having any appropriate number of multiple power lines 16, where each power line 16 of the power transmission section 400a may be of a different phase. A current flow on each power line 16 for the power transmission section 400a may be measured in any appropriate manner (step 392). These current flows (step 392) may be assessed in any appropriate manner to determine if a phase imbalance condition exists (e.g., using steps 354-358 of the phase balancing protocol 350 of FIG. 13B; using steps 374-378 of the phase balancing protocol 370 of FIG. 13C). For example, in a three-phase power transmission system 400, a first power line 16 of a power transmission section 400a (e.g., Phase 1) may have a first measured current, a second power line 16 of this same power transmission section 400a (e.g., Phase 2) may have a second measured current, and a third power line 16 of this same power transmission section 400a (e.g., Phase 3) may have a third measured current. If the difference in measured current between Phase 1 and Phase 2 is greater than a first predetermined threshold (e.g., the difference in measured current is greater than the first predetermined threshold, or greater than or equal to the first predetermined threshold, as the case may be), if the difference in measured current between Phase 2 and Phase 3 is greater than a second predetermined threshold (e.g., the difference in measured current is greater than the second predetermined threshold, or greater than or equal to the second predetermined threshold, as the case may be), or both, this may be associated with the existence of a phase imbalance condition 391 for purposes of the phase balancing protocol 390. The first and second predetermined thresholds could be the same or different.

If a phase imbalance condition 391 is identified through execution of the phase balancing protocol 390 (step 394), the noted first data structure 570 (FIG. 13E) may be searched to see if a corresponding phase imbalance condition has been previously stored in the first data structure 570. If the phase imbalance condition 391 is located in the first data structure 570 (step 396), one or more DSRs 30 on the relevant power line(s) 16 may be disposed in a modal configuration 574 that is specified in the first data structure 570. Disposing such DSRs 30 in the modal configuration 574 from the first data structure 570 should at least reduce the magnitude of the phase imbalance condition 391. Thereafter, the phase balancing protocol 390 concludes with the execution of another phase balancing protocol 393 (e.g., phase balancing protocol 240 of FIG. 13A; phase balancing protocol 350 of FIG. 13B; phase balancing protocol 370 of FIG. 13C).

One embodiment of the first data structure 570 (e.g., a lookup table) is presented in FIG. 13E, and may be used by the phase balancing protocol 390 of FIG. 13D. The first data structure 570 may utilize any appropriate data storage architecture. Generally, for each of a plurality of stored phase imbalance conditions 572, the first data structure 570 includes a corresponding modal configuration 574 for one or more DSRs 30 which, if implemented, should at least reduce the magnitude of a phase imbalance condition that exists on the power transmission section 400a (where such a phase imbalance condition at least generally corresponds with a given stored phase imbalance condition 572 from the data structure 570). For each stored phase imbalance condition 572 in the first data structure 570, the modal configuration 574 for the associated DSRs 30 may be a current-increasing modal configuration (e.g., current-increasing modal configuration 368 of FIG. 13B) or a current-decreasing modal configuration (e.g., current decreasing modal configuration 388 of FIG. 13C). Typically, the modal configuration 574 for each DSR 30 that is associated with a given stored phase imbalance condition 572 in the first data structure will be of a common type (either a current-increasing modal configuration or a current-decreasing modal configuration). As discussed above, a current-increasing modal configuration may encompass switching a given DSR 30 from its first mode (bypass) to its second mode (injection), or vice versa. A current-decreasing modal configuration may encompass switching a given DSR 30 in the opposite manner. For example, if switching a given DSR 30 into a current-increasing modal configuration entails switching the DSR 30 from its first mode to its second mode, switching this same DSR 30 into a current-decreasing modal configuration would entail switching the DSR 30 from its second mode into its first mode.

The first data structure 570 of FIG. 13E includes a plurality of stored phase imbalance conditions 572, and again is configured for use with a three-phase power transmission system 400 (i.e., three power lines 16a, 16b, and 16c for a power transmission section 400a are represented in the first data structure 570). It should be appreciated that the first data structure 570 may be adapted to include a modal configuration 574 for DSRs 30 on any appropriate number of power lines of a given power transmission section. In any case and for each stored phase imbalance condition 572 in the data structure 570, there is a modal configuration 574 for one or more DSRs 30 on one or more of the power lines 16a, 16b, 16c of the power transmission section 400a. For a given stored phase imbalance condition 572 in the data structure 570, disposing each designated DSR 30 in its corresponding modal configuration 574 should at least reduce the magnitude of a phase imbalance on a power transmission section 400a that at least generally corresponds with this stored phase imbalance condition 572.

For each power line 16 included in the first data structure 570 for a particular power transmission section 400a, the DSRs 30 on each such power line 16 that are associated with a particular stored phase imbalance condition 572 may be referred to as a phase balancing set for that particular power line 16 (and for a corresponding phase imbalance condition). Any appropriate number of DSRs 30 may be included in the phase balancing set for each power line 16 in the data structure 570 and for each stored phase imbalance condition 572. In one embodiment, all DSRs 30 installed on a particular power line 16 of the corresponding power transmission section 400a may define the phase balancing set for this power line 16 and a particular stored phase imbalance condition 572. Although a modal configuration 574 for at least one DSR 30 could be included for each power line 16 of the power transmission section 400a and for each stored phase imbalance condition 572, such may not be the case in all instances. In accordance with the foregoing, one of the lines 16 on the power transmission section 400 is the line 16 to which all other power lines on power transmission section 400a are balanced to (and as such no adjustments to current flow need to be made on this power line 16).

Each stored phase imbalance condition 572 in the first data structure 570 may include data that is indicative of which of power lines 16a, 16b, and 16c require an increase in current flow thereon or a decrease of current flow thereon to achieve a phase balanced condition. In one example, the data for a first stored phase imbalance condition 572 may indicate that in an attempt to achieve a phase balanced condition on a power transmission section 400a with power lines 16a, 16b, and 16c, either (1) power line 16a and power line 16b require a decrease in current flow thereon or (2) power line 16b and power line 16c require an increase in current flow thereon to phase balance the power transmission section 400a including power lines 16a, 16b, and 16c. In this example, the first data structure 570 may include the phase balancing set of DSRs 30 for power lines 16a and 16b that are associated with decreasing current flow on each of power lines 16a and 16b, along with a corresponding modal configuration 574 for each DSR 30 in the phase balancing set of DSRs 30. The modal configuration 574 for each DSR 30 in each phase balancing set of DSRs 30 for power lines 16a and 16b may be a current-decreasing modal configuration since a decrease in current flow is required on power lines 16a and 16b. Alternatively, the first data structure 570 may include the phase balancing set of DSRs 30 for power lines 16b and 16c associated with increasing current flow on each of power lines 16b and 16c, along with a modal configuration 574 for each DSR 30 in the phase balancing set of DSRs 30. The modal configuration 574 for each DSR 30 in each phase balancing set of DSRs 30 of power lines 16b and 16c may be a current-increasing modal configuration since an increase in current flow is required on power lines 16b and 16c.

As discussed above, the power transmission section 400a may include three DSR arrays 410 (one for each of the three power lines 16 that define the power transmission section 400a). There would then be a separate DSR array 410 for each of power lines 16a, 16b, and 16c that are represented in FIG. 13E. One or more of the DSR arrays 410 may include their own phase balancing set of DSRs 30 for each stored imbalance condition 572 in the first data structure 570. Each DSR array 410 again may have one or more DSR array controllers 440 that are dedicated to the DSR array 410. The entire first data structure 570 could be stored on at least one DSR array controller 440 for each DSR array 410 of the power transmission section 400a. Alternatively, the first data structure 570 could be distributed amongst the DSR array controllers 440 for the power transmission section 400a. For example, at least DSR array controller 440 for each DSR array 410 of the power transmission section 400a could include each phase imbalance condition 572, but only the modal configuration 574 for each DSR 30 in its corresponding phase balancing set of DSRs 30. In other words, each DSR array controller 440 could have a first data structure 570 that includes the same set of phase imbalance conditions 572, but with only a modal configuration 574 for each DSR 30 in its corresponding phase balancing set of DSRs 30 for addressing a corresponding phase imbalance condition.

The phase balancing protocol 390 of FIG. 13D will now be summarized in relation to FIG. 13E. A current flow on each power line 16a, 16b, and 16c for a power transmission section 400a may be measured in any appropriate manner (step 392). These current flows (step 392) may be assessed in any appropriate manner to determine if a phase imbalance condition 391 exists (e.g., using steps 354-358 of the phase balancing protocol 350 of FIG. 13B; using steps 374-378 of the phase balancing protocol 370 of FIG. 13C). For example, power line 16a may have a first measured current, power line 16b may have a second measured current, and power line 16c may have a third measured current. If the difference in measured current between power line 16a and power line 16b is greater than a first predetermined threshold (e.g., the difference in measured current is greater than the first predetermined threshold, or greater than or equal to the first predetermined threshold, as the case may be), if the difference in measured current between power line 16b and power line 16c is greater than a second predetermined threshold (e.g., the difference in measured current is greater than the second predetermined threshold, or greater than or equal to the second predetermined threshold, as the case may be), or both, this may be associated with the existence of a phase imbalance condition 391.

If a phase imbalance condition 391 is identified by the phase balancing protocol 390 (step 394), the first data structure 570 may be searched to see if such a phase imbalance condition has been stored in the first data structure 570. If the phase imbalance condition 391 is located in the first data structure 570 (step 396) (e.g., if the phase imbalance condition 391 is equivalent or sufficiently similar to a stored phase imbalance condition 572 in the first data structure 570), one or more DSRs 30 may be disposed in a modal configuration 574 that is specified in the first data structure 570 and that should reduce the magnitude of the phase imbalance condition 391. For example, if the phase imbalance condition 391 located in the first data structure 570 indicates that an increase in current is required in power lines 16a and 16c, the first data structure 570 of DSR array controller 440 for the DSR array 410 of power line 16a will include the modal configuration 574 (e.g., a current-increasing modal configuration) for each DSR 30 in the phase balancing set of DSRs 30 of power line 16a. The first data structure 570 of DSR array controller 440 for the DSR array 410 of power line 16c will include the modal configuration 574 (e.g., a current-increasing modal configuration) for each DSR 30 in the phase balancing set of DSRs 30 of power line 16c. The number of DSRs 30 in each phase balancing set of DSRs 30 of power lines 16a and 16c is based on the amount of increase in current required in each of power lines 16a and 16c. After each DSR 30 in each phase balancing set of DSRs 30 of power lines 16a and 16c has been disposed in its corresponding modal configuration 574, another phase balancing protocol 393 may be executed (e.g., phase balancing protocol 240 of FIG. 13A; phase balancing protocol 350 of FIG. 13B; phase balancing protocol 370 of FIG. 13C) to complete the phase balancing, if required.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention as such, or other embodiments and with various modifications required by the particular application(s) or use(s) of the present invention. It is intended that the appended claims be construed to include alternative embodiments to the extent permitted by the prior art.

What is claimed:

1. A method of phase balancing a power transmission system, comprising:
    measuring a current flow on each power line of a plurality of power lines of a first power transmission section of a power transmission system, wherein each said power line is of a different phase, wherein each said power line has at least one first device mounted thereon, wherein each said first device is disposable in each of first and second modes, and wherein changing a given said first device between said first and second modes changes said current flow on its corresponding said power line;
    identifying a first phase imbalance condition associated with said plurality of power lines in response to said measuring step;
    locating said first phase imbalance condition in a first data structure, wherein said first data structure comprises a plurality of stored phase imbalance conditions, wherein each said stored phase imbalance condition in said first data structure comprises a phase balancing set of said first devices and a corresponding modal configuration for each said first device in said phase balancing set;
    disposing each said first device of said phase balancing set in said first mode or said second mode based on its corresponding said modal configuration in said first data structure; and
    executing a first phase balancing protocol after said disposing step, comprising:
        generating a first ranking of said plurality of power lines using a first ordering sequence of said current flows on said power lines, wherein the first said power line in said first ranking is an initial comparative power line for said first ranking;
        executing a first comparing step comprising comparing said current flow of said comparative power line in said first ranking to said current flow of the next said power line in said first ranking;
        executing a first switching step comprising switching at least one said first device, on each said power line in said first ranking that precedes said next said power line from said first comparing step, into a first modal configuration if a second phase imbalance condition exists between said power lines from said first comparing step; and
        resetting said next said power line in said first ranking as said comparative power line, and then repeating said first comparing and first switching steps, wherein said first modal configuration comprises said first device being in one of said first and second modes.

2. The method of claim 1, wherein said modal configuration for each said first device in said phase balancing set comprises being in either said first mode or said second mode.

3. The method of claim 1, wherein said first power transmission section of said power transmission system comprises a reactance module array defined by a plurality of said first devices, which in turn comprises said phase balancing set of said first devices.

4. The method of claim 1, wherein said first data structure is located in a reactance module array controller, and wherein said reactance module array controller is configured to communicate with and control each said first device of said reactance module array.

5. The method of claim 4, wherein said first data structure comprises a lookup table.

6. The method of claim 4, wherein said reactance module array controller is configured to communicate said modal configuration to each said first device of said reactance module array.

7. The method of claim 1, wherein said second phase imbalance condition comprises a difference between said current flow of said comparative power line in said first ranking and said current flow of said next said power line in said first ranking satisfying a first predetermined threshold.

8. The method of claim 1, wherein said second phase imbalance condition comprises said current flow of said comparative power line in said first ranking and said current flow of said next said power line in said first ranking failing to be within a first predetermined amperage of each other.

9. The method of claim 1, wherein said first ordering sequence is a sequence from a lowest said current flow to a highest said current flow for said plurality of power lines.

10. The method of claim 1, wherein said first switching step for each said first device comprises increasing said current flow on its corresponding said power line.

11. The method of claim 10, wherein said first modal configuration comprises switching said at least one first device from said second mode to said first mode where said first mode is a bypass mode and where said second mode is an injection mode where said first device injects inductance into the corresponding said power line to decrease said current flow on said power line.

12. The method of claim 10, wherein said first modal configuration comprises switching said at least one first device from said first mode to said second mode where said first mode is a bypass mode and where said second mode is an injection mode where said first device injects capacitance into the corresponding said power line to increase said current flow on said power line.

13. The method of claim 1, wherein said first ordering sequence is a sequence from a highest said current flow to a lowest said current flow for said plurality of power lines.

14. The method of claim 1, wherein said first switching step for each said first device comprises decreasing said current flow on its corresponding said power line.

15. The method of claim 14, wherein said first modal configuration comprises switching said at least one first device from said first mode to said second mode where said first mode is a bypass mode and where said second mode is an injection mode where said first device injects inductance into the corresponding said power line to decrease said current flow on said power line.

16. The method of claim 14, wherein said first modal configuration comprises switching said at least one first device from said second mode to said first mode where said first mode is a bypass mode and where said second mode is an injection mode where said first device injects capacitance into the corresponding said power line to increase said current flow on said power line.

17. The method of claim 1, wherein said first phase balancing protocol further comprises incrementing through said first ranking one said power line at a time.

18. The method of claim 1, further comprising:
executing a second phase balancing protocol upon an occurrence of a first condition, comprising:
generating a second ranking of said plurality of power lines using a second ordering sequence of said current flows on said power lines, wherein the first said power line in said second ranking is an initial comparative power line for said second ranking, and wherein said second ordering sequence is opposite of said first ordering sequence;
executing a second comparing step comprising comparing said current flow of said comparative power line in said second ranking to said current flow of the next said power line in said second ranking;
executing a second switching step comprising switching at least one said first device, on each said power line in said second ranking that precedes said next said power line from said second comparing step, into a second modal configuration if a third phase imbalance condition exists between said power lines from said second comparing step; and
resetting said next said power line in said second ranking as said comparative power line, and then repeating said second comparing and second switching steps, wherein said first modal configuration comprises said first device being in one of said first and second modes, and wherein said second modal configuration comprises said first device being in the other of said first and second modes.

19. The method of claim 18, wherein said third phase imbalance condition comprises said current flow of said comparative power line in said second ranking and said current flow of said next said power line in said second ranking failing to be within a second predetermined amperage of each other.

20. The method of claim 18, wherein said third phase imbalance condition comprises said current flow of said comparative power line in said second ranking and said current flow of said next said power line in said second ranking failing to be within a second predetermined amperage of each other.

21. The method of claim 18, wherein said second phase balancing protocol further comprises incrementing through said second ranking one said power line at a time.

22. The method of claim 18, wherein said first condition comprises one adjacent pair of said power lines in said first ranking not achieving a phase balanced condition after executing said first switching step.

23. The method of claim 18, wherein said first condition comprises said first phase balancing protocol being unable to achieve a phase balanced condition within a predetermined amount of time.

24. The method of claim 1, wherein said resetting step for said first ranking is executable until said next said power line in said first ranking is the last said power line in said first ranking.

25. The method of claim 9, further comprising:
executing a second phase balancing protocol upon an occurrence of a first condition, comprising:
generating a second ranking of said plurality of power lines using a second ordering sequence of said current flows on said power lines, wherein the first said power line in said second ranking is an initial comparative power line for said second ranking, and wherein said second ordering sequence is opposite of said first ordering sequence;
executing a second comparing step comprising comparing said current flow of said comparative power line in said second ranking to said current flow of the next said power line in said second ranking;
executing a second switching step comprising switching at least one said first device, on each said power line in said second ranking that precedes said next said power line from said second comparing step, into a second modal configuration if a third phase imbalance condition exists between said power lines from said second comparing step; and
resetting said next said power line in said second ranking as said comparative power line, and then repeating said second comparing and second switching steps, wherein said first modal configuration comprises said first device being in one of said first and second modes, and wherein said second modal configuration comprises said first device being in the other of said first and second modes.

26. The method of claim 25, wherein said second ordering sequence is a sequence from a highest said current flow to a lowest said current flow for said plurality of power lines.

27. The method of claim 25, wherein said second switching step for each said first device comprises decreasing said current flow on its corresponding said power line.

28. The method of claim 25, wherein said resetting step for said first ranking is executable until said next said power line in said first ranking is the last said power line in said first ranking, and wherein said resetting step for said second ranking is executable until said next said power line in said second ranking is the last said power line in said second ranking.

29. The method of claim 13, further comprising:
executing a second phase balancing protocol upon an occurrence of a first condition, comprising:
generating a second ranking of said plurality of power lines using a second ordering sequence of said current flows on said power lines, wherein the first said power line in said second ranking is an initial comparative power line for said second ranking, and wherein said second ordering sequence is opposite of said first ordering sequence;

executing a second comparing step comprising comparing said current flow of said comparative power line in said second ranking to said current flow of the next said power line in said second ranking;

executing a second switching step comprising switching at least one said first device, on each said power line in said second ranking that precedes said next said power line from said second comparing step, into a second modal configuration if a third phase imbalance condition exists between said power lines from said second comparing step; and resetting said next said power line in said second ranking as said comparative power line, and then repeating said second comparing and second switching steps, wherein said first modal configuration comprises said first device being in one of said first and second modes, and wherein said second modal configuration comprises said first device being in the other of said first and second modes.

30. The method of claim 29, wherein said second ordering sequence is a sequence from a lowest said current flow to a highest said current flow for said plurality of power lines.

31. The method of claim 29, wherein said second switching step for each said first device comprises increasing said current flow on its corresponding said power line.

32. The method of claim 29, wherein said resetting step for said first ranking is executable until said next said power line in said first ranking is the last said power line in said first ranking, and wherein said resetting step for said second ranking is executable until said next said power line in said second ranking is the last said power line in said second ranking.

* * * * *